US011418413B2

(12) United States Patent
Dao et al.

(10) Patent No.: US 11,418,413 B2
(45) Date of Patent: *Aug. 16, 2022

(54) SHARABLE STORAGE METHOD AND SYSTEM FOR NETWORK DATA ANALYTICS

(71) Applicant: HUAWEI TECHNOLOGIES CO., LTD., Shenzhen (CN)

(72) Inventors: Ngoc Dung Dao, Ottawa (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,261

(22) Filed: Sep. 17, 2021

(65) Prior Publication Data

US 2022/0006707 A1 Jan. 6, 2022

Related U.S. Application Data

(63) Continuation of application No. 16/677,634, filed on Nov. 7, 2019, now Pat. No. 11,140,048.

(Continued)

(51) Int. Cl.
*H04L 41/5009* (2022.01)
*H04L 41/50* (2022.01)
(Continued)

(52) U.S. Cl.
CPC ...... *H04L 41/5009* (2013.01); *H04L 41/5032* (2013.01); *H04L 43/04* (2013.01);
(Continued)

(58) Field of Classification Search
None
See application file for complete search history.

(56) References Cited

U.S. PATENT DOCUMENTS 10,848,579 B2 * 11/2020 Schneider ............ H04L 67/325
2013/0024567 A1 1/2013 Roxburgh et al.
(Continued)

FOREIGN PATENT DOCUMENTS

CN 107211035 A 9/2017
CN 108881356 A 11/2018

OTHER PUBLICATIONS

3GPP TR 23.791 V2.0.0 (Dec. 2018), 3rd Generation Partnership Project; Technical Specification Group Services and System Aspects; Study of Enablers for Network Automation for 5G(Release 16), 121 pages.

(Continued)

*Primary Examiner* — Minh Chau Nguyen
*Assistant Examiner* — Ishrat Rashid

(57) ABSTRACT

A method and system of unifying data transmission and storage in a communication network are provided. The method comprises determining, by a coordinator associated with a network data analytics function (NWDAF) service instance set, what data that more than one NWDAF service instances in the NWDAF service instance set requires, if the data required by the more than one NWDAF service instances is the same, requesting, by the coordinator associated with the NWDAF service instance set, the data from a network function service instance set, and receiving the data from a data storage function that is notified by the network function service instance set of the request from the coordinator associated with the NWDAF service instance set.

14 Claims, 27 Drawing Sheets

Related U.S. Application Data

(60) Provisional application No. 62/791,536, filed on Jan. 11, 2019.

(51) Int. Cl.
  *H04W 24/08* (2009.01)
  *H04L 43/0817* (2022.01)
  *H04L 67/1097* (2022.01)
  *H04L 43/04* (2022.01)

(52) U.S. Cl.
  CPC ...... *H04L 43/0817* (2013.01); *H04L 67/1097* (2013.01); *H04W 24/08* (2013.01)

(56) References Cited

U.S. PATENT DOCUMENTS

| | | |
|---|---|---|
| 2016/0197808 A1 | 7/2016 | Popokh et al. |
| 2017/0331922 A1 | 11/2017 | Zhu |
| 2018/0262924 A1 | 9/2018 | Dao et al. |
| 2018/0352050 A1 | 12/2018 | Li et al. |

OTHER PUBLICATIONS

ETSI TS 123 501 V15.3.0 (Sep. 2018), 5G; System Architecture for the 5G System(3GPP TS 23.501 version 15.3.0 Release 15). 227 pages.

"Study of Enablers for Network Automation for 5G"; 3GPP TR 23.791 V2.0.0 (Dec. 2018).

"System Architecture for the 5G System; Stage 2"; 3GPP TS 23.501 V15.4.0 (Dec. 2018).

"Procedures for the 5G System; Stage 2"; 3GPP TS 23.502 V15.4.0 (Dec. 2018).

Rui Wang,:"Survey of 5G network slicing",Nov. 13, 2018,total 9 pages (Abstract Only).

SA WG2 Meeting #128bis,S2-188510,Solution for Data Collection from OAM using Existing SA5 Services, Huawei, HiSilicon, Telecom Italia, Orange,Aug. 20-24, 2018, Sophia Antipolis, France,total 3 pages.

SA WG2 Meeting #128-bis S2-188425, New solution (Key issue 10): NWDAF service to provide recommendation for NF instance selection,KDDI,Aug. 20-24, 2018, Sophia Antipolis, France,total 4 pages.

SA WG2 Meeting #S2-128,S2-187618,Recommendations produced by NWDAF,ORANGE, Huawei,Jul. 2 - 6, 2018, Vilnius, Lithuania,total 6 pages.

SA WG2 Meeting #128,S2-186669,Solution for Key Issue 4: Interactions with OAM for Network Data Collection, Huawei, HiSilicon, Telecom Italia, Orange,Jul. 2-6, 2018, Vilnius, Lithuania,total 4 pages.

SA WG2 Meeting #127,S2-184609,Defining NWDAF in 23.501,Ericsson, ATandT, Huawei,Apr. 16-20, 2018, Sanya, P.R. China,total 8 pages.

\* cited by examiner

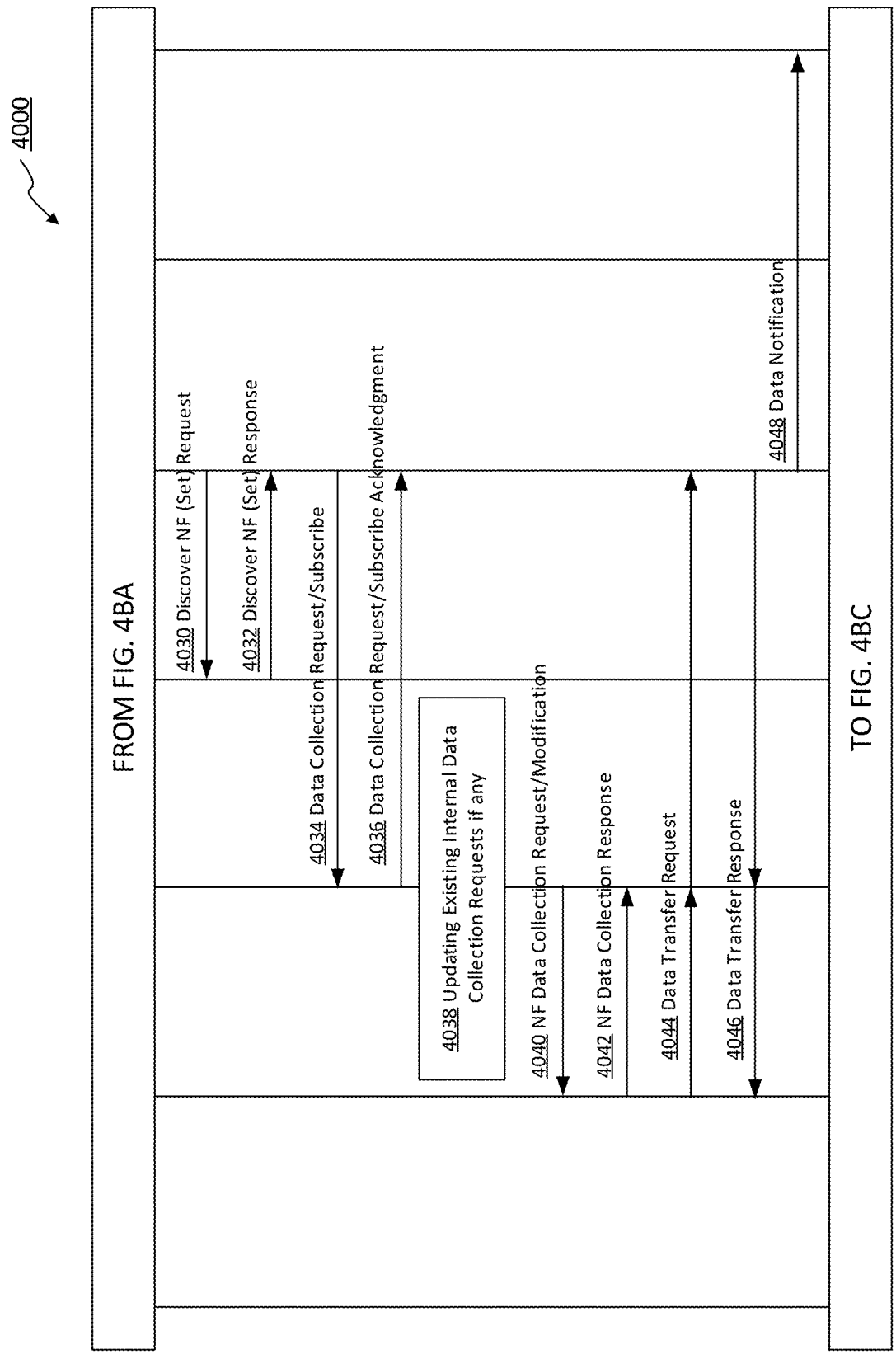

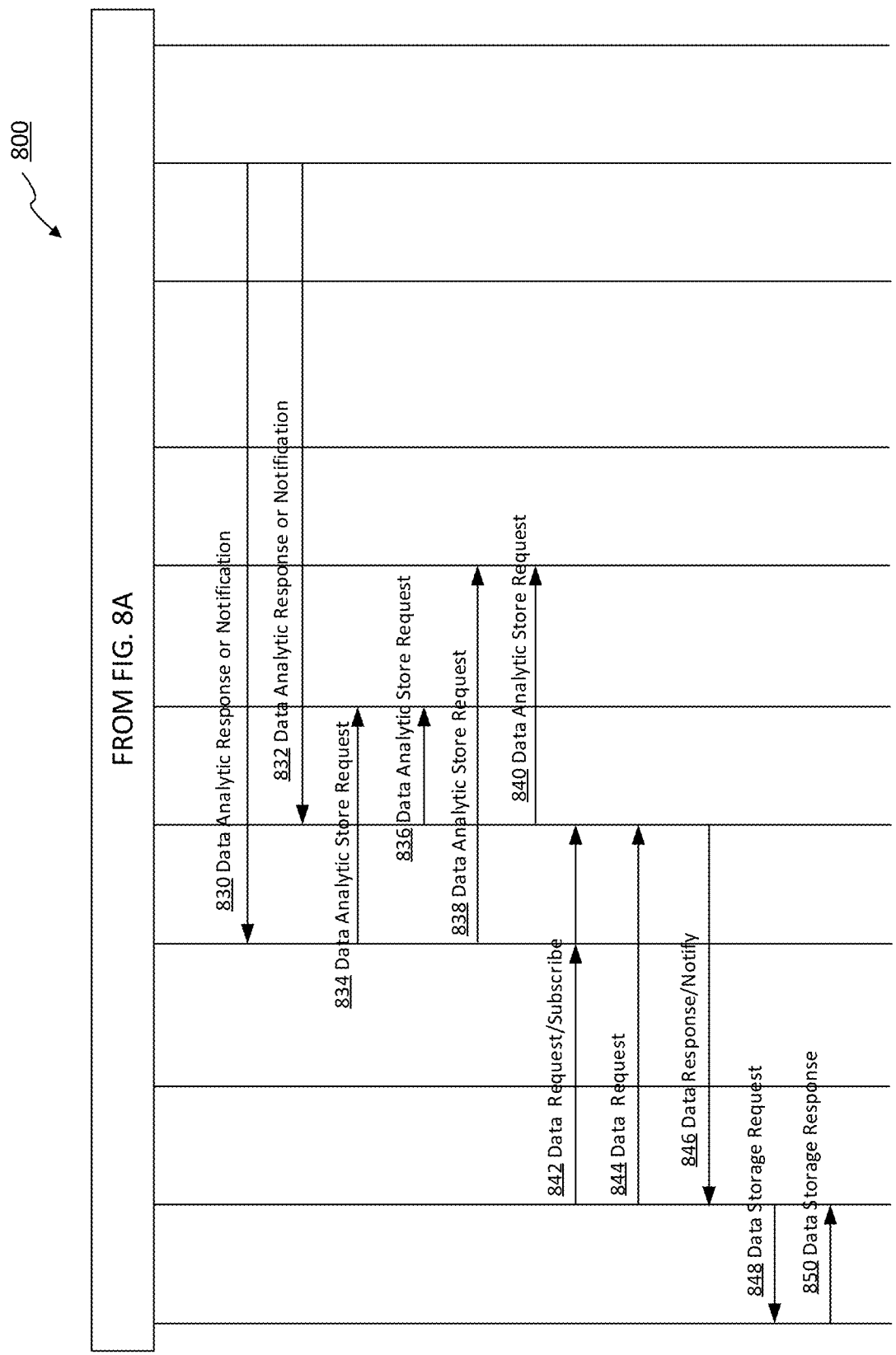

SHARABLE STORAGE METHOD AND SYSTEM FOR NETWORK DATA ANALYTICS

CROSS-REFERENCE TO RELATED APPLICATIONS

This application is a continuation of U.S. patent application Ser. No. 16/677,634, entitled "Sharable Storage Method and System for Network Data Analytics" filed Nov. 7, 2019 and claims the benefit and priority from U.S. Provisional Patent Application No. 62/791,536 entitled "Sharable Storage Method and System for Network Data Analytics" filed Jan. 11, 2019, the contents of which are incorporated herein by reference in their entirety.

FIELD OF THE INVENTION

The present invention pertains to the field of network communications, and in particular to a system and method of network sharable architectures.

BACKGROUND

In order to improve the operation efficiency of the mobile network, the Network Data Analytic Function (NWDAF) has been introduced in 3GPP Fifth Generation (5G) Core Network (CN) to provide data analytic functionality. The NWDAF needs to collect data from the network functions (NF), network management function such as operations administration and maintenance (OAM) system, user equipment (UE), and external application server (AS) or application function (AF). However, there are a number of issues with the existing solutions.

FIG. 1 illustrates a CN network model 100, where there is one NWDAF set (NWDAF set 110), and two NF sets, NF-A set 120 and NF-B set 130. A NF Set may be also called NF Service Instance (SI) Set. One NF Set may have one or more NF instances, one NF instance may include one or more NF Service Set, and each NF Service Set may have one or more NF Service Instance. Each NF Set may offer one or more services to other NF Sets. The NF-A set 120 could be an Access and Mobility Management Function (AMF) set, the NF-B set 130 could be a Session Management Function (SMF) set. The NWDAF set 110 may have two NWDAF SIs, NWDAF SI 111 and NWDAF SI 112 for example. In one example, both NWDAF SIs 111 and 112 may offer the same service, such as UE mobility analytics. In another example, the NWDAF Set 110 may offer two services, in which the NWDAF SI 111 and 112 may provide UE mobility analytics and traffic routing analytics, respectively. In order to provide UE mobility analytical and network traffic routing analytical information, both NWDAF SIs 111 and 112 may need UE mobility information such as UE location, connection times. This information may be provided by NF-A set 120 and NF-B set 130. Hence both NWDAF SIs 111 and 112 need to collect the same data from NF-A set 120 and NF-B set 130s. Furthermore, the NWDAF SIs 111 and 112 need to store the collected data temporarily in a storage function belonged to the NWDAF set, which could be Unstructured Data Storage Function (UDSF). It is apparent that the two NWDAF SIs 111 and 112 collect the same data, and that the same data is stored twice in the storage. Such redundant storage resources and signaling in the CN causes double signaling load and double storage capacity requirements.

Another issue with the storage solution of FIG. 1 has implications in provisioning of data analytics from different NWDAF sets, since, when a NWDAF set is removed, for example when the NWDAF set 110 from a vendor is replaced by a new NWDAF set from another vendor, it is possible that the data stored in the NWDAF set storage (e.g. NF-A Service Instance Set Data Storage 121, NF-B Service Instance Set Data Storage 131) may not be accessible due to proprietary format. It means that the new NWDAF vendor may be unable to use existing collected data for analytics.

Next with reference to FIG. 2, illustrated is a scenario 200 where another network entity, such as OAM 240, collects network data and then shares the collected data with the NWDAF 210. In scenario 200, the OAM 240 may first collect the network data for its own data analysis. Then the NWDAF 210 may request the same or a subset of the collected data. The OAM 240 may send the requested data to the NWDAF 210. The NWDAF 240 may store the data from the OAM 240 for future analysis. Thus, in this scenario, the same collected data is stored in both OAM data storage 241 and NWDAF SI set data storages 211, resulting in a waste of storage resources of both OAM 240 and NWDAF 210.

The background information herein is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide improved systems and methods of unifying data transmission and storage in a communication network, including a wireless communication network.

Embodiments of the present invention provide for a method for data collection, the method comprising: collecting, by a coordinator associated with a network data analytics function (NWDAF), a request from at least one NWDAF service instance in a NWDAF set (such as a NWDAF service instance set) associated with the NWDAF, wherein the request is for obtaining a data item associated with at least one of a data type and an attribute included in the request; subscribing, by the coordinator, to the data item from a network function set according to the request; and receiving, by the coordinator from a data storage function which is communicable with both the NWDAF and the network function set, the data item.

Embodiments of the present invention provide for a method for data collection, the method comprising: receiving, by a data storage function from a coordinator associated with a network data analytics function (NWDAF), a subscription to a data item associated with at least one of a data type and an attribute via a first interface between the data storage function and the NWDAF; subscribing, by the data storage function from a network function set, to the data item according to the received subscription via a second interface between the data storage function and the network function set; receiving, by the data storage function from the network function set, the data item via the second interface; and sending, by the data storage function to the NWDAF, the data item in response to the NWDAF's subscription.

Embodiments of the present invention provide for communication system comprising a coordinator and data storage function configured to perform the methods as described above, respectively. Optionally, the system includes a network function set. Additionally, Embodiments of the present invention provide for apparatus configured to perform the methods as described above.

Embodiments of the present invention provide for a method for supporting data analytics in a data network. The method includes determining, by a coordinator, a data item that is commonly required by more than one NWDAF service instances in a NWDAF set (which may be a NWDAF service instance set). The coordinator is associated with one of: a network data analytics function (NWDAF) set; a network function set (which may be a network function service instance set); and a data storage function separate from the NWDAF set and the network function set. The method further includes initiating, by the coordinator, communication of the data item from the network function set, the data storage function, or both, toward the more than one NWDAF service instances. The communication of the data item includes transmitting a message containing part or all of a single instance of the data item, the more than one NWDAF service instances receiving the data item based on communication of said same single instance.

Embodiments of the present invention provide for an apparatus for supporting data analytics in a data network. The apparatus includes a processor, a memory, and a network interface configured to implement a coordinator function. The apparatus can be implemented as a stand-alone device, or as a virtualized device for example in a datacenter. The apparatus (coordinator) is configured to determine a data item that is commonly required by more than one NWDAF service instances in the NWDAF set. The coordinator is associated with one of: a network data analytics function (NWDAF) service instance set; a network function set; and a data storage function separate from the NWDAF set and the network function set. The apparatus (coordinator) is further configured to initiate communication of the data item from the network function set, the data storage function, or both, toward the more than one NWDAF service instances. The communication of the data item includes transmitting a message containing part or all of a single instance of the data item, the more than one NWDAF service instances receiving the data item based on communication of said same single instance.

Embodiments herein provide, in one aspect, a method that includes determining, by a coordinator associated with a network data analytics function (NWDAF) service instance set, what data that more than one NWDAF service instances in the NWDAF service instance set requires. If the data required by the more than one NWDAF service instances is the same, then requesting, by the coordinator associated with the NWDAF service instance set, the data from a network function service instance set. The method further includes receiving the data from a data storage function that is notified by the network function service instance set of the request from the coordinator associated with the NWDAF service instance set.

In one aspect, the coordinator associated with the NWDAF service instance set sends one request to the network function service instance set, the request indicating that the data is required by an identified subset of NWDAF service instances in the NWDAF service instance set.

In another aspect, the coordinator associated with the NWDAF service instance set receives a message including the data.

In yet another aspect, the method includes receiving, at the data storage function, a message indicating what data is requested by the coordinator associated with the NWDAF service instance set.

Embodiments herein also provide, in one aspect, a method that includes determining, by a coordinator associated with a network function service instance set, whether data required by more than one NWDAF service instances is the same. And if the data required by more than one NWDAF service instances is the same, instructing, by the coordinator associated with the network function service instance set, a data storage function to transmit the data to the more than one NWDAF service instances in one message or multiple messages.

In one aspect, the more than one NWDAF service instances are included in one NWDAF service instance set or in different NWDAF service instance sets.

Embodiments herein further provide a method that includes determining, by a coordinator associated with a network function service instance set, what data is required by a network management function (OAM). The method further includes instructing, by the coordinator associated with the network function service instance set, a data storage function to transmit the data to the OAM.

The method further includes, in one aspect, receiving a request at the OAM from a NWDAF service instance for the data and transmitting the data, by the data storage function, to the NWDAF service instance.

Embodiments herein further provide a method that includes subscribing, by a unified data manager function (UDM), a user equipment (UE) mobility information from a NWDAF and receiving the UE mobility information as subscribed. The method also includes, upon receiving a request for UE subscription and UE mobility information from an access and mobility management function (AMF), transmitting, by the UDM, the requested information to the AMF according to the information subscribed from the UDM.

In one aspect, the method is associated with a UE registration procedure.

In another aspect, the method also includes, upon receiving a request for at least one of UE subscription and UE mobility information from a session management function (SMF), transmitting, by the UDM, the requested information to the SMF according to the information subscribed from the UDM.

The method also includes, in yet another aspect, receiving, at the SMF, a request associated with a protocol data unit (PDU) session from the AMF and transmitting, by the SMF, the request to the UDM.

Embodiments herein also provide, in one aspect, a method that includes requesting, by a plurality of network data analytics function (NWDAF) SIs of one or more NWDAF SI sets, data acquired by a plurality of network function SIs in a plurality of network function sets, each network function set associated with a network function SI Set Coordinator (SC). The method further includes receiving unified data at the plurality of NWDAF SIs, the data being unified for transmission and storage in accordance with at least a data type identification and a data collection attribute. The method further includes performing at least one network data analytics operation at the plurality of NWDAF SIs based on the unified data.

In a further aspect, the method also includes storing a result of the at least one data analytics operation accessible in conjunction with a unified data management (UDM) function of a storage function (SF) shared with the plurality of NWDAF SIs and the at least one NWDAF SI set, and accessing, via the UDM function, by at least one of a network function and a network management function (such as OAM), the result of the at least one data analytics operation. In one embodiment, the storage function (SF) is shared with the plurality of NWDAF SIs and at least one NWDAF set in a plurality of NWDAF sets, whereby the unified data as received by the NWDAF SIs is received from the SF. In yet another embodiment, the result pertains to a UE parameter, the UE parameter including at least one of a UE mobility pattern parameter and a UE communication pattern parameter.

In yet another aspect, the data collection attribute may include at least one of a start collection time, an end collection time, information pertaining to a network slice of the communication network wherein the communication network is a virtualized network, a domain network name (DNN), a user equipment (UE) identifier (ID) of an individual UE or a group of UEs, a UE location, location information pertaining to at least one of a radio access network (RAN) address, a cell ID, a tracking area that includes one or more cell IDs, a registration area that includes one or more of the cell IDs, and a service area including at least one of a user plane function service area and a control plane service area.

In one aspect of the embodiments presented herein, the data type identification may include at least one of an event identification (ID), a protocol data unit (PDU) session ID, a quality of service (QoS) flow ID, a QoS profile ID, a QoS rule, and a packet data filter (PDF).

Embodiments herein also provide, in a further aspect, a network element in a communication network that includes a processor, a network interface in communication with at least a network storage function (SF) and a network management function (such as OAM system), and a non-transitory computer readable memory storing instructions executable in the processor. The instructions are executable to configure the network element to implement a network data analytics function (NWDAF) to request, by a plurality of NWDAF SIs, data acquired by a plurality of network function SIs in a plurality of network function sets, each network function set associated with a NF Service Instance Set Coordinator (SI SC). The instructions are further executable to receive unified data at the plurality of NWDAF SIs, the data being unified for transmission and storage in accordance with at least a data type identification and a data collection attribute. The instructions are further executable to perform at least one network data analytics operation at the plurality of NWDAF SIs based on the unified data.

Embodiments herein further provide a method that includes checking, by an OAM, whether data which an NWDAF service instance requests for is available. The method further includes that based on a checking result, notifying the NWDAF service instance of an address to obtain the data.

In one aspect, the method also includes obtaining, by the NWDAF service instance, the data according to the received address.

Embodiments herein further provide a method that includes subscribing, by a unified data manager function (UDM), a type of analytical data from a NWDAF and receiving the analytical data as subscribed. The method also includes, upon receiving a request for UE subscription and analytical data from an access and mobility management function (AMF), transmitting, by the UDM, the requested information to the AMF according to the information subscribed from the UDM.

In one aspect, the method is associated with a UE registration procedure.

In another aspect, the method also includes, upon receiving a request for at least one of UE subscription and analytical data from a session management function (SMF), transmitting, by the UDM, the requested information to the SMF according to the requested information from the UDM.

The method also includes, in yet another aspect, receiving, at the SMF, a request associated with a protocol data unit (PDU) session from the AMF and transmitting, by the SMF, the request to the UDM.

Embodiments herein also provide, in one aspect, a method that includes requesting, by a plurality of network data analytics function (NWDAF) service instances, data acquired by a plurality of network function service instances in a plurality of network function service instance sets, each network function service instance set associated with a network function SI SC. The method further includes receiving unified data at the plurality of NWDAF service instances, the data being unified for transmission and storage in accordance with at least a data type identification and a data collection attribute. The method further includes performing at least one network data analytics operation at the plurality of NWDAF service instances based on the unified data.

In one aspect, the unified data received at the plurality of NWDAF service instances is transmitted from the network function SI SC, and the data is unified in accordance with the at least a data type identification and a data collection attribute.

In another aspect, the data received at the plurality of NWDAF service instances is received from a NWDAF SI SC associated with an NWDAF set associated with a subset of the plurality of NWDAF service instances.

In a further aspect, the method also includes a storage function (SF) accessible by the plurality of NWDAF service instances and at least one NWDAF set in a plurality of NWDAF sets, wherein the unified data as received by the NWDAF service instances is received from the SF. In some embodiments, the method further includes storing a result of the at least one data analytics operation accessible in conjunction with a unified data management (UDM) function of the SF shared with the plurality of NWDAF service instances and the at least one NWDAF set, and accessing, via the UDM function, by at least one of a network function and a network management function (OAM), the result of the at least one data analytics operation. In some embodiments, the result pertains to a UE parameter, the UE parameter including at least one of a UE mobility pattern parameter and a UE communication pattern parameter.

In yet another aspect, the data type identification comprises at least one of an event identifier (ID), a protocol data unit (PDU) session ID, a quality of service (QoS) flow ID, a QoS profile ID, a QoS rule, and a packet data filter (PDF).

In yet another aspect, the data collection attribute comprises at least one of a start collection time, an end collection time, information pertaining to a network slice of the communication network wherein the communication network is a virtualized network, a domain network name (DNN), a user equipment (UE) ID of an individual UE or a group of UEs, a UE location, location information pertaining to at least one of a radio access network (RAN) address, a cell ID, a tracking area that includes one or more cell IDs, a registration area that includes one or more of the cell IDs, and a service area including at least one of a user plane function service area and a control plane service area. The start collection time and/or end collection time may indicate a time in the past or in the future.

In yet another aspect, the data comprises at least one of network entity data, network operation data, user equipment (UE) mobility data, network maintenance data, and network measurement reports as acquired by at least one of a UE, an application function (AF) and a network management function (OAM) of the communication network.

In yet another aspect, at least one of the plurality of NWDAF service instances comprises at least one of a plurality of network entities selected from the group consisting of: electronic devices, radio access network (RAN) functions, user plane functions, control plane functions, and management plane functions and the unified data includes network measurement data acquired at an access node of respective ones of the plurality of the network entities.

Embodiments herein also provide, in a further aspect, a network element in a communication network that includes a processor, a network interface in communication with at least a network storage function (SF) and a network management function (such as OAM system), and a non-transitory computer readable memory storing instructions executable in the processor. The instructions are executable to configure the network element to implement a network data analytics function (NWDAF) to request, by a plurality of network data analytics function (NWDAF) service instances, data acquired by a plurality of network function service instances in a plurality of network function sets, each network function set associated with a network function SI SC. The instructions are further executable to receive unified data at the plurality of NWDAF service instances, the data being unified for transmission and storage in accordance with at least a data type identification and a data collection attribute. The instructions are further executable to perform at least one network data analytics operation at the plurality of NWDAF SIs based on the unified data.

In one aspect of the embodiments presented herein, the unified data received at the plurality of NWDAF service instances is transmitted directly from the network function SI SC, wherein the data is unified in in accordance with the at least a data type identification and a data collection attribute.

In another aspect of the embodiments presented herein, the data received at the plurality of NWDAF service instances is received from a NWDAF SI SC associated with an NWDAF set associated with a subset of the plurality of NWDAF service instances.

In yet another aspect of the embodiments presented herein, the network further includes a storage function (SF) shared with the plurality of NWDAF service instances and at least one NWDAF set in a plurality of NWDAF sets, wherein the unified data as received by the NWDAF service instances is received from the SF.

In yet another aspect of the embodiments presented herein, the instructions are further executable to store a result of the at least one data analytics operation accessible in conjunction with a unified data management (UDM) function of the SF shared with the plurality of NWDAF service instances and the at least one NWDAF set, and to access, via the UDM function, by at least one of a network function and a network management function (OAM), the result of the at least one data analytics operation.

In yet another aspect of the embodiments presented herein, the result pertains to a UE parameter, the UE parameter including at least one of a UE mobility pattern parameter and a UE communication pattern parameter.

In yet another aspect of the embodiments presented herein, the data type identification comprises at least one of an event ID, a protocol data unit (PDU) session ID, a quality of service (QoS) flow ID, a QoS profile ID, a QoS rule, and a packet data filter (PDF).

In yet another aspect of the embodiments presented herein, the data collection attribute comprises at least one of a start collection time, an end collection time, information pertaining to a network slice of the communication network wherein the communication network is a virtualized network, a domain network name (DNN), a user equipment (UE) ID of an individual UE or a group of UEs, a UE location, location information pertaining to at least one of a radio access network (RAN) address, a cell ID, a tracking area that includes one or more cell IDs, a registration area that includes one or more of the cell IDs, and a service area including at least one of a user plane function service area and a control plane service area.

In yet another aspect of the embodiments presented herein, the data comprises at least one of network entity data, network operation data, user equipment (UE) mobility data, network maintenance data, and network measurement reports as acquired by at least one of a UE, an application function (AF) and a network management function (OAM) of the communication network.

In yet another aspect of the embodiments presented herein, at least one of the plurality of NWDAF service instances comprises at least one of a plurality of network entities selected from the group consisting of: electronic devices, radio access network (RAN) functions, user plane functions, control plane functions, and management plane functions and the unified data includes network measurement data acquired at an access node of respective ones of the plurality of the network entities.

BRIEF DESCRIPTION OF THE FIGURES

Further features and advantages of the present invention will become apparent from the following detailed description, taken in combination with the appended drawings, in which:

FIGS. 8A and 8B illustrate an example signaling procedure of storing and sharing analytical data produced by the NWDAF.

It will be noted that throughout the appended drawings, like features are identified by like reference numerals.

DETAILED DESCRIPTION

Embodiments of the present invention are directed towards systems and methods of unifying data transmission and storage in a communication network, including a wireless communication network.

Multiple NF SIs of a NF may be grouped in a NF SI set. The NF SI Set is also called a NF Set. The NF SI set is identified by NF SI Set ID, or NF Set ID. In the NF SI set, the NF SIs may access the NF SI set data storage entity, such as a UDSF SI. Each NF SI set may have a function, e.g. named NF SI Set Coordinator (SC). The NF SI SC may perform generic jobs to coordinate the operation of NF SIs, such as load balancing among NF SIs, selecting a NF SI to fulfill a request from another NF SI. More functionalities of NF SI SC will be described in the present document.

In some implementation, the organization of NF SI in a NF Set may be in multiple levels. One NF SI Set may contain one or more NF instances. One NF instance may be identified by NF instance ID. A NF instance may have address(es) (such as FQDN or IP address(es)) for other NFs to communicate. One NF instance may have one or more NF Service Sets, each NF Service Set is identified by NF Service Set ID. One NF Service Set may have address(es) for other NFs to communicate. One NF Service set may have one or more NF service instances (SI). Each NF SI may have a service name, NF SI ID, and endpoint address(es) to communicate with other NFs. A NF Service Instance may provide one or more services to other NF consumers.

When a NF (i.e. a service consumer or consumer) uses a service of another NF (i.e. service producer or producer), the NF producer may indicate the binding level to the NF consumer. For example, the level of binding could be NF SI, NF Service Set, NF instance, or NF set. The binding indication may include NF SI ID, NF Service Set ID, NF Instance ID, NF Set ID. The NF consumer may send a message to the address of NF entities, such as NF SI address, NF Service Set address, NF instance address, or NF Set address provided by the NF producer. In the following embodiments, the binding level is NF SI Set (or NF Set), NF instance, or NF SI for illustration purposes. It means that a NF set, NF instance or NF SI may be discovered and provide services to other NFs.

Figure 1:
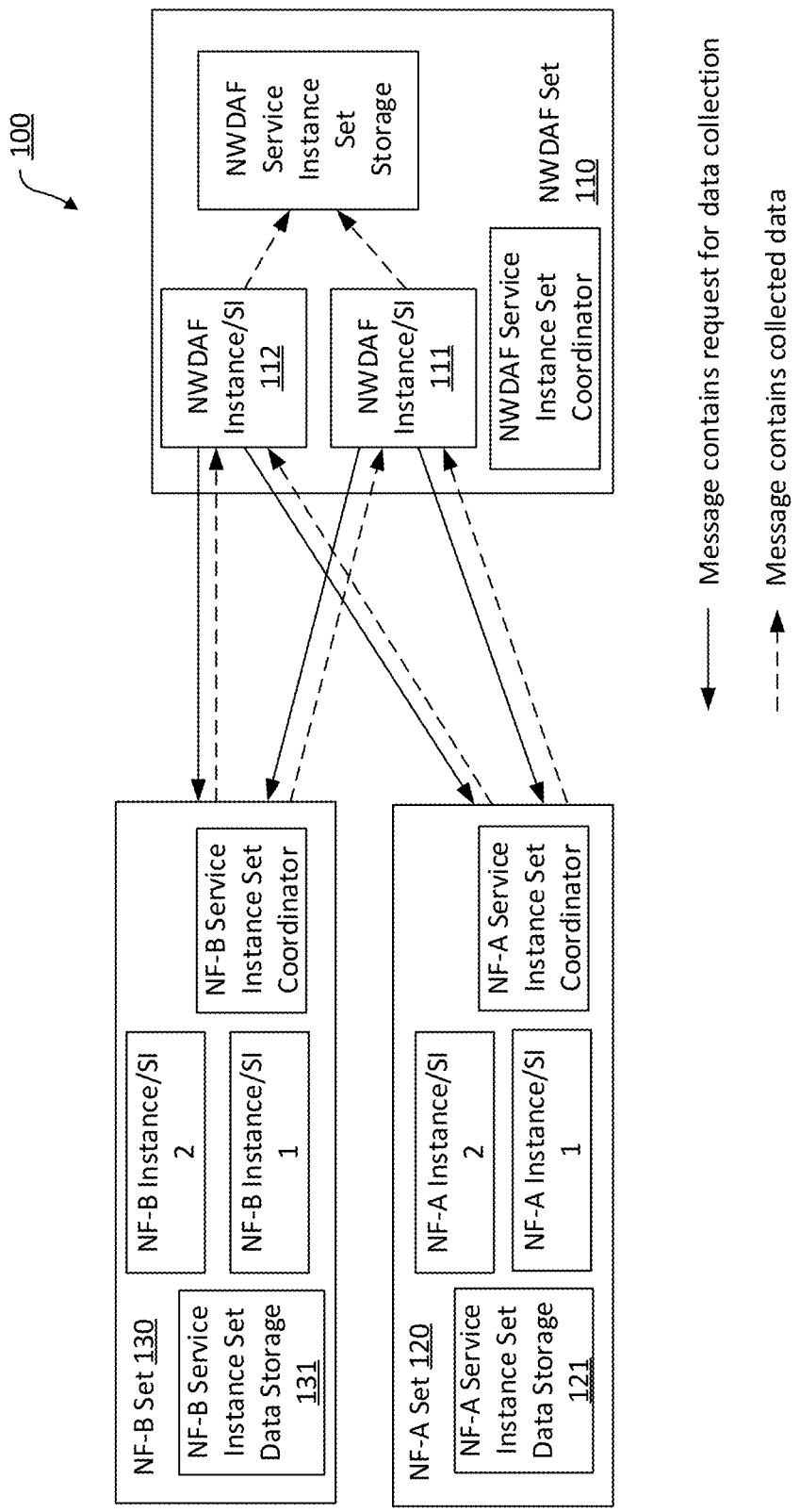
FIG. 1 illustrates, in an example embodiment, data collection by different network data analytics function (NWDAF) SIs in a communication network.
Figure 2:
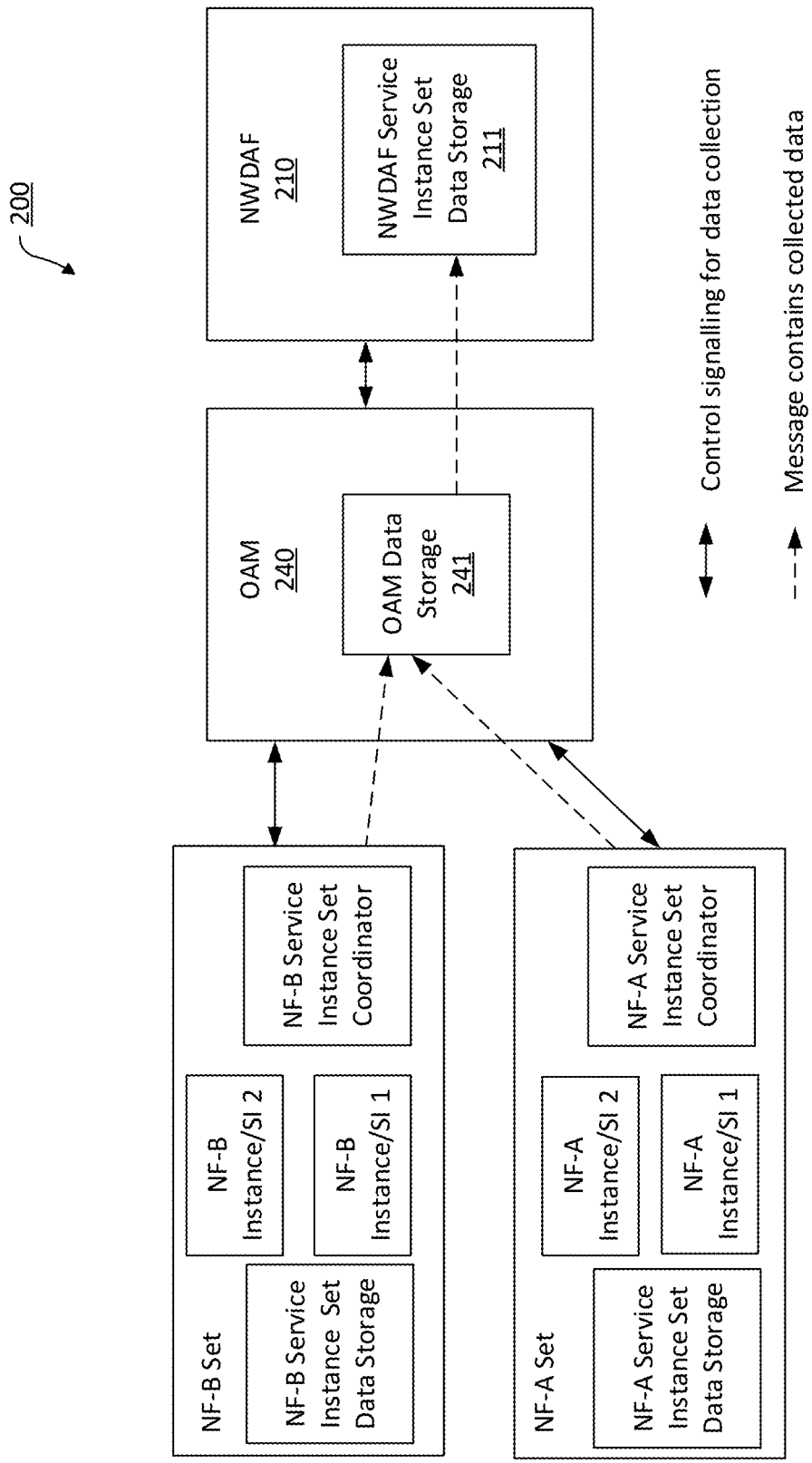
FIG. 2 illustrates an example embodiment where a network management function (for example OAM system) shares collected data with the NWDAF.
Figure 3A:
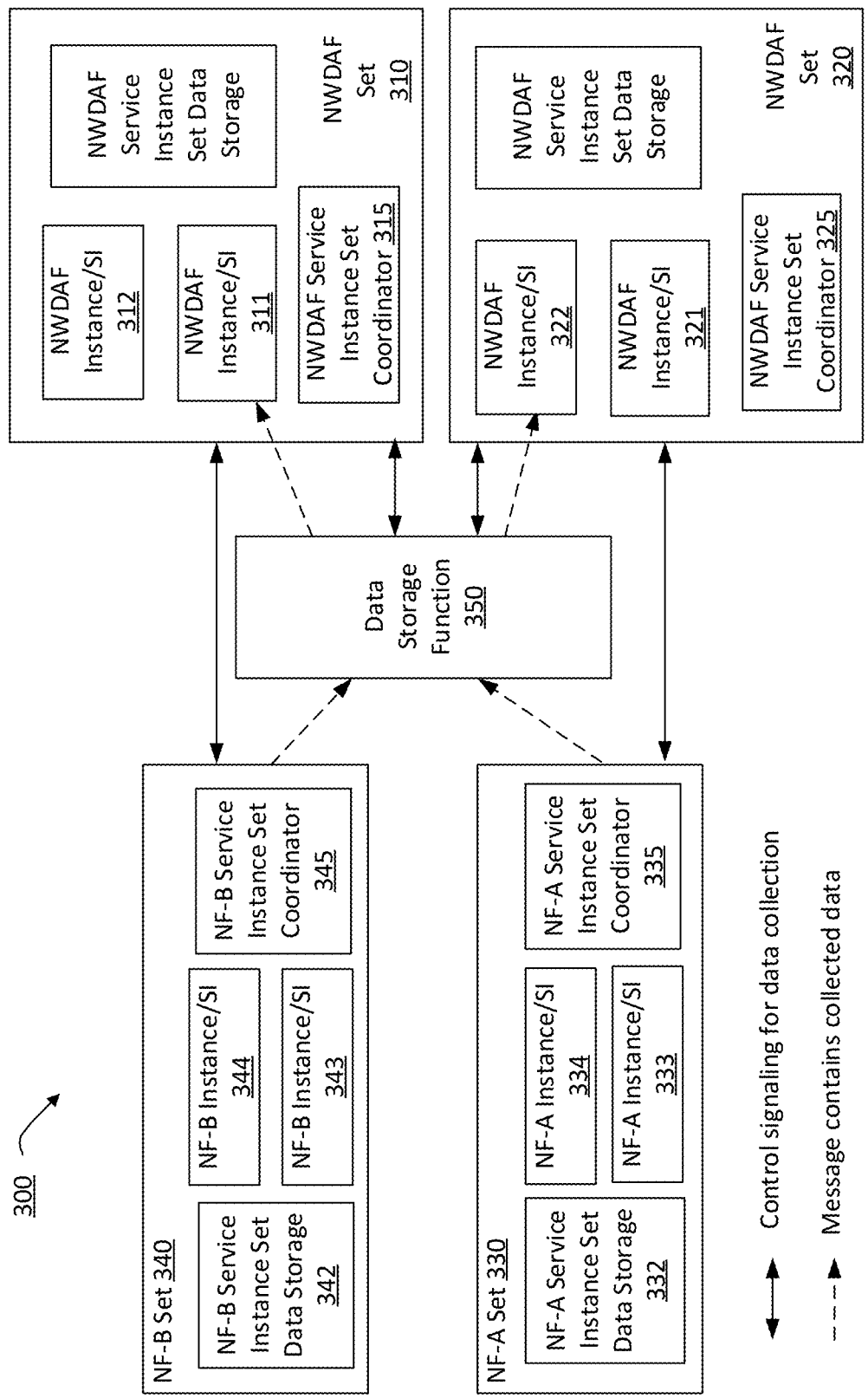
FIG. 3A illustrates, in an example embodiment, a scheme of sharing a storage function among the NWDAF SIs.

FIG. 3A illustrates, in an example embodiment, a storage scheme 300 of sharing a storage function among NWDNA instance(s) or NWDAF SIs (e.g. NWDAF instance/SI 311, NWDAF instance/SI 312, NWDAF instance/SI 321 and NWDAF instance/SI 322). In this example architecture, each NWDAF instance/SI of a NWDAF instance/SI set (e.g. NWDAF SI set 310 and NWDAF SI set 320) may request or subscribe for operation data of one or multiple NF (SI) sets (e.g. NF-A set 330 and NF-B set 340). In the data collection request message, the NWDAF instance/SI (e.g. NWDAF instance/SI 311, NWDAF instance/SI 312, NWDAF instance/SI 321 and NWDAF instance/SI 322) may indicate an identifier of the (data) storage function 350, for example, IP address or Fully Qualified Domain Name (FQDN) of the storage function 350.

The type of data to be collected may be represented by a Data Type Identifier (ID). In some embodiments, the Data Type ID could be an Event ID as described in 3GPP TS 23.502, clause 4.15.1. For example, the SMF may provide PDU Session data, which is represented Data Type ID as "PDU Session Context Data". The PDU Session Context Data may include PDU Session ID, QoS Flow IDs, QoS Profiles, QoS Rules, Packet Data Filter, start and end times (or time stamp) of PDU Session, traffic volume, the times (or time stamps) the user plane (UP) N3 and/or N9 interfaces are activated or deactivated, measured traffic volume of each QoS flow, measured QoS parameters such as measured maximum flow bit rate (MFBR) of QoS flows, measured UE aggregate maximum bit rate (UE-AMBR).

Each Data Type may have a set of Data Collection Attributes, which may include one or more of attributes such as:
 a. Start Collection Time;
 b. End Collection Time;
 c. Network Slice information: e.g. Network Slice Instance Identifier (NSI ID), Single Network Slice Selection Assistance Information (S-NSSAI);
 d. DNN;
 e. Internal Group ID of UEs;
 f. UE IDs (e.g. Subscription Permanent Identifier (SUPI), Generic Public Subscription Identifier (GPSI));
 g. Location information: RAN Address(es), Cell ID(s), tracking areas (e.g. each tracking area include one or multiple Cell IDs), registration areas (e.g. each registration area may include one or multiple tracking areas), User Plane Function (UPF) service area, control plane (CP) function service area (e.g. AMF service area, SMF service area); and
 h. Application Information (e.g. Application ID, or Service-Application ID of Application Function).

For illustration purposes, NF-A SI set 330 or NF-B SI set 340 will be used in the remainder of the disclosure herein.

The NF SI SC (e.g. NF-A SI SC 335) of each NF SI set (e.g. NF-A set 330) receives the request for data collection. The NF SI SC shall identify whether the requested data collection has been fully or partially requested by another NWDAF SI of the same NWDAF SI set. If the requested data is the same, the NF-A SI SC 335 may not request the NF-A instance(s)/SI(s) (e.g. NF-A instance/SI 333, NF-A instance/SI 334) to send the data in order to avoid duplicated data collection. If the requested data is the same, but some attributes are different, for example the collection time is different, the NF SI SC may send a message to the NF instance/SI to modify the data collection attributes. One method to modify (or update) existing subscription is to send unsubscription message to unsubscribe the existing subscription and send another subscription message carrying the new data collection attributes.

The NF-A SI SC 335 then forward the data collection request of the NWDAF SIs (e.g. NWDAF instance/SI 311, NWDAF instance/SI 312, NWDAF instance/SI 321 and NWDAF instance/SI 322) to the NF-A instance/SI (e.g. NF-A instance/SI 333 or NF-A instance/SI 334) that can provide requested data. For example, in one SMF set, some SMF instances/SIs may have capabilities to handle eMBB IP PDU Session type, some other SMF instances/SIs may have capabilities to handle Ethernet PDU Session type. If the data collection is requested for IP PDU Session type, the SMF SI SC may forward the data collection request to the SMF SIs that handle the IP PDU Session type.

In the embodiment illustrated, the NF-A instance/SI (e.g. NF-A instance/SI 333 or NF-A instance/SI 334) may send network data to the storage function 350 directly or indirectly via NF-A SI SC 335.

The system described in FIG. 3A may be modified in different ways. For example some functionalities of coordinator functions of NF Set (such as NWDAF SI SCs 315 and 325, NF-A SI SC 335 and/or NF-B SI SC 345) may be implemented in the Data Storage Function. In one example shown in FIG. 3B, when the NWDAF SI SC 315 receives data request from NWDAF service instance(s) 311/312, the NWDAF Set Coordinator 315 may not necessarily check whether the data has been previously requested or subscribed. The NWDAF SI SC 315 may create a data request message and send this to the Data Storage Function 350. The Data Storage Function 350 may communicate with other NFs to perform data collection. The Data Storage Function 350 may check whether the data has been collected before or not collected, or whether an existing data collection operation needs to be modified to accommodate the data request of the NWDAF SI SC 315.

Figure 3B:
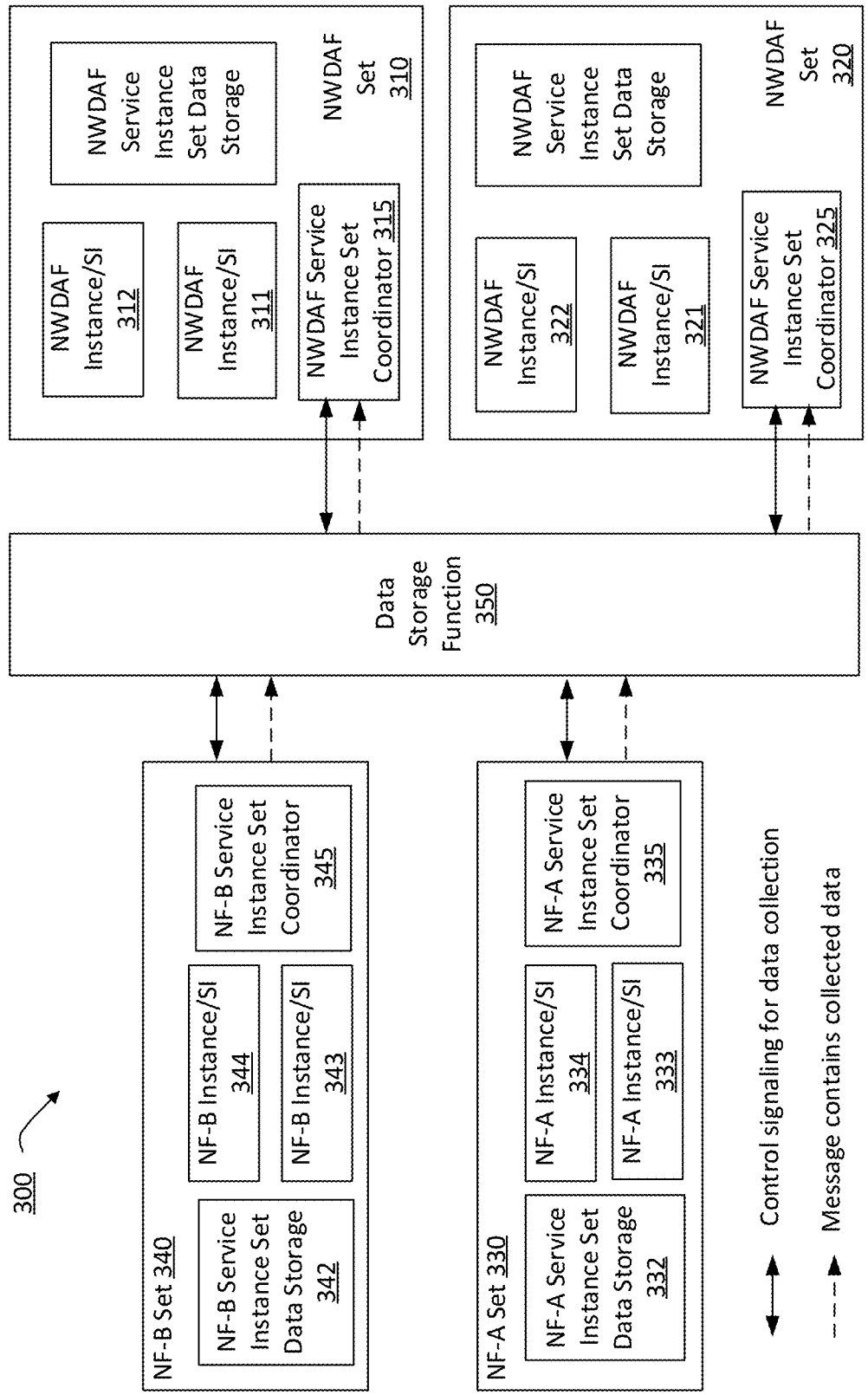
FIG. 3B illustrates an alternative scheme of sharing a storage among NWDAF SIs, in which the data storage function takes a more active role and coordinates with NWDAF SI set coordinators.
Figure 3C:
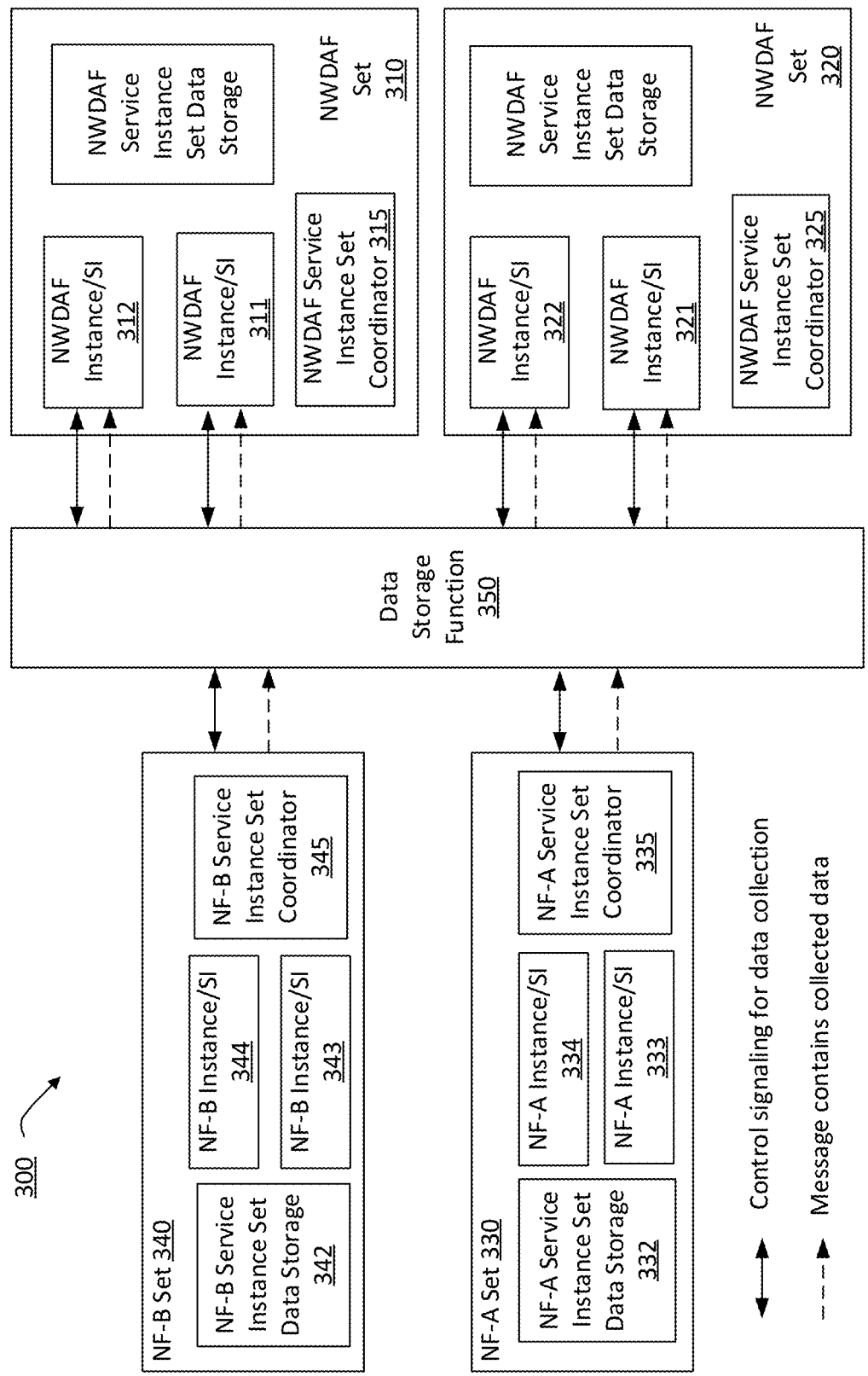
FIG. 3C illustrates an alternative scheme of sharing a storage among NWDAF SIs, in which the data storage function takes a more active role and coordinates with NWDAF SIs.

In another example shown in FIG. 3C, the NWDAF instances/service instances (e.g. NWDAF instances/service instances 311, 312, 321 and 322) may directly send data requests or data subscriptions to the Data Storage Function 350, instead of NWDAF Service Instances Set Coordinators 315 and 325. The data collection and storage management functionalities are moved from the NWDAF SI SCs 315 and 325 to the Data Storage Function 350. The Data Storage Function 350 may communicate with other NFs to perform data collection. The Data Storage Function 350 may check whether the data has been collected before or not collected, or whether an existing data collection operation needs to be modified to accommodate the data request of the NWDAF SI SC 315 and 325. The Data Storage Function 350 stores the collected data and may send the collected data to NWDAF service instance(s) (e.g. NWDAF instance/service instances 311, 312, 321 and 322) of one or multiple NWDAF Sets 310 and 320.

According to embodiments of the present invention, NWDAF service instances coordinate, for example via NWDAF SI SCs. Furthermore, a data storage function is introduced which can be used to store data retrieved for provision to the NWDAF instances/service instances. The data storage function may, in some cases, include a coordinator function which coordinates the provision of data to the NWDAF instances/service instances. Coordinating may include removing redundancy of messaging, data storage, or both, when multiple NWDAF service instances request the same data. The redundancy removal can correspond to consolidating messaging operations, data storage operations, or both, among duplicate operations. This may involve identifying duplicate or redundant data requests. Screening or filtering of duplication can be performed by a coordinator which resides in the NWDAF service instance set, NF service instance set, or data storage function. The data storage function may be operatively coupled to multiple NWDAF service sets.

In various embodiments, the NWDAF SI SC (also referred to as framework function) handles data collection on behalf of one or more NWDAF instances or service instances in a service instance set. NF SI SCs may collect required data and send it to the NWDAF SI SC, NWDAF service instances, or both. The data is sent via the data storage function, which may store the data for expedited retrieval, for example if the same data is subsequently requested again.

In various embodiments, the coordinator in the data storage function receives data requests from the NWDAF SI SCs, or NWDAF instances, or NWDAF service instances, determines whether the data has already been collected and stored in the data storage function, and, if necessary, request the data from NFs on behalf of the NWDAF SI SCs or NWDAF service instances. As such, the data storage function can process data requests from the NWDAF to mitigate duplications in data requests, responses, and storage, while also providing previously collected data to the NWDAF when available.

As such, a coordinator function, which can be implemented in a network for example using computing and communication equipment in a datacenter, operates to support data analytics. The coordinator can be associated with one of: a network data analytics function (NWDAF) service instance set (or NWDAF set); a network function service instance set (or NF set); and a data storage function separate from the NWDAF service instance set and the network function service instance set. The coordinator may operate to determine a data item that is commonly required by more than one NWDAF service instances in the NWDAF service instance set. This may involve receiving multiple requests for such a data item and identifying redundancies inherent in the multiple requests. The coordinator may then remove these redundancies. The coordinator may initiate communication of the data item from the network function service instance set, the data storage function, or both, toward the more than one NWDAF instances or NWDAF service instances. This initiating may involve initiating retrieval of the data item from a NF instance or NF service instance or data storage function. The initiating may involve checking if the data item is stored by the data storage function. Communication of the data item may include transmitting a message containing part or all of a single instance of the data item so that the more than one NWDAF instances/service instances receives the data item based on communication of that same single instance. In other words, although multiple NWDAF instances/service instances may receive the data item, the communication of the data item to different ones of the NWDAF instances/service instances may be at least partially merged to remove redundancy.

When the coordinator is associated with the NWDAF service instance set, initiating communication of the data item may include requesting the data item from the network function service instance set, and communication of the data item may include transmitting the message from the data storage function upon notification, by the network function service instance set, of the request from the coordinator. The coordinator may accordingly transmit a first request to the network function service instance set, indicating that the data item is required by an identified subset of the more than one NWDAF instances/service instances in the NWDAF service instance set. Communicating the data item may then involve the coordinator receiving a message including the data item. Furthermore, the data storage function may receive a message indicating the data item is requested by the coordinator.

When the coordinator is associated with the network function service instance set, initiating communication of the data item may include instructing the data storage function to transmit the data item toward the more than one NWDAF instances/service instances in one message or multiple messages. The more than one NWDAF instances/service instances may be included in one NWDAF service instance set or in different NWDAF service instance sets. Initiating communication of the data item may include transmitting the data item from the network function service instance set to the data storage function.

When the coordinator is associated with the data storage function, determining the data item may be based on one or more requests from one or both of: one or more other coordinators of the NWDAF service instance set as in FIG. 3B, and one or more of the NWDAF instances or NWDAF service instances as in FIG. 3C. Initiating communication of the data item may include initiating the data storage function to communicate the data item when the data item is stored by the data storage function, and, otherwise, initiating providing the data item from the network function service instance set to the data storage function when the data item is absent from storage of the data storage function. When providing the data item from the network function service instance set, the coordinator may request the data item from the network function service instance set. Upon receipt of the data item at the data storage function, the data storage function or coordinator may store the data item and forward the data item toward the more than one NWDAF instances or NWDAF service instances.

Figure 4A:
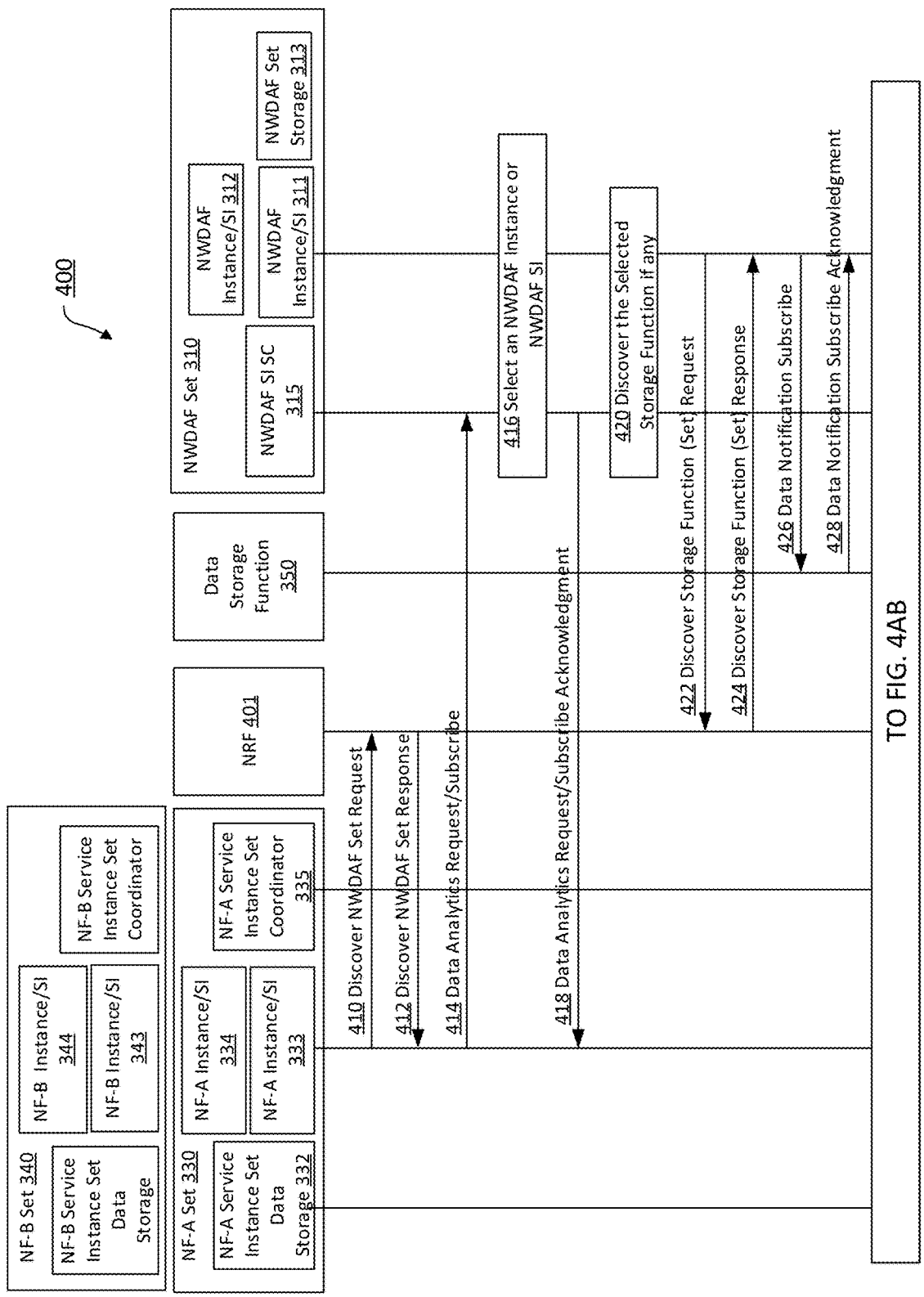
FIGS. 4AA to 4AC illustrate an example signaling procedure for data collection and data analytics provisioning.
Figure 4A:
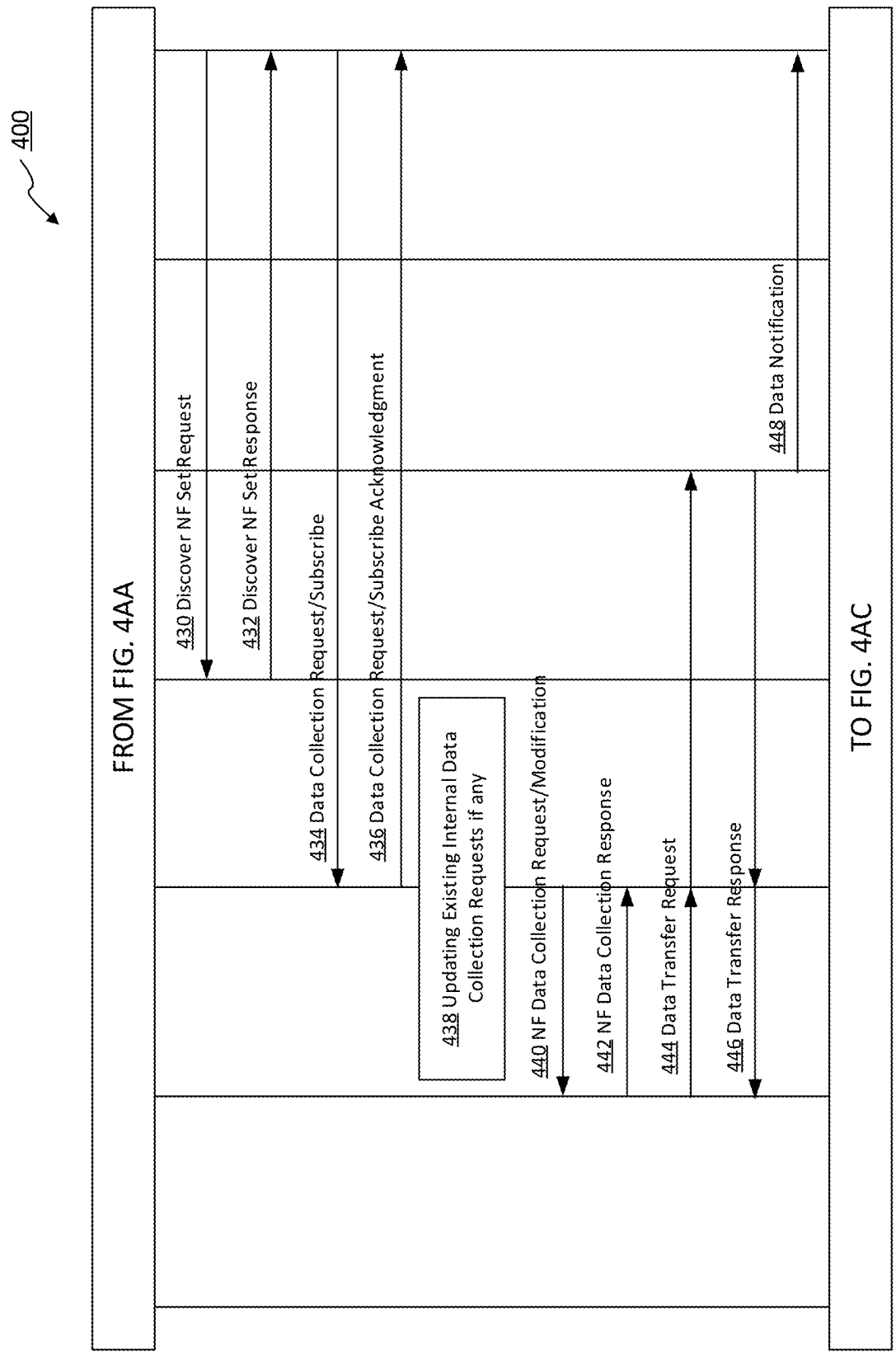
Figure 4A:
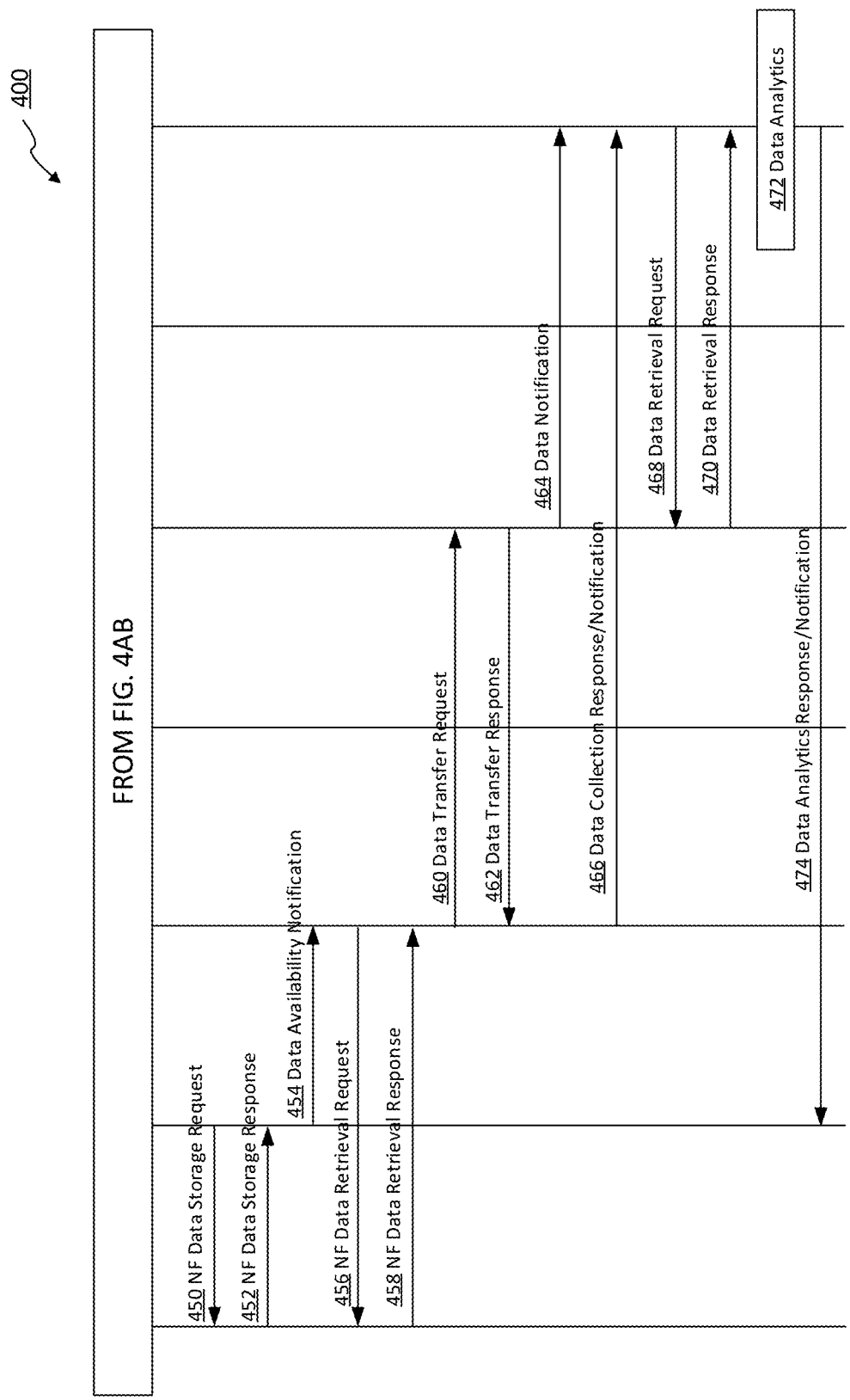

FIGS. 4AA to 4AC illustrate an example signaling procedure 400 for data collection and data analytics provisioning, including a detailed procedure to support data collection and provision of analytic results. In this illustrated procedure, there are two representative NF sets, NF-A set 330 and NF-B set 340, and one NWDAF set 310. Each NF set has two NF SIs for illustration purposes. The data storage function 350 could be Unified Data Repository (UDR), or UDSF, or any storage function.

In the embodiment illustrated, each of the NWDAF instances/SIs 311 and 312 may perform discovering NF Set(s) (e.g. NF-A set 330 and NF-B set 340), and/or NF Subset(s), and/or NF SI(s) (e.g. NF-A instance/SI 333, NF-A instance/SI 334) that can provide network data for data analytics. The NF Subset may serve a service area, the NF Subset may be represented by NF Subset ID or NF Service Zone ID. The NF Subset may be also called NF SI Sub set.

When a NF SI or NF Set is instantiated, the NF SI or NF Set registers itself with the NRF 401 by providing NF profile or metadata to the NRF 401. The NF profile may include the information described in 3GPP TS 23.501, clause 6.2.6, published in December 2018, version 15.4.0, and some other information. For example, the NF profile or metadata of NWDAF SI set 310, or NWDAF SI subset, or NWDAF instance/SI 311/312 may include one or more of information: types of data analytic service(s) that can be provided by the NWDAF SI set 310, or NWDAF SI subset, or NWDAF instance/SI 311/312 (for example mobility management, traffic routing, UPF load, IoT security, UE mobility pattern, UE communication pattern), address of NWDAF (e.g. IP address, or FQDN, or ID), Public Land Mobile Network (PLMN) ID, S-NSSAI(s) that the NWDAF can serve, Service Area and/or Service Zone ID, Service Instance ID, Set ID, Subset ID, number of SIs in the NF set or in the NF subset, PLMN ID, UE IDs, UE group information (e.g. Internal Group ID, External Group ID), Local Area Data Network (LADN) ID(s), Public Land Mobile Network (PLMN) ID(s).

The SF Profiles may include one or more of following information:

a. Storage capacity (e.g. 10 Terabyte) and current used capacity (e.g. 5 Terabyte);

b. Supported communication rate: for example, 10,000 queries per second, 1 GByte/s data rate. This parameter helps the NWDAF to select the storage function to meet its processing requirements. For example, some data analysis needs many data queries, but the size of data is small. Analyzing the UE mobility pattern could be an example for this type of data queries. Some functions such as AMF or SMF may regularly request the UE mobility pattern analysis. In some other example, the number of query is small, but the amount of data is large. For example, analyzing the traffic routing and QoS or QoE. The NWDAF instance/SI 311 or 312 may once a day analyze the QoS or QoE performance of many UEs. The NWDAF instance/SI may send one request to the storage function to get data from a group of UE having 1 million UEs for example. The storage function may send back many, such as 10 million data records of the 1 million UEs.

c. Data Type(s): for example, data collected from UE(s) such as QoS, QoE information, UE location information; data collected from NF such as PDU Session information, UE location information.

d. Data Type ID(s) and Data Collection Attribute(s) currently collected by other NWDAF Set(s) and/or NWDAF instance(s)/SI(s). The NWDAF instance/SI 311 or 312 may use this information to identify other NWDAF Set(s) or NWDAF instance(s)/SI(s) that is/are collecting the same Data Type ID(s) with the same or different Data Collection Attributes. The NWDAF instance/SI 311 or 312 may use this information to avoid duplicated data collection. For example, the NWDAF instance/SI 311 or 312 may not send data collection request or data collection subscribe to the same NF Set(s) 330 or 340 and/or NWDAF instance(s)/SI(s) 311 or 312 that already provide the same data to be collected. The NWDAF instance/SI 311 or 312 may adjust the Data Collection Attributes to avoid duplicated data collection, in which the Data Type ID is requested by two or more NWDAF Sets and/or two or more NWDAF instances/SIs having the same or partial Data Collection Attributes.

e. SF address, such as IP address or FQDN of SF set, or SF subset, or SF SI.

After a NF SI set (e.g. NF-A set 330 and NF-B set 340) or NF SI subset, or NF SI registers with the NRF 401, the NRF 401 may subscribe this NF SI set, or NF SI subset, or NF SI to receive the load information. In case of NWDAF, the NWDAF instance/SI 311 or 312 set may provide load information such as how many NWDAF instance/SIs are currently busy or free, or the percentage of resources of NWDAF set is currently busy or free.

Referring to FIG. 4AA, an NF instance/SI (e.g. NF-A instance/SI 333), at step 410, needs to use a data analytic service of NWDAF. The NF-A instance/SI 333 sends a message to the network repository function (NRF) (e.g. NRF 401) to discover NWDAF set 310 and/or an NWDAF instance/SI (e.g. NWDAF instance/SI 311). The message may carry one or more of following information: Service type of the NF-A instance/SI 333, service type of NWDAF or Type(s) of Data Analytic Service of NWDAF (e.g.

mobility management, traffic routing, UPF load, IoT security, UE mobility pattern, UE communication pattern), duration to use the data analytic service (such as start and end times the NF-A instance/SI 333 may use data analytic service(s)), network information (such as S-NSSAI(s), NSI-ID(s), DNN(s), PLMN ID(s), LADN ID(s)), UE Information (such as Internal Group ID, UE ID(s)), Application information (such as Application ID), NF information (such as NF IDs). The data analytic service will be performed based on the input information.

The message at step 410 may be implemented by using NF discovery service of the NRF 401, such as Nnrf_NF-Discovery service described in 3GPP TS 23.502, clause 5.2.7.3. The NF-A SI 333 may send Nnrf_NFDiscovery_Request message to the NRF 401 to discover the NWDAF set 310 or NWDAF instance/SI 311 that can support the requested service of NF-A SI 333.

At step 412, the NRF 401 may send information, such as NF profile or metadata, to identify NF Set, which is e.g. NWDAF set 310, and/or NF instance ID, which is NWDAF instance; and/or NF SI, which is e.g. NWDAF SI 311. The NWDAF set 310 may be identified by NF Set ID, which is NWDAF set ID (identifier), and/or NF Set address(es), which is NWDAF set IP address(es), and/or FQDN of NWDAF SI 311. The NWDAF instance may be identified by NWDAF instance ID, and or NWDF Set ID. The NWDAF SI 311 may be identified by NWDAF set ID, and/or NWDAF Subset ID, and/or NWDAF Service Set ID, and/or NWDAF SI Set ID, and/or NWDAF instance ID, and/or NWDAF SI ID. The NWDAF Subset ID and NWDAF SI ID could be IP address(es), or FQDN.

In some embodiments, the NWDAF instance/SI 311 may be accessible by other NF instances/SIs. In such case, the NWDAF SI ID and/or NWDAF SI endpoint address(es) could be used by other NF instances/SIs to request the one or more data analytic services.

In some other embodiments, the NWDAF SI 311 is hidden inside the NWDAF SI set 310. In this case, the NRF 401 may provide the NF-A instance/SI 333 with the NWDAF SI set ID and/or NFWDAF address(es) only.

In another embodiment, a NF SI set may be distributed in multiple data centers or geographical locations. In this case, the NRF 401 may provide NF-A SI 333 with the NWDAF SI set ID, and/or NWDAF SI subset ID (or NWDAF service zone ID).Using the NF received from NRF, the NF-A instance/SI 333 may select a NWDAF SI set 310, or NWDAF SI subset, of NWDAF instance/SI 311.

At step 414, the NF-A instance/SI 333 may send a Data Analytics Request or Data Analytics Subscribe message to the NWDAF SI set 310, or NWDAF instance/SI 311 to request or subscribe for analytical data.
  a. If the NRF 401 provided NWDAF SI set ID, the NF-A instance/SI 333 sends the message to the address of NWDAF SI set 310 which has NWDAF SI set ID;
  b. If the NRF 401 provided NWDAF SI set ID and/or NWDAF SI subset ID, the NF-A SI 333 sends the message to the address of NWDAF SI subset which has NWDAF SI subset ID.
  c. If the NRF 401 provided NWDAF SI ID, the NF-A instance/SI 333 sends the message to the address of NWDAF instance/SI 311 that has NWDAF instance/SI ID.
  d. If the NRF 401 provided NWDAF SI set ID and/or NWDAF service set ID, the NF-A instance/SI 333 sends the message to the address of NWDAF service set which has NWDAF service set ID.

The message from NF-A SI 333 may carry one or more of following information: Type(s) of Data Analytic Service, Data Analytic Attributes. The Data Analytic Attributes may include one or more of following attributes:
  a. Network information: e.g. PLMN ID(s), S-NSSAI(s), NSI-ID(s), Data Network Name(s) (DNN)(s), Data Network Access Identifier(s) (DNAI)(s);
  b. UE Information: UE ID(s) (e.g. SUPI, GPSI), Internal Group ID;
  c. NF information: e.g. UPF ID(s), AMF Set ID, RAT, RAN ID(s), Cell ID(s);
  d. Application Information: such as Application ID, AF-Service-ID; and
  e. Data Analytics Duration: In case the NF-A instance/SI 333 sends the subscription message, the NF-A instance/SI 333 may indicate when the NF-A instance/SI 333 wants to receive the analytical data in the past or in the future, and specific period(s) during the day the NF-A instance/SI 333 may receive the analytic data. For example, the NF-A SI 333 may want to receive analytical data from a day 1 to a day 2, and/or at 1:00-1:30 AM, and/or every days of the weeks.

In one embodiment, the signaling and messaging of step 414 may be implemented by using NWDAF services such as Nnwdaf_AnalyticsInfo_Request or Nnwdaf_EventsSubscription_Subscribe as described in 3GPP TS 23.502 Version 15.3.0. The NF-A instance/SI 333 may include some of the parameters described above in the Nnwdaf_AnalyticsInfo_Request or Nnwdaf_EventsSubscription_Subscribe messages. The NWDAF may provide analytical information to the NF-A instance/SI 333 according to the information provided Data Analytic Attributes. For example, if the Type(s) of Data Analytic Service is UE mobility analytical information, and the target UE ID is provided in the UE information, the NWDAF will provide UE mobility analytical information for the target UE ID.

At step 416, if the NF-A SI 333 sent the NWDAF Set ID and/or NWDAF subset ID, the NWDAF SI SC function (or may be called NWDAF Framework function) 315 may receive the message from NF-A SI 333. The NWDAF SI SC function 315 may select an NWDAF instance or NWDAF SI, such as NWDAF instance/SI 311 to provide data analytic service for the NF-A SI 333.

At step 418, the NWDAF SI SC 315 or the selected NWDAF instance/SI 311 may send a Data Analytic Request/Subscribe Acknowledgment to the NF-A instance/SI 333. This message may include one or more of following information: the NWDAF SI ID that was selected to serve the NF-A instance/SI 333 request/subscribe.

At step 420, the NWDAF SI SC 315 may check whether a (data) storage function (e.g. data storage function 350) has been selected or not. A storage function needs to be selected so that the collected data from NFs, UEs, AF may be stored in this storage function. If a storage function has been selected, either by NWDAF SI SC 315, or by NWDAF instance/SI 311, the storage function ID may be stored in the NWDAF SI SC 315 and/or NWDAF instance/SI 311. The NWDAF instance/SI 311 and NWDAF SI SC 315 may communicate to identify the selected storage function. The (data) storage function 350 could be any storage function, such as a UDR SI Set and/or UDR SI of a UDR Set; or a UDSF SI Set and/or UDSF SI of a UDSF Set.

At step 422, if the (data) storage function 350 was not selected, or a storage function needs to be re-selected, the NWDAF instance/SI 311 may send a Discover Storage Function Request or Discover Storage Function Set Request message to the NRF 401. The message may include one or more of following information: the Type(s) of Collected Data or Data Type ID(s) (e.g. PDU Session Context information, QoS information, QoS Notification Control message, UE Mobility information), duration of data collection, time of the day the data may be collected, service area, internal group ID of UE group(s), UE ID(s), external group ID, S-NSSAI.

At step 424, the NRF 401 may send one or more SF profiles of, for example, Storage Function (SF) SI Set(s), SF SI Subset(s), SF Instance(s), SF service set, or SF SI(s). The (data) storage function 350 could be UDSF, UDR or any storage function. The NWDAF instance/SI 311 may select a SF SI set, or SF SI subset, of SF instance, or SF SI from the SF profiles provided by the NRF 401.

At step 426, the NWDAF instance/SI 311 may send a Data Notification Subscribe message to the selected SF Set, or SF Subset, or SF instance, or SF SI ID for the Data Type ID(s). The message may include Data Type ID(s), one or more attributes of Data Collection Attributes of each Data Type ID, such as S-NSSAI, DNN, UE locations, NF address(es), Internal Group ID.

The messaging of step 426 may be implemented, for example, by using data management subscribe service of UDR, Nudr_DM_Subscribe. The NWDAF instance/SI 311 may request data collection from other NFs, such as AMF. The AMF instances/SIs may send collected data to the UDR. The UDR will notify the NWDAF instance/SI 311 that new data is available by using Nudr_DM_Notify service. The UDR may send only one notification for a block of data, such as every 100 data records. The UDR may send only one notification for a block of data when the amount of collected data reaches a threshold, for example 10 Mbyte of data. The UDR may send one notification at a specific time of the day for example at 1:00 AM every day. The notification may indicate the Data Type ID(s) and may include one or more associated information such as NF IDs that provided the data, time duration, UE locations, UE Group ID (e.g. Internal Group ID, UE ID(s).

At step 428, the SF 350 SI Set, or SF 350 SI Subset, or SF 350 instance, or SF service set, or SF 350 SI may send a Data Notification Subscribe Acknowledgment to the NWDAF instance/SI 311 to acknowledge the reception of messages in step 426.

Now Referring to FIG. 4AB, at step 430, the NWDAF instance/SI 311 may need to collect data from one or multiple network functions, such as NF-A set 330 and NF-B set 340. For illustration, the NWDAF instance/SI 311 may need to collect data from NF-A set 330. The NWDAF instance/SI 311 may send a request to discover NF(s), may include and not limited to, NF-A Set 330 and/or NF-A Subset, and/or NF-A instances/SIs 333 and 334, to the NRF 401. The NWDAF instance/SI 311 may include one or more of following information:
  a. Network information: e.g. PLMN ID(s), S-NSSAI(s), NSI-ID(s), DNN(s), DNAI(s) to collect data from;
  b. UE Information: UE ID(s) (e.g. SUPI, GPSI), Internal Group ID to collect data;
  c. NF information: e.g. UPF ID(s), AMF Set ID, RAT, RAN ID(s), Cell ID(s) to collect data;
  d. Application Information: such as Application ID, AF-Service-ID to collect data.
  e. Location information: e.g. geographic zone ID(s), (R)AN ID, cell (ID);
  f. Duration of storage: e.g. the start and end time that the SF 350 will store the data;
  g. Required storage capacity: the estimated storage capacity that may be required to store the collected data; and
  h. Data Type ID(s): Type of data to be collected.

The NWDAF instance/SI 311 may use NRF 401 services such as Nnrf_NFDiscovery service to discover NF SI Set(s) (e.g. NF-A set 330 and NF-B set 340), NF SI Subset(s), NF instance(s), NF service set, NF SIs (e.g. NF-A instance/SI 333, NF-A instance/SI 334, NF-B instance/SI 343, NF-B instance/SI 344). The NWDAF instance/SI 311 may use Nnrf_NFManagement_NFStatusSubscribe to subscribe for new NF registration, deregistration, or NF profile updates.

At step 432, based on input information provided by the NWDAF instance/SI 311, the NRF 401 may profile NF profile(s) of one or multiple NF SI Sets 330 and 340, and/or NF SI Subset(s), and/or one or multiple NF instance(s), and/or multiple NF service set(s), and/or one or multiple NF SIs 333, 334, 343 and 344.

Based on the NF profile information from the NRF 401, the NWDAF instance/SI 311 may select a NF Set(s), and/or NF Subset(s) and/or NF instance(s), and/or NF Service Set, and/or NF SI to send data collection request or subscription to the address of the selected NF entities. In this embodiment, the NF-A 330 is selected for the NWDAF instance/SI 311 to collect data as an example. But in general, the NWDAF instance/SI 311 could select any NF to collect network data for its analysis.

At step 434, if the NRF 401 provided the NF-A Set ID(s) and/or NF-A Subset ID(s), and/or NF-A instance(s), and/or NF-A service set(s), the NWDAF SI 311 may send a Data Collection Request/Subscribe to the address of NF-A Set 330 or NF-A Subset, NF-A instance(s), or NF-A service set, which is received by the NF-A SI SC 335 that manages NF-A Set 330 or NF-A Subset, or NF-A instance(s), NF-A service set(s), or NF-A SI(s). For illustration, the NF-A SI SC 335 receives the request from the NWDAF instance/SI 311. The message may include one or more of following information:
  a. Network information: e.g. PLMN ID(s), S-NSSAI(s), NSI-ID(s), DNN(s), DNAI(s) to collect data from;
  b. UE Information: UE ID(s) (e.g. SUPI, GPSI), Internal Group ID to collect data;
  c. NF information: such as NF Set ID(s), NF Subset ID(s), NF SI ID(s), e.g. UPF ID(s), AMF Set ID, RAT, RAN ID(s), Cell ID(s) to collect data;
  d. Application Information: such as Application ID, AF-Service-ID to collect data.
  e. Location information: e.g. geographic zone ID(s);
  f. Duration_information: e.g. the start and end time that the data will be collected, it could be immediately or at certain time in the future. The end time may be omitted, which means that the NWDAF instance/SI 1 may send another message to unsubscribe data collection;
  g. Type(s) of Collected Data: e.g. PDU Session information (start and end time of PDU Session, QoS Profiles, QoS Rules, Type of PDU Session, S-NSSAI, DNN), UE location, Event ID(s);
  h. The ID or address (e.g. IP address or FQDN) of SF set, or SF subset, or SF instance, or SF service set, or SF SI, where the collected data may be sent to; and
  i. The ID, and/or address (e.g. IP address or FQDN) of NWDAF set, or NWDAF subset, or NWDAF instance, or NWDAF service set, or NWDAF SI that sends the data collection request. The NF-A instance/SI or NF-A SI SC may use this ID or address to send the collected data to, or to send collected data notification, or to acknowledge the request.

The messaging of step 434 may be implemented by using event exposure services of NFs. For example, the SMF may provide Nsmf_EventExposure_Service, where the NWDAF instance/SI 311 may subscribe for session management events, such as PDU Session Release event.

At step 436, the NF-A SI SC 335 may send a Data Collection Request or Subscribe Acknowledgment to the NWDAF instance/SI 311. This is to confirm that the NF-A SI SC 335 has received the request for data collection.

In some embodiments, step 438 may be performed after step 434 and before step 436. In some other embodiments, step 438 may be performed after step 436.

At step 438, the NF-A SI SC 335 may check for the following conditions to avoid duplication of data collection:

a. If some other NF instance(s)/SI(s) of the same NF set (which is NWDAF set 310 in this embodiment) have requested the same Type of Data with the same Data Types (the same Data Type ID(s)) with the same or different Data Collection Attributes. If some other NF instances/SIs (which is NWDAF instances/SIs 311 and 312 in this embodiment) have requested the same Data Type ID(s), the NF-A SI SC 335 will update the existing data collection jobs within the NF-A set. If some other NF SIs of the same NWDAF set have requested the same Data Type(s), the collected data may be sent to the same storage function so that the collected data may be shared among NF SIs of the same NF set (which is NWDAF set 310 in this embodiment).

b. If some other NF SIs of some other NF set(s) (which is NWDAF set 310 in this embodiment) have requested the same Data Type(s), the collected data may be stored in the same or different storage function. If the collected data has been being sent to the same storage function, the NF-A SI SC 335 may update existing data collection setting in the NF-A set 330 so that no additional data collection request is sent to NF-A instances/SIs 333 and 334 of NF-A SI set 330.

If the collected data has been being sent to another storage function, the NF-A SI SC 335 may update the data collection jobs within the NF-A set 330 so that the collected data may be sent to one or more storage functions. Alternatively, the NF-A SI SC 335 may send to the NWDAF instance/SI 311 in step 436 the address or ID of the storage function that is currently used to store the same collected Data Type(s). The NWDAF instance/SI 311 may access the notified storage function to obtain the required data.

At step 440, depending on the functionalities of NF-A instance/SIs 333 and 334, the NF-A SI SC 335 may send NF Data Collection Request or NF Data Collection Modification to the NF-A instances/SIs 333 and 334 that can provide the required data.

If the requested Data Type(s) has not been collected, the NF-A SI SC 335 may send the NF Data Collection Request to the NF-A instance(s)/SI(s) 333 and/or 334. The message may include one or more of following information: Data Type ID(s), Data Collection Attribute(s) of each Data Type ID, address of storage function (such as SF ID, SF IP address). If the NF-A SI SC 335 is in charge of sending collected data to the NWDAF instance/SI 311 or SF 350, the address of SF 350 may be omitted.

If the requested Data Type(s) has been being collected, the NF-A SI SC 335 may send the NF Data Collection Modification to the NF-A instance(s)/SI(s) 333. The message may include the Data Type ID(s) and one or more new attributes of Data Collection Attribute of each Data Type ID. The message may include a SF address if the collected data may be sent to address of another SF SI, another SF SI Set, or additional SF SI or additional SF SI Set.

At step 442, the NF-A instance/SI 333 may send an NF Data Collect Response to the NF-A SI SC 335 to confirm the reception of the NF Data Collection Request or Modification in step 440.

At step 444, the NF-A instance/SI 333 collects the data according to Data Type ID(s) and Data Collection Attributes received in step 440. For each collected data record, the NF-A instance/SI 333 may include a timestamp of the time the data is collected, the address and/or ID of NF-A SI Set 330, and/or NF-A SI Subset, and/or NF-A instance/SI 333, and/or one or more attributes as described in Data Collection Attributes (e.g. UE ID, S-NSSAI, NSI-ID, Application ID, UE location (e.g. represented by geographical location in two-dimension or three-dimension, and/or (R)AN address, and/or cell ID)).

The NF-A instance(s)/SI(s) 333 may send a Data Transfer Request to the SF or NF-A SI SC 335, or NWDAF instance/SI 311 according to the parameters provided in step 440. The message may carry the collected data according to the parameters provided in step 440. The NF-A instance(s)/SI(s) 333 may send the collected data immediately, or at some configured schedule time(s) or time period(s) when the network load may be low to avoid network congestion. The message in step 444 may be implemented by using event exposure notification service of NF-A. For example, the AMF may use Namf_EventExposure_Notify service to send data to the NF that has subscribed to receive the UE mobility events. In another example, the SMF may use Nsmf_EventExposure_Notify service to send data to the NF that has subscribed to receive the data of session management events.

If the collected data is sent from NF-A instance/SI 333 to the NF-A SI SC 335, the NF-A SI SC 335 may collect data from one or more NF-A instances/SIs 333 and 334, send them in one or multiple batches, or immediately to the SF and/or NWDAF instance/SI 311 after receiving from NF-A instance(s)/SI(s) 333. The NF-A SI SC 335 may send the collected data to the SF and/or NWDAF instance/SI 311 at a scheduled time or time periods when the network load may be low to avoid congestion.

At step 446, the (data) SF 350, or NWDAF instance/SI 311 may send a Data Transfer Response to the NF-A instance/SI 333, or NF-A SI SC 335, depending which entity has sent Data Transfer Request in step 444.

At step 448, if the NWDAF instance/SI 311 has subscribed for Data Collection Notification in step 426, the (data) SF 350 may send a Data Notification to the NWDAF instance/SI 311. The message may indicate whether the Data Type(s) has been received and one or more attributes of the Data Collection Attributes, such as collection period, UE locations (e.g. RAN address(es), RAN Cell ID(s), registration areas), S-NSSAI, DNN, Internal Group ID.

The messaging of step 448 may be implemented, for example, by using Nudr_DM_Notify service of UDR. The UDR may notify the NWDAF instance/SI 311 about newly collected data records, e.g. new records of Data Type ID(s), and some Data Collection Attributes associated information such as UE ID(s), UE Group information (e.g. Internal Group ID), NF ID(s).

Referring to FIG. 4AC, at step 450, in some embodiments, the NF-A SI(s) 333 may store the collected data in an NF-A SI Set (Data) Storage 332. The message NF Data Storage Request may contain one or more of following information: Collected data record(s), and for each collected data record, the NF-A instance/SI 333 may include a timestamp of the time the data is collected, the NF-A Set ID, and/or NF-A Subset ID, NF-A service set ID, and/or NF instance ID, and/or NF SI ID, and/or one or more attributes as described in Data Collection Attributes (e.g. UE ID, S-NSSAI, NSI-ID, Application ID).

At step 452, the NF-A Set SF 332 may send an NF Data Storage Response to the NF-A instance/SI 333 to confirm the received data and/or that the data is stored successfully. If the data storage has an error (such as memory is full), the NF-A SI Set Data Storage 332 may send the error code indicating the cause.

At step 454, The NF-A instance/SI 333 may send a Data Availability Notification to the NF-A SI SC 335 to notify NF-A SI SC 335 that one or more data records have been stored in NF-A SI Set Data Storage 332.

At step 456, the NF-A SI SC 335 may send an NF Data Retrieval Request to the NF-A SI Set Data Storage 332. This message may be sent immediately after step 454, or at times when the network load may be low. The message may contain one or more of following parameters: Data Type ID(s), time period to retrieve the collected data records.

The messaging of step 456 may be implemented, for example, by using Nudr_DM_Query service of the UDR. The AMF, for example, may send Nudr_DM_Query request to the UDR set or UDR SI to retrieve the collected data.

In another embodiment, the messaging of step 456 may be implemented, for example, by using Nudsf_UnstructuredDataManagement_Query service of UDSF to retrieve the collected data.

At step 458, the NF-A SI Set Data Storage 332 may send the requested data records to the NF-A SI SC 335.

At step 460, the NF-A Set SI SC 335 may send the data records to the SF 350. Each data record may have a timestamp, and one or more attributes of Data Collection Attributes.

The messaging of step 460 may be implemented, for example, by using Nudr_DM_Create Request service of the UDR. The AMF, for example, may send Nudr_DM_Query request to the UDR SI to store the collected data.

In another embodiment, the messaging of step 460 may be implemented, for example, by using Nudsf_UnstructuredDataManagement_Create service of UDSF to store the collected data.

At step 462, the (data) SF 350 may send a Data Transfer Response to the NF-A SI SC 335 to confirm the reception of the data in step 460. For example, the Data Transfer Response may be implemented by using Nudr_DM_Create Response service of the UDR, or Nudr_DM_Query response.

At step 464, if the NWDAF instance/SI 311 has subscribed for Data Collection Notification in step 426, the SF 350 may send a Data Notification to the NWDAF instance/SI 311. The message may indicate whether the Data Type(s) has been received and one or more attributes of the Data Collection Attributes, such as collection period, locations (e.g. RAN address(es), RAN Cell ID(s), registration areas, S-NSSAI, DNN, Internal Group ID).

As an alternative to step 460, the NF-A SI SC 335 may send the data record(s) directly to the NWDAF instance/SI 311, which requested the data collection. Each data record may have a timestamp of the data record, and one or more attributes of Data Collection Attributes. This message is not shown in FIGS. 4AA to 4AC. The NWDAF instance/SI 311 may send an acknowledgment to the NF-A SI SC 335.

At step 466, the NF-A SI SC 335 may send a Data Collection Response or Notification to the NWDAF instance/SI 311 to notify that the data to be collected has been sent to the SF 350. The Notification may include one or more of following information: the number of data records collected, the time period of collected data (start and end times), location(s) of collected data (e.g. RAN address(es), or RAN cell ID(s), geographical zone ID(s)).

At step 468, the NWDAF instance/SI 311 may retrieve the collected data from one or more NF Sets. The NWDAF instance/SI 311 may send a Data Retrieval Request to the SF 350 to get the collected data. The message may include one or more of following information: Data Type ID(s) and one or more of attributes of Data Collection Attributes such as collection time period(s), location(s), S-NSSAI, Internal Group ID, DNN, NF ID(s), NF Set ID(s), NF Instance ID(s), NF Service Set ID(s), NF SI ID(s).

The messaging of step 468 may be implemented, for example, by using Nudr_DM_Query service of the UDR. The NWDAF instance/SI 311, for example, may send Nudr_DM_ Query request to the UDR to retrieve the collected data.

In another embodiment, the message in step 468 may be implemented, for example, by using Nudsf_UnstructuredDataManagement_Query request service of UDSF to retrieve the collected data.

At step 470, the SF 350 may send one or multiple Data Retrieval Response messages, which carries the requested data to the NWDAF instance/SI 311. The message in step 470 may be implemented by using for example, Nudsf_UnstructuredDataManagement_Query response service of UDSF in case the SF is UDSF.

The NWDAF instance/SI 311 may store the received data in NWDAF Set Storage 313 such as a UDSF storage function.

At step 472, the NWDAF instance/SI 311 performs data analytic service as received in step 414.

At step 474, the NWDAF instance/SI 311 may send the Data Analytics Response or Data Analytics Notification to the NF that sent message in step 414.

The messaging of step 474 may be implemented by using Nnwdaf_AnalyticsInfo Response or Nnwdaf_Events Subscription_Notify services of the NWDAF.

Figure 4B:
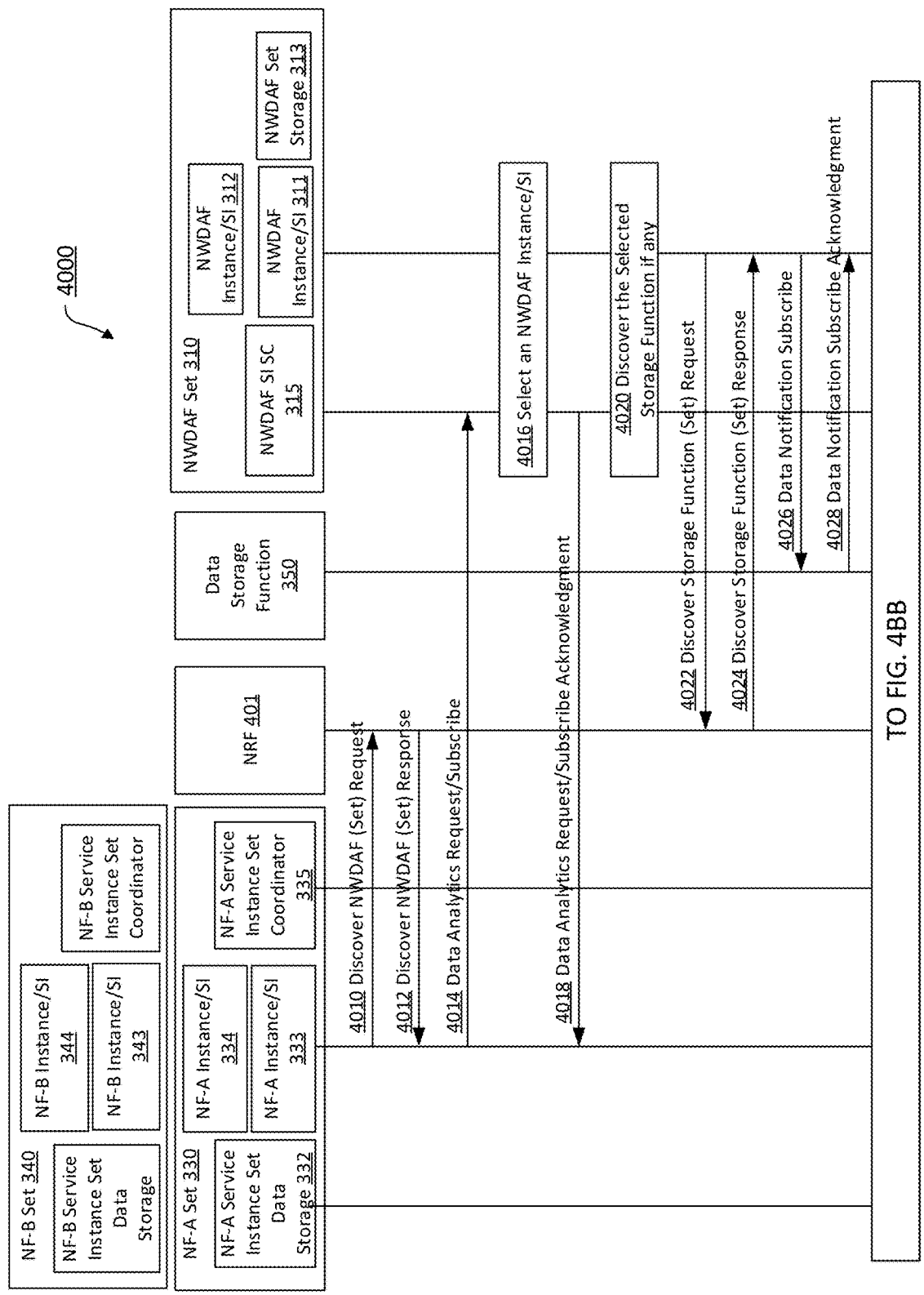
FIGS. 4BA to 4BC illustrate another example signaling procedure for data collection and data analytics provisioning, which is customized to the functionalities of NWDAF Set and NF Set described in FIG. 3B.
Figure 4B:
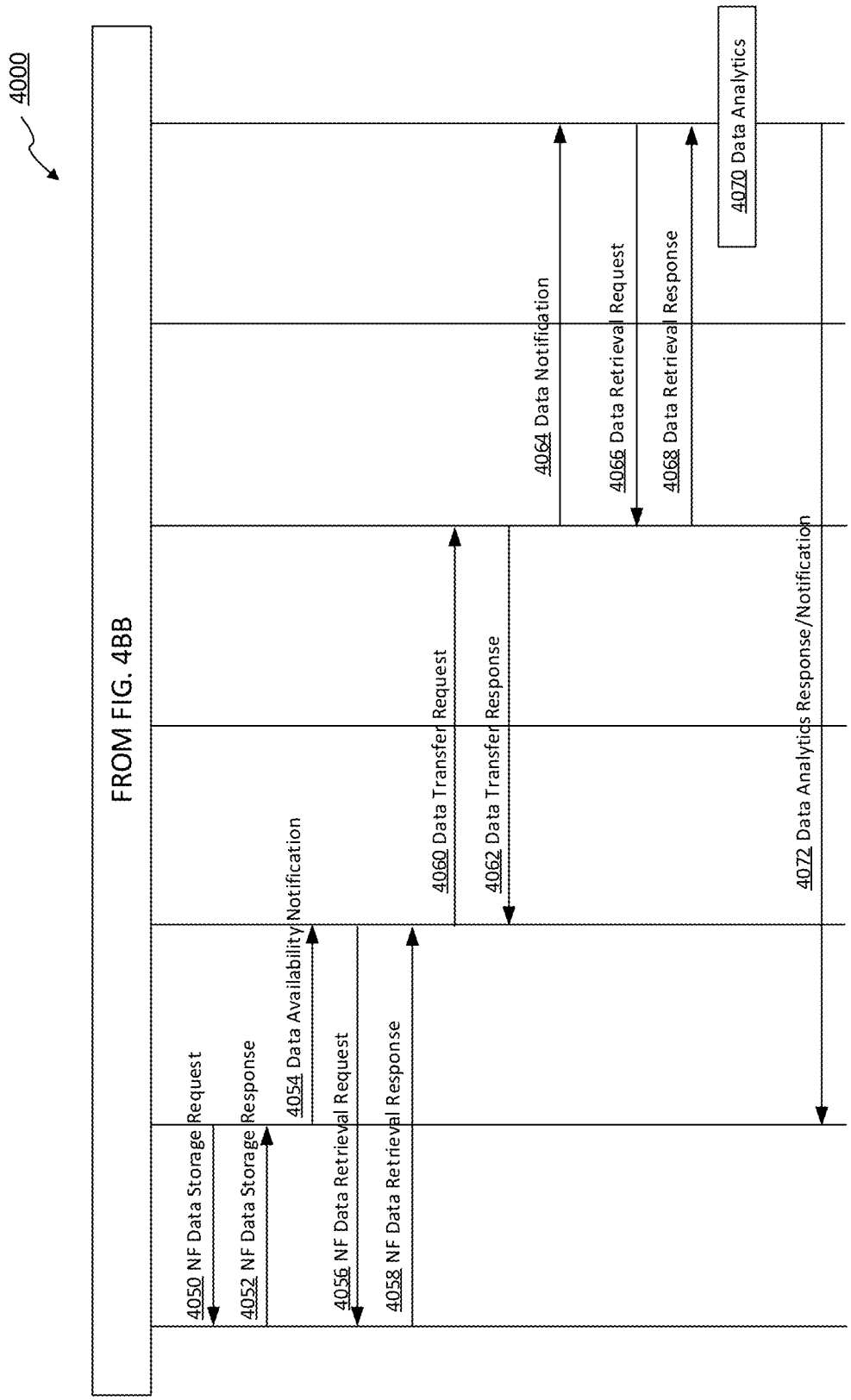

FIGS. 4BA to 4BC illustrate another data collection method 4000, in which some steps of FIGS. 4AA to 4AC are modified in accordance with the functionalities of NWDAF Set and NF Set described in FIG. 3B. The functionalities of NWDAF Set and NF Set described in FIG. 3B are modified from that described in FIG. 3A.

Steps 4010 to 4024 of FIG. 4BA are substantially similar to steps 410 to 424 of FIG. 4AA, respectively.

At step 4026, the NWDAF instance/SI 311 may send a Data Notification Subscribe, or Data Request, or Data Subscription Request message to the address of DSF Set, or DSF Subset, or DSF instance, or DSF service set, or DSF SI for the Data Type ID(s). The message may include Data Type ID(s), one or more attributes of Data Collection Attributes of each Data Type ID, such as PLMN ID, S-NSSAI ID(s), DNN(s), UE locations, NF address(es), Internal Group ID.

At step 4028, the one entity of DSF 350 such as DSF 350 SI SC, or a DSF 350 instance, or a DSF 350 service set, or a DSF 350 SI may send a Data Notification Subscribe Acknowledgment to the NWDAF instance/SI 311 to acknowledge the reception of messages in step 4026.

At step 4030, instead of the NWDAF instance (or SI) 311 in step 430 of FIG. 4AB sending Discover NF (Set) Request, the Data Storage Function (DSF) 350 may send Discover NF (Set) Request to the NRF 401. This message is to discover one or more NF entities (such as NF instance(s), and/or NWDAF Set(s), and/or NWDAF SI(s)) that can provide requested data.

At step 4032, instead of an NWDAF instance/SI 311 in step 430 of FIG. 4AB receiving Discover NF Response, the DSF 350 may receive the Discover NF Set Response from the NRF 401.

At step 4034, instead of NWDAF instance/SI 311 in step 436 of FIG. 4AB, the DSF 350 may send Data Collection Request/Subscribe to the discovered NF(s), such as NF-A SI SC 335, or NF-A instance(s), or NF-A SI(s). The DSF 350 may use event exposure services of NF, such as Namf_EventExposure_Subscribe services of the AMF, Nsmf_EventExposure_Subscribe services of the SMF, Npcf_EventExposure service of the PCF, Nudm_EventExposure service of the UDM, Nnef_EventExposure service of NEF, Nnrf_NF-Management_NFStatusSubscribe service of the NRF, Nudr_DM_Subscribe of the UDR, Naf_EventExposure service of the AF, to request or subscribe for the data to be collected.

Step 4036, instead of NWDAF instance/SI 311 in step 436 of FIG. 4AB, the DSF 350 may receive Data Collection Request/Subscribe Acknowledgment for the message sent in step 4034, from the NF-A SI SC 335, NF-A instance(s), or NF-A SI(s).

Steps 4038 to 4072 are substantially similar to steps 438 to 474 of FIGS. 4AB and 4AC. One different is that step 466 of FIG. 4AC may not be needed in the method illustrated in FIGS. 4BA to BC, since the NF-A 330 may not directly communicate with functions of NWDAF set 313.

Figure 4C:
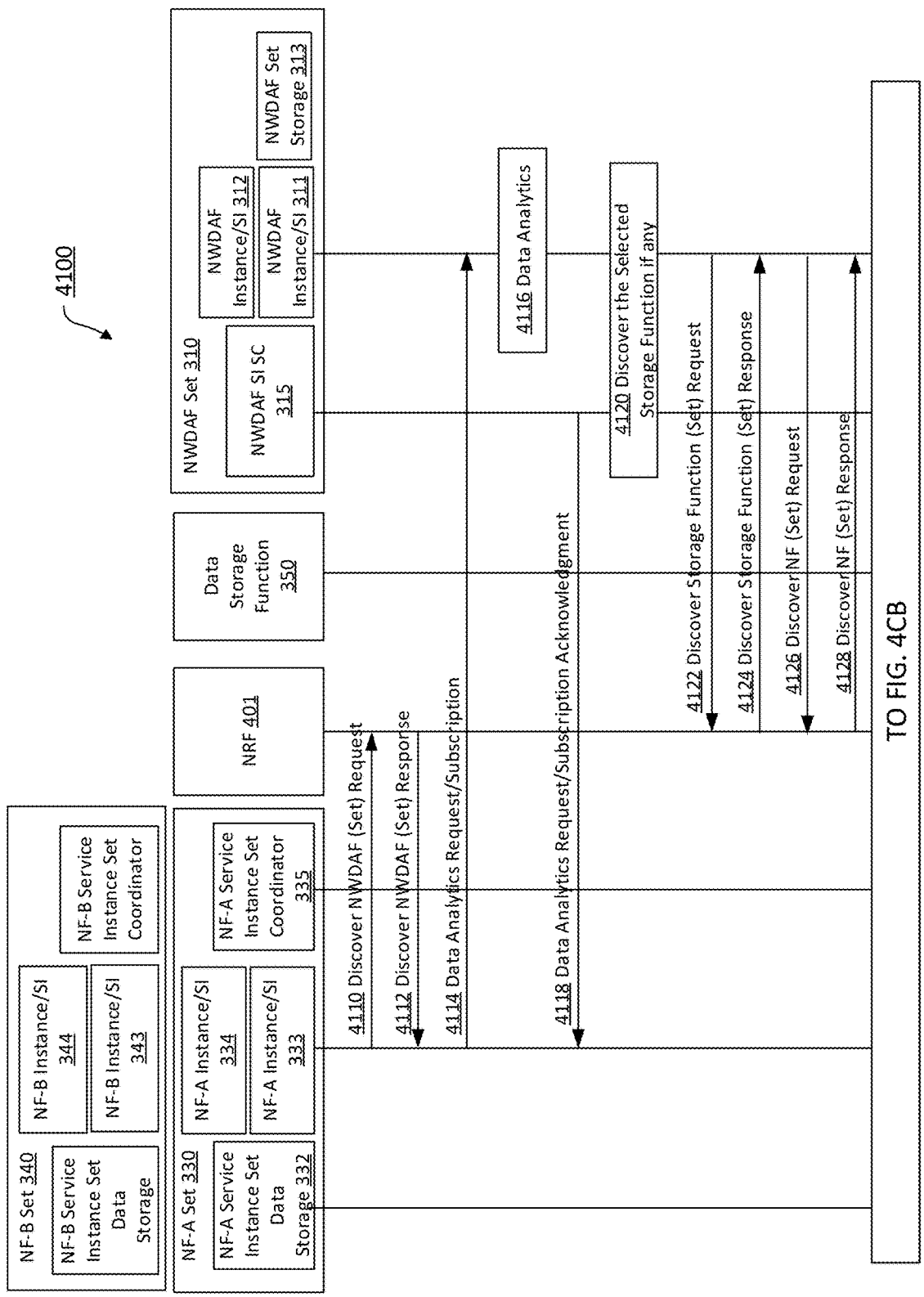
FIGS. 4CA to 4CB illustrate another example signaling procedure for data collection and data analytics provisioning, which is customized to the functionalities of NWDAF Set and NF Set described in FIG. 3C.
Figure 4C:
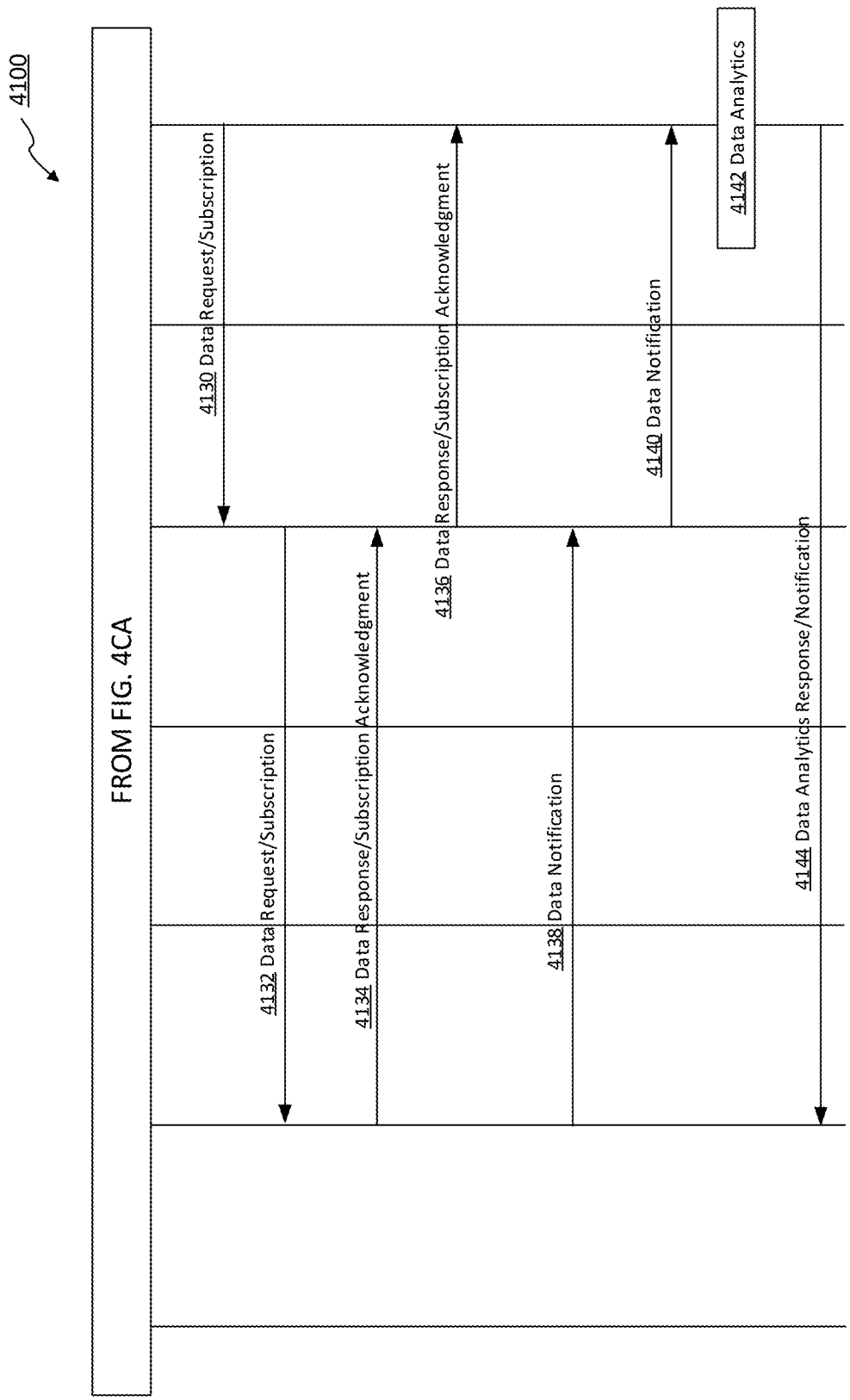

FIGS. 4CA and 4CB illustrate another data collection method 4100, in which some steps of FIGS. 4AA to AC are modified in accordance with the functionalities of NWDAF Set and NF Set described in FIG. 3C. The functionalities of NWDAF Set and NF Set described in FIG. 3C are modified from that described in FIG. 3A.

Steps 4110 and 4112 of FIG. 4CA are substantially similar to steps 410 and 412 of FIG. 4AA, respectively.

At step 4114, there may be possible modifications on information of NWDAF set 310 acquired at steps 4110 and 4112. For example, at step 4112, the NRF 401 may provide either information of NWDAF set 310 (such as NWDAF Set 310 Profile), or NWDAF SI (NWDAF instance/SI) 311 profile(s). If the NF-A instance/SI 333 selects a NWDAF set 310, the NF-A instance/SI 333 may send the Data Analytic Request/Subscribe to the NWDAF SI SC 315, similar to step 414 of FIG. 4AA. If the NF-A instance/SI 333 selects an NWDAF instance/SI 311, at step 4114, the NF-A SI 333 may send the Data Analytic Request/Subscribe to the selected NWDAF instance(s)/SI(s) 311.

At step 4116, if the data has been collected and available in the NWDAF Set 310, the NWDAF Instance/SI 311 may access the collected data and perform data analytics.

At step 4118, the selected NWDAF instance/SI 311 may send Data Analytic Response or Subscribe Acknowledgment to the NF-A instance/SI 333. If the data required for analytics has been available in the NWDAF Set 310 or in the NWDAF instance 311, or the required analytics is available, the NWDAF instance/SI 311 may send Data Analytic Response to the NF-A instance/SI 333 in step 4118. The message carries the requested analytics. Steps 4120 to 4144 may be skipped. It means that the NWDAF instance/SI 311 may not need to discover DSF 350 as is illustrated in steps 4122 and 4124; the NWDAF instance/SI 311 may not need to discover NF(s) to collect data as shown in step 4126 and 4128.

If the NF-A Instance/SI 333 sent Data Analytics Subscription to the NWDAF Instance/SI 311 in step 4114, the NWDAF Instance/SI 311 may send a Data Analytics Subscription Acknowledgment to the NF-A Instance/SI 333 in step 4114.

At step 4120, the NWDAF instance/SI 311 may communicate with the NWDAF SI SC 335 as described in step 420 of FIG. 4AA.

At step 4122, the NWDAF instance/SI 311 may use a service of NRF 401 to discover NF(s) that may provide required data. This step is similar to step 422 of FIG. 4AA.

At step 4124, the NRF 401 may notify the NWDAF instance/SI 311 the NF set(s) and/or NF instance(s) and/or NF SI(s) that may provide the data.

Step 4126, the NWDAF instance/SI 311 may use a service of NRF 401 to discover the NF set(s), and/or NF instance(s) ,and/or NF service set, and/or NF SI(s) that may provide required data. The NWDAF instance/SI 311 may send a Discover NF (Set) Request to the NRF 401.

Step 4128, The NRF 401 may send a Discover NF (Set) Response to the NWDAF instance 311. The message may contain NF Set profile(s) and/or NF instance profile(s).

At step 4130, the NWDAF instance/SI 311 may send Data Request or Data Subscription to the DSF 350. The message may contain the NF Set ID(s), and/or NF Instance ID(s), and/or NF service set ID, and/or NF SI ID(s), and/or their NF address(es), that may provide data, the type of data to be collected, and attributes of data to be collected.

At step 4132, the DSF 350 may check whether the requested data has been stored in the DSF 350. If the requested data has been stored in the DSF 350, steps 4132 and 4134 may be skipped. The DSF 350 may send the requested data to the NWDAF instance/SI 311 in step 4136. If the data has not been stored in the DSF 350, the DSF 350 may forward the Data Request or Data Subscription to the NF Set(s) and/or NF Instance(s) and/or NF SI(s) according to the information received in step 4130. If the DSF 350 has subscribed to the NF Set(s) and/or NF instance(s)/SI(s) for the type of data to be collected, but one or more attributes are different from the previously subscription, the DSF 350 may send Data Subscription Modification (or Update) to the NF Set(s) and/or NF Instance(s)/SI(s) to modify or update the existing data subscription. Another method to modify (or update) existing subscription is to send unsubscription message for the existing subscription and send another subscription message carrying the parameters of the previous subscription and the additional new parameters.

One example of message 4130 is the subscription sent to an AMF instance/SI to receive UE location notification. The message is Namf_EventExposure_Subscribe request, with UE ID=12345, 12346, 12347 for example. If the DSF 350 finds that the UE location information for UE ID=12345 has been subscribed before, the DSF 350 may modify the previous subscription by sending two messages at step 4132 in any order: one message is Namf_EventExposure_UnSubscribe request to unsubscribe the subscription to receive location information of UE ID 12345, and another message is Namf_EventExposure_Subscribe request to subscribe for UE location information of UE ID=12345, 12346, 12347. Another method to modify existing data subscription is that the DSF may send Namf_EventExposure_Subscribe request at step 4132 to subscribe for UE location information of UE ID=12346, 12347 since the location information of UE 12345 has been subscribed before.

At step 4134, the NF Instance(s)/SI(s) 333 or NF Set Coordinator (e.g. NF-A SI SC 335) may send the requested data to the DSF 350 in a Data Response message if the DSF 350 sent Data Request in step 4132. The NF Instance(s)/SI(s) (or NF Set Coordinator) may send a Data Subscription Acknowledgment if the DSF 350 sent Data Subscription (or Data Subscription Update) in step 4132.

At step 4136, the DSF 350 may send the Data Response to the NWDAF instance/SI 311 which carries the requested data if the NWDAF instance/SI 311 sent the Data Request to the DSF 350 in step 4130.

The DSF 350 may send the Data Subscription Acknowledgment to the NWDAF instance/SI 311 if the NWDAF instance/SI 311 sent the Data Subscription message in step 4130.

At step 4138, if the DSF 350 sent Data Subscription or Data Subscription Update in step 4132, the NF Instance(s)/SI(s) 333 or NF Set Coordinator (e.g. NF-A SI SC 335) may send Data Notification to the DSF 350. The message may contain the requested data.

At step 4140, the DSF 350 may store the received data in a storage unit. The DSF 350 may forward the received data to the NWDAF instance/SI 311.

At step 4142, the DSF 350 may perform data analytics to produce the requested analytics.

At step 4144, the NWDAF instance/SI 311 may send the Data Analytics Response to the NF Set (e.g. NF-A set 330) and/or NF Instance/SI 331 that requested the analytics at step 4114.

Figure 5A:
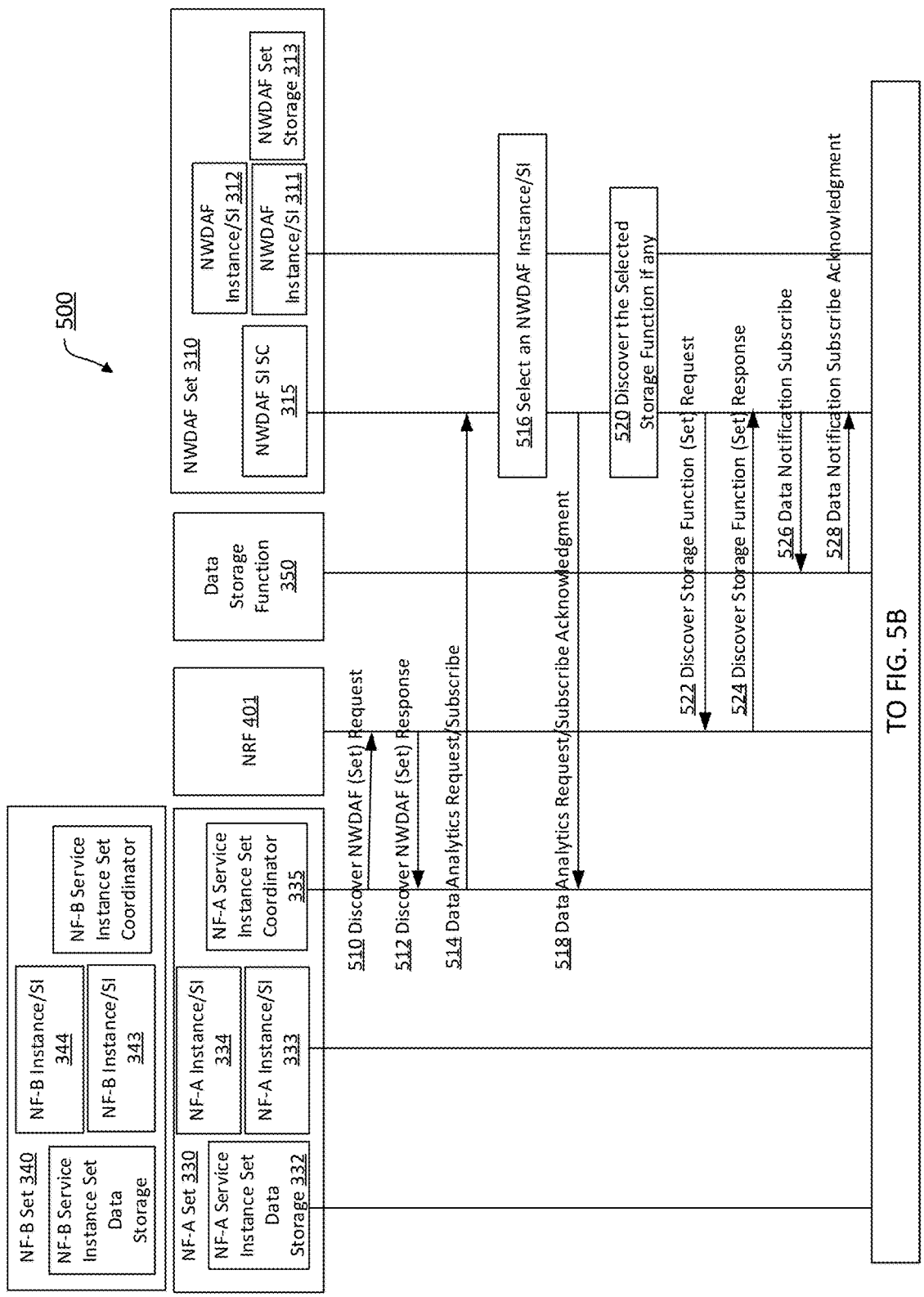
FIGS. 5A to 5C illustrate another example signaling procedure for data collection and data analytics provisioning.
Figure 5B:
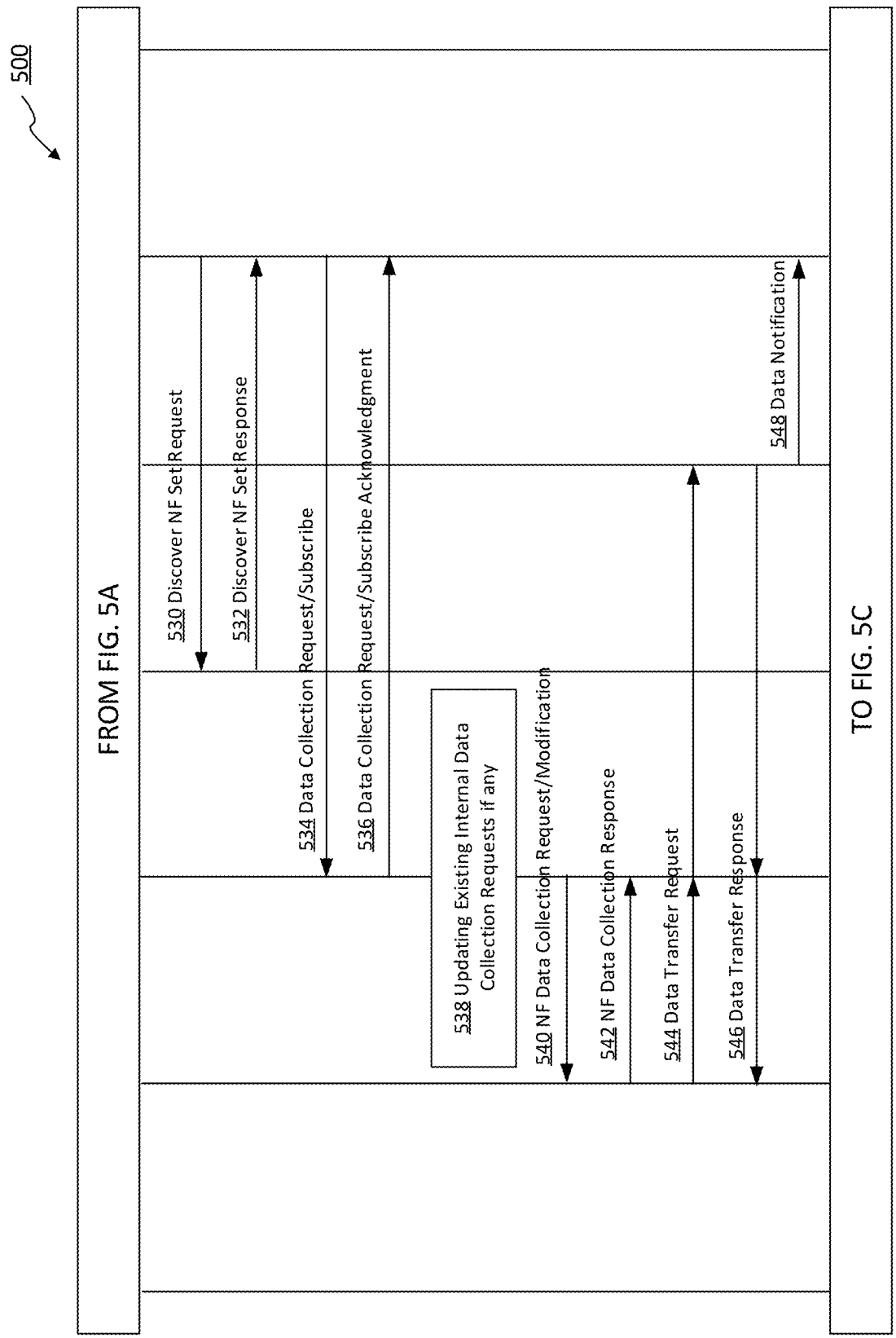
Figure 5C:
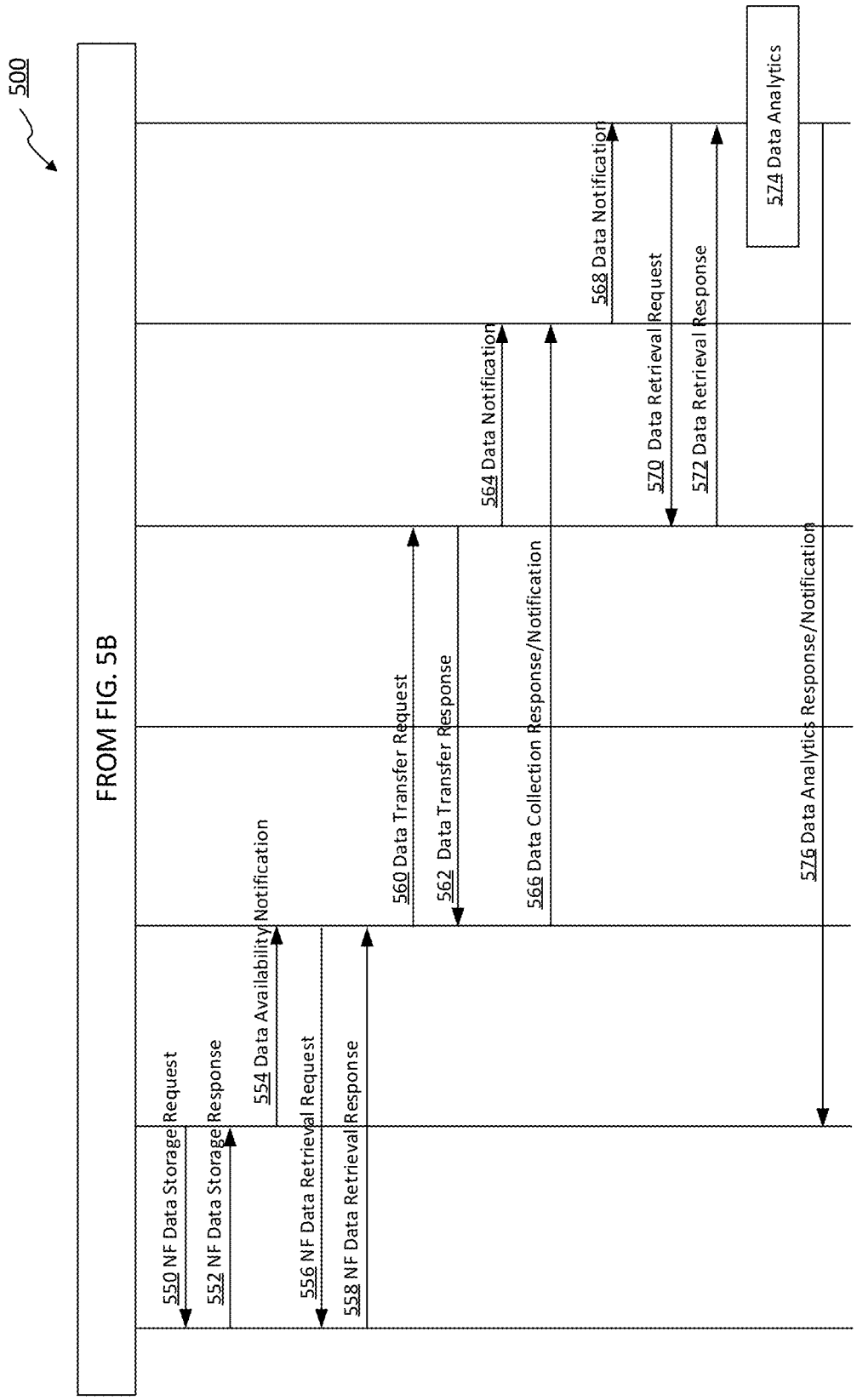

FIGS. 5A to 5C illustrate another example signaling procedure 500 for data collection and data analytics provisioning. In the embodiment depicted in FIGS. 5A to 5C, the NWDAF SI SC may perform discovering NF Set(s), and/or NF Subset(s), and/or NF SI(s) that can provide network data for data analytics.

Referring to FIG. 5A, at step 510, one or more NF SIs (e.g. NF-A SIs 333 and/or 334) need to use a data analytic service of NWDAF. The NF-A instances/SIs 333 and/or 334 communicate with NF-A SI SC 335 to indicate which data analytic service is required. The NF-A SI SC 335 sends a message to the NRF 401 to discover NWDAF set, and/or NWDAF Subset, and/or NWDAF instance, and/or NWDAF service set, and/or an NWDAF SI. The message may carry information similar to those in step 410 in FIG. 4, for example one or more of following information: Type(s) of Data Analytic Service (e.g. mobility management, traffic routing, UPF load, IoT security, UE mobility pattern, UE communication pattern), duration to use the data analytic service (such as start and end times the NF-A instance/SI 333 may use data analytic service(s)), network information (such as S-NSSAI(s), NSI-ID(s), DNN(s), PLMN ID(s), LADN ID(s)), UE Information (such as Internal Group ID, UE ID(s)), Application information (such as Application ID), NF information of NF-A 333 (such as NF-A IDs, and/or service(s) of NF-A set, and/or service(s) of NF-A instance/SI 333). The data analytic service will be performed based on the input information.

At step 512, the NRF 401 may send information, such as NF profiles of NWDAF, to identify NF SI Set(s), which is e.g. NWDAF SI set(s) 310, and/or NF Instance(s), and/or NF service set(s), which is NWDAF service set(s), and/or NF SI(s), which is NWDAF SI(s) 311. The NWDAF SIset (or NWDAF Set) 310 may be identified by NF SI Set ID, which is NWDAF set ID (identifier), and/or NF Instance ID(s) and/or NF SI Set address(es), which is NWDAF SI set IP address(es), and/or FQDN of NWDAF SI 311. The NWDAF SI 311 may be identified by NWDAF SI set ID, and/or NWDAF SI ID, and/or NWDAF instance ID, and/or NWDAF service set ID. The NWDAF SI address could be IP address(es), or FQDN, or Endpoint Address(es).

In some embodiments, the NWDAF SI 311 could be accessible by other NF SIs. In this case, the NWDAF SI ID and/or or Endpoint Address(es) could be used by other NF SIs to request the data analytic services.

In other embodiments, the NWDAF instance/SI 311 is hidden inside the NWDAF SI set 310. In this case, the NRF 401 may provide the NF-A SI SC 335 the profile of NWDAF set 310 only.

In other embodiments, the NWDAF SI 311 is hidden inside the NWDAF instance. In this case, the NRF 401 may provide the NF-A SI SC 335 the profile of NWDAF instance only.

In some embodiments, a NF SI set may be distributed in multiple data centers or geographical locations. In this case, the NRF 401 may provide NF-A SI SC 335 the profile of NWDAF SI set 310, and/or NWDAF SI Subset (or NWDAF SI service zone).

The NF-A SI SC 335 may use the NWDAF profile(s) provide by the NRF 401 to select one NWDAF Set (e.g. NWDAF Set 310), or one NWDAF Subset, or one NWDAF instance, or one NWDAF service set, or one NWDAF SI (e.g. NWDAF SI 311) to provide data analytical service.

At step 514, The NF-A SI SC 335 may send a Data Analytics Request or Data Analytics Subscribe message to the selected NWDAF SI set 310. The NWDAF SI SC 315 receives this message.

If the NRF 401 provided NWDAF SI set ID and/or address (such as IP address or FQDN), the NF-A SI SC 335 sends the message to the address of NWDAF SI set 310 which has NWDAF SI set ID.

If the NRF 401 provided NWDAF SI set ID and/or address (such as IP address or FQDN) and/or NWDAF SI subset ID and/or address (such as IP address or FQDN), the NF-A SI SC 335 sends the message to the address of NWDAF SI subset which has NWDAF SI subset ID.

If the NRF 401 provided NWDAF SI ID and/or address (such as IP address or FQDN), the NF-A SI SC 335 sends the message to the address of NWDAF SI 311 that has NWDAF SI ID or address.

If the NRF 401 provided NWDAF instance ID and/or address (such as IP address or FQDN), the NF-A SI SC 335 sends the message to the address of this NWDAF instance.

The message from NF-A SI SC 335 may carry one or more of following information: Type(s) of Data Analytic Service, Data Analytic Attributes. The Data Analytic Attributes may include one or more of following attributes:

a. Network information: e.g. PLMN ID(s), S-NSSAI(s), NSI-ID(s), DNN(s), DNAI(s) to get analytical information;

b. -UE Information: UE ID(s) (e.g. SUPI, GPSI), Internal Group ID to get analytical information;

c. -NF information: e.g. UPF ID(s), AMF Set ID, RAT, RAN ID(s), Cell ID(s) to get analytical information;

d. -Application Information: such as Application ID, AF-Service-ID to get analytical information;

e. -Data Analytics Duration: In case the NF-A SI SC 335 sends the subscription message, the NF-A SI SC 335 may indicate when the NF-A SI SC 335 wants to receive the analytical data in the future, and specific period(s) during the day the NF-A SI SC 335 may receive the analytic data. For example, the NF-A SI SC 335 may want to receive analytical data from a day 1 to a day 2, at 1:00-1:30 AM, every day.

At step 516, if the NF-A SI SC 335 sent the NWFDA Set ID and/or NWDAF subset ID, the NWDAF SI SC 315 may receive the message from NF-A SI SC 335. The NWDAF SI SC 315 may select an NWDAF instance/SI, such as NWDAF instance/SI 311 to provide data analytic service for the NF-A SI SC 335.

At step 518, the NWDAF SI SC 315 or the selected NWDAF instance/SI 311 may send a Data Analytic Request/Subscribe Acknowledgment to the NF-A SI SC 335. This message may include one or more of following information: the NWDAF instance/SI ID that was selected to serve the NF-A SI SC request/subscribe.

At step 520, the NWDAF SI SC 315 may check whether a data storage function (e.g. data storage function 350) has been selected or not. A storage function needs to be selected so that the collected data from NFs, UEs, AF may be stored in this storage function. If a storage function has been selected, either by NWDAF SI SC 315, or by NWDAF instance/SI 311, the storage function ID may be stored in the NWDAF SI SC 315 and/or NWDAF instance/SI 311. The NWDAF instance/SI 311 and NWDAF SI SC 315 may communicate to identify the selected storage function.

At step 522, If the (data) storage function 350 was not selected, or a storage function needs to be re-selected, the NWDAF SI SC 315 may send a Discover Storage Function Request or Discover Storage Function Set Request message to the NRF 401. The message may include one or more of following information: the Type(s) of Collected Data (e.g. PDU Session Context information, QoS information, QoS Notification Control message, UE Mobility information), duration of data collection, time of the day the data may be collected, service area, DNN.

At step 524, the NRF 401 may send one or more SF profiles of Storage Function (SF) SI Set(s), or SF SI Subset(s), or SF instance(s), or SF service set, or SF SI(s) to the NWDAF SI SC 315. The storage function 350 could be UDSF, UDR or any storage function. The NWDAF SI SC 315 may select one SF SI Set, and/or SF SI Subset, and/or SF instance, and/or SF service set, and/or SF SI from the received SF profile(s) for storing the collected data.

At step 526, the NWDAF SI SC 315 may send a Data Notification Subscribe message to the selected SF Set 350, or SF Subset, or SF instance ID, or SF service set, or SF SI ID for the Data Type ID(s). The message may include one or more attributes of Data Collection Attributes of each Data Type ID, such as S-NSSAI, DNN, UE locations, NF address(es), Internal Group UD.

At step 528, the SF 350 SI Set, or SF 350 SI Subset, or SF instance, or SF service set, or SF 350 SI may send a Data Notification Subscribe Acknowledgment to the NWDAF SI SC function 315 to acknowledge the reception of message in step 526.

Referring to FIG. 5B, at step 530, the NWDAF SI SC 315 may need to collect data from one or multiple network functions, such as NF-A set 330 and NF-B set 340. For illustration, the NWDAF SI SC 315 may need to collect data from NF-A 330. The NWDAF SI SC 315 may send a request to discover NF-A SI Set(s) 330, and/or NF-A Subset(s), and/or NF-A instance(s), and/or NF-A service set, and/or NF-A SI(s) 333 and 334 to the NRF 401. The NWDAF SI SC 315 may include one or more of following information:
 a. Network information: e.g. PLMN ID(s), S-NSSAI(s), NSI-ID(s), DNN(s), DNAI(s) to collect data from;
 b. UE Information: UE ID(s) (e.g. SUPI, GPSI), Internal Group ID to collect data;
 c. NF information: such as NF-A Set ID(s), and/or NF Subset ID(s), and/or NF SI ID(s). The NF-A information could be, e.g., UPF ID(s), AMF Set ID, RAT, RAN ID(s), Cell ID(s) to collect data;
 d. Application Information: such as Application ID, AF-Service-ID to collect data.
 e. Location information: e.g. geographic zone ID(s);
 f. Duration of data collection: e.g. the start and end time that the NF-A 330 will collect the data;
 g. Type of data to be collected.

At step 532, based on input information provided by the NWDAF SI SC, the NRF may send the NF profiles of NF Set(s), and/or NF Subset(s), and/or NF instance(s), and/or NF Service set(s), and/or SF SI(s) to the NWDAF SI SC 315. In some embodiments, the NRF 401 may know the status of NF Set, NF Subset, NF instance, NF service set, NF SI in a period of time in the past and in the future. The NF status could be, for example Available or Not Available, Registered or Deregistered. If a NF Set, or NF Subset, or NF instance, NF service set, or NF SI is available in any periods within the duration of data collection, the NRF 401 may send the NF discovery information to the NWDAF SI SC 315.

At step 534, if the NF profile(s) provided by the NRF 401 contain the NF-A Set ID and/or NF-A Subset ID, and/or NF-A instance ID and FQDN or IP address(es) of the NF instance, and/or NF-A SI ID and FQDN or IP address(es) or endpoint address(es) of the NF SI, the NWDAF SI SC 315 may send a Data Collection Request/Subscribe to the address of NF-A Set 330 or NF-A Subset that may be received by its NF-A SI SC that manages NF-A Set 330 or NF-A Subset. For illustration, the NF-A SI SC 335 receives the request from the NWDAF SI SC 315. The message may include one or more of following information:
 a. Network information: e.g. PLMN ID(s), S-NSSAI(s), NSI-ID(s), DNN(s), DNAI(s) to collect data from;
 b. UE Information: UE ID(s) (e.g. SUPI, GPSI), Internal Group ID to collect data;
 c. NF information: e.g. UPF ID(s), AMF Set ID, RAT, RAN ID(s), Cell ID(s) to collect data;
 d. Application Information: such as Application ID, AF-Service-ID to collect data.
 e. Location information: e.g. geographic zone ID(s) ID to collect data;
 f. Duration information: e.g. the start and end time that the data will be collected, it could be immediately or at certain time in the future. The end time may be omitted, which means that the NWDAF instance/SI 1 may send another message to unsubscribe data collection; The start time and/or end time may indicate a time in the past or in the future.
 g. Type(s) of Collected Data: e.g. PDU Session information (start and end time of PDU Session, QoS Profiles, QoS Rules, Type of PDU Session, S-NSSAI, DNN), UE location, Event ID(s).
 h. Address or ID of SF Set, or SF Subset, or SF service set, or SF instance/SI that the collected data may be sent to.
 i. Address or ID of the NWDAD SI SC 315 that the collected data may be sent to.

The NF-A SI SC 315 may use the received information in the request from NWDAF to as matching rules to identify data type for collection, for example, which NF-A SIs (e.g. NF-A instance/SI 333, NF-A instance/SI 334) may provide requested Data Type, for which UEs, at which UE location.

At step 536, the NF-A SI SC function 335 may send a Data Collection Request or Subscribe Acknowledgment to the NWDAF SI SC function 315. This is to confirm that the NF-A SI SC 335 has received the request for data collection.

In some embodiment, step 538 may be performed after step 534 and before step 536. In some other embodiments, step 538 may be performed after step 536.

The NF-A SI SC 335 may check for the following conditions to avoid duplication of data collection:

a. If some other NF SI(s) of the same NF SI set (which is NWDAF SI set in this embodiment) have requested the Type of Data with the same Data Types (the same Data Type ID(s)) with the same or different Data Collection Attributes. If some other NF SIs have requested the same Data Type ID(s), the NF-A SI SC 335 will update the existing data collection jobs within the NF SI set. If some other NF instances/SIs of the same NWDAF SI set has requested the same Data Type(s), the collected data may be sent to the same storage function so that the collected data may be shared among NF SIs of the same NF SI set (which is NWDAF set 310 in this embodiment).

b. If some other NF instances/SIs of some other NF set(s) (which is NWDAF set 310 in this embodiment) have requested the same Data Type(s), the collected data may be stored in the same or different storage function. If the collected data has been being sent to the same storage function, the NF-A SI SC 335 may update existing data collection setting in the NF-A SI set so that no additional data collection request is sent to NF-A instances/SIs 333 and 334 of NF-A SI set 330.

If the collected data has been being sent to another storage function, the NF-A SI SC 335 may update the data collection jobs within the NF-A SI set 330 so that the collected data may be sent to one or more storage functions. Alternatively, the NF-A SI SC 335 may send to the NWDAF instance/SI 311 in step 536 the address of the storage function that is currently used to store the same collected Data Type(s). The NWDAF instance/SI 311 may access the notified storage function to obtain the required data. The NWDAF SI 311 may subscribe the notified SF 350 for data notification service as performed in steps 526 and 528.

At step 540, depending on the functionalities of NF-A instances/SIs 333 and 334, the NF-A SI SC 335 may send NF Data Collection Request or NF Data Collection Modification to the NF-A instances/SIs 333 and 334 that can provide the required data. For example, if the NF-A 330 is an SMF SI 18 that manage IP PDU Session Type, and the Data Type ID is IP PDU Session Data, the SMF SI SC will send the data collection request to the SMF SI 18.

If the requested Data Type(s) has not been collected, the NF-A SI SC 335 may send the NF Data Collection Request to the NF-A SI(s) 333. The message may include one or more of following information: Data Type ID(s), Data Collection Attribute(s) of each Data Type ID, address of storage function (such as SF ID, SF IP address). If the NF-A SI SC function 335 is in charge of sending collected data to the NWDAF instance/SI 311 or SF 350, the address of SF 350 may be omitted.

If the requested Data Type(s) has been collected, the NF-A SI SC 335 may send the NF Data Collection Modification to the NF-A instance(s)/SI(s) 333. The message may include the Data Type ID(s) and one or more new attributes of Data Collection Attribute of each Data Type ID. The message may include a SF address if the collected data may be sent to another SF, or additional SF.

At step 542, the NF-A instance/SI 333 may send an NF Data Collect Response to the NF-A SI SC 335 to confirm the reception of the NF Data Collection Request or Modification in step 540.

At step 544, the NF-A instance/SI 333 collects the data according to Data Type ID(s) and Data Collection Attributes received in step 540. For each collected data record, the NF-A instance/SI 333 may include a timestamp of the time the data is collected, ID of the NF-A SI Set 330, and/or NF-A SI Subset ID, and/or one or more attributes as described in Data Collection Attributes (e.g. UE ID, S-NSSAI, NSI-ID, Application ID).

The NF-A instance(s)/SI(s) 333 may send a Data Transfer Request to the SF or NF-A SI SC 335, or NWDAF SI SC 315 according to the parameters provided in step 540. The message may carry the collected data to the SF or NF-A SI SC 335, or NWDAF SI SC 315 according to the parameters provided in step 540. The NF-A instance(s)/SI(s) 333 may send the collected data immediately, or at some configured schedule time(s) or time period(s) when the network load may be low to avoid network congestion.

If the collected data is sent from NF-A instance/SI 333 to the NF-A SI SC 335, the NF-A SI SC 335 may collect data from one or more NF-A instance(s)/SI(s) 333 and 334, send them in one or multiple batches, or immediately to the SF 350 and/or NWDAF SI SC 315 after receiving collected data from NF-A instance(s)/SI(s) 333/334. The NF-A SI SC 335 may send the collected data to the SF 350 and/or NWDAF SI SC 315 at a scheduled time or time periods when the network load may be low to avoid congestion.

At step 546, the (data) SF 350, or NWDAF SI SC 315 may send a Data Transfer Response to the NF-A SI SC 335, or NF-A instance/SI 333, depending which entity has sent Data Transfer Request in step 544.

At step 548, if the NWDAF SI SC 315 has subscribed for Data Collection Notification in step 526, the (data) SF 350 may send a Data Notification to the NWDAF SI SC 315. The message may indicate whether the Data Type(s) has been received and one or more attributes of the Data Collection Attributes, such as collection period, locations (e.g. RAN address(es), RAN Cell ID(s), registration areas, S-NSSAI, DNN, Internal Group ID).

Referring to FIG. 5C, at step 550, in some embodiments, the NF-A instance(s)/SI(s) 333 may store the collected data in an NF-A SI Set Data Storage Function 332. The message NF Data Storage Request may contain one or more of following information: Collected data record(s), and for each collected data record, the NF-A instance/SI 333 may include a timestamp of the time the data is collected, ID (and/or address) of the NF-A SI Set 330, and/or NF-A SI Subset ID, and/or ID (and/or address) of NF instance, and/or ID (and/or address) of the NF-A SI 333, and/or one or more attributes as described in Data Collection Attributes (e.g. UE ID, S-NSSAI, NSI-ID, Application ID).

At step 552, the NF-A SI Set SF 332 may send an NF Data Storage Response to the NF-A instance/SI 333 to confirm the received data and/or that the data is stored successfully. If the data storage has an error (such as memory is full), the NF-A SI Set Data Storage 332 may sent the error code indicating the cause.

At step 554, the NF-A instance/SI 333 may send a Data Availability Notification to the NF-A SI SC 335 to notify NF-A SI SC 335 that one or more data records have been stored in NF-A SI Set Data Storage 332.

At step 556, the NF-A SI SC 335 may send an NF Data Retrieval Request to the NF-A SI Set Data Storage 332. This message may be sent immediately after step 554, or at times when the network load may be low. The message may contain one or more of following parameters: Data Type ID(s), time period to retrieve the collected data records.

At step 558, the NF-A SI Set Data Storage 332 may send the requested data records to the NF-A SI SC 335.

At step 560, the NF-A Set SI SC 335 may send the data records to the SF 350. Each data record may have a timestamp, and one or more attributes of Data Collection Attributes.

At step 562, the SF 350 may send a Data Transfer Response to the NF-A SI SC 335 to confirm the reception of the data in step 560.

At step 564, if the NWDAF SI SC 315 has subscribed for Data Collection Notification in step 526, the SF 350 may send a Data Notification to the NWDAF SI SC 315. The message may indicate whether the Data Type(s) has been received and one or more attributes of the Data Collection Attributes, such as collection period, locations (e.g. RAN address(es), RAN Cell ID(s), registration areas, S-NSSAI, DNN, Internal Group ID).

As an alternative to step 560, the NF-A SI SC 335 may send the data record(s) directly to the NWDAF SI SC 315, which requested the data collection. Each data record may have a timestamp and one or more attributes of Data Collection Attributes. This message is not shown in FIGS. 5A to 5C. The NWDAF SI SC 315 may send an acknowledgment to the NF-A SI SC 335.

At step 566, the NF-A SI SC 335 may send a Data Collection Response or Notification to the NWDAF SI SC 315 to notify that the data to be collected has been sent to the SF 350. The Notification may include one or more of following information: Data Type ID(s), and corresponding information for each Data Type ID such as the number of data records collected, the time period of collected data (start and end times), location(s) of collected data (e.g. RAN address(es), or RAN cell ID(s), geographical zone ID(s)), one or more of attributes of Data Collection Attributes.

At step 568, the NWDAF SI SC 315 may send a Data Notification to the NWDAF instance/SI 311 to notify that the requested data for analysis is available. The message may contain Data Type ID(s), and corresponding information for each Data Type ID such as the number of data records collected, the time period of collected data (start and end times), location(s) of collected data (e.g. RAN address(es), or RAN cell ID(s), geographical zone ID(s)), and/or one or more attributes of Data Collection Attributes of each Data Type ID.

At step 570, based on the notification received in step 568, the NWDAF instance/SI 311 may retrieve the collected data from one or more SF SI Sets and/or SF SIs. The NWDAF instance/SI 311 may send a Data Retrieval Request to the SF SI set(s) and/or SF instance(s)/SIs to get the collected data. The message may include one or more of following information: Data Type ID(s) and one or more of attributes of Data Collection Attributes such as collection time period(s), location(s), S-NSSAI, Internal Group ID, DNN, NF ID(s).

At step 572, the SF 350, such as SF SI SCs and/or SF SIs, may send one or multiple Data Retrieval Response messages, which carries the requested data to the NWDAF SI 311.

The NWDAF instance/SI 311 may store the received data in NWDAF SI Set Data Storage 313.

At step 574, the NWDAF instance/SI 311 performs data analytic service as received in step 514.

At step 576, the NWDAF instance/SI 311 may send the Data Analytics Response or Data Analytics Notification to the NF that sent message in step 514.

It will be apparent that the embodiments described in regard to FIGS. 5A to 5C include the following advantages:

a. Each NWDAF instance/SI (e.g. NWDAF instances/SIs 311 and 312) does not have to discover other NF SI Sets or other NF SIs for data collection.

b. The NF SI sets and/or NF SIs are discovered by NWDAF SI SC (e.g. NWDAF SI SC 315)

c. Each NF instance/SI does not need to know where to send reported data to.

d. The NF SI SC of each NF SI set is in charge of collecting data from NF instance/SI and forwarding collected data to a data storage function.

Figure 6:
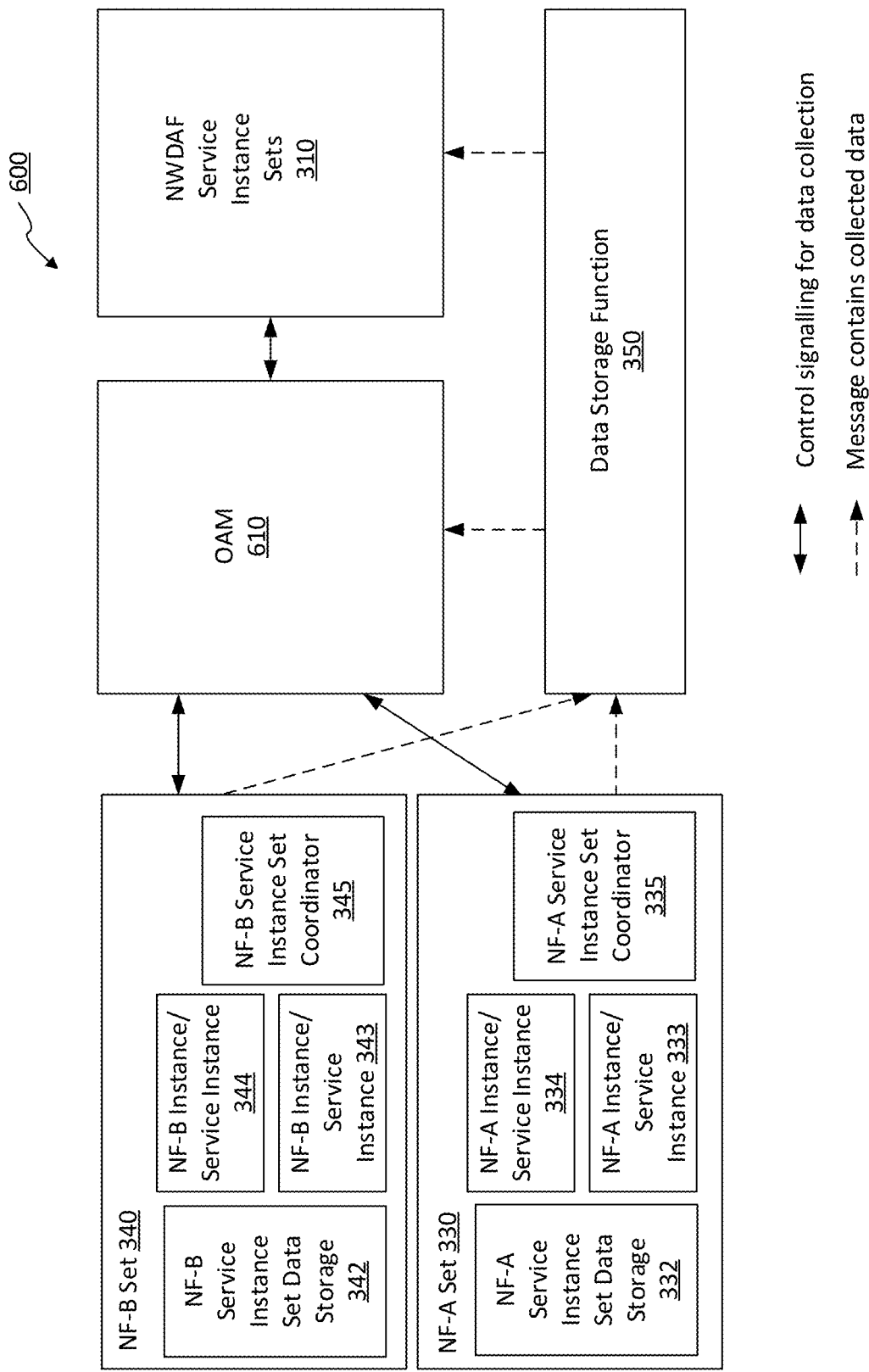
FIG. 6 illustrates an example embodiment of a scheme of data sharing between the OAM system and the NWDAF.

FIG. 6 illustrates an example embodiment of a scheme of data sharing 600 between the OAM system and the NWDAF. In this embodiment, the OAM system 610 is used to perform various network management tasks, such as configuring the NFs, setting user subscription data in the UDM and/or UDR, creating policies for users, PDU sessions, traffic routing in PCF, monitoring network performance. The OAM system 610 may receive requests or subscriptions from NWDAF, such as NWDAF SIs 310 and/or NWDAF SI SC for data to be analyzed. The OAM 610 may configure the NFs, or request AF and/or UEs for data collection. The collected data may be stored in a data storage function (e.g. data storage function 350). The OAM function 610 may inform the address of the storage function 350 so that the NWDAF SI SC or NWDAF SI(s) 310 may access the data storage function 350 to retrieve the data.

Figure 7A:
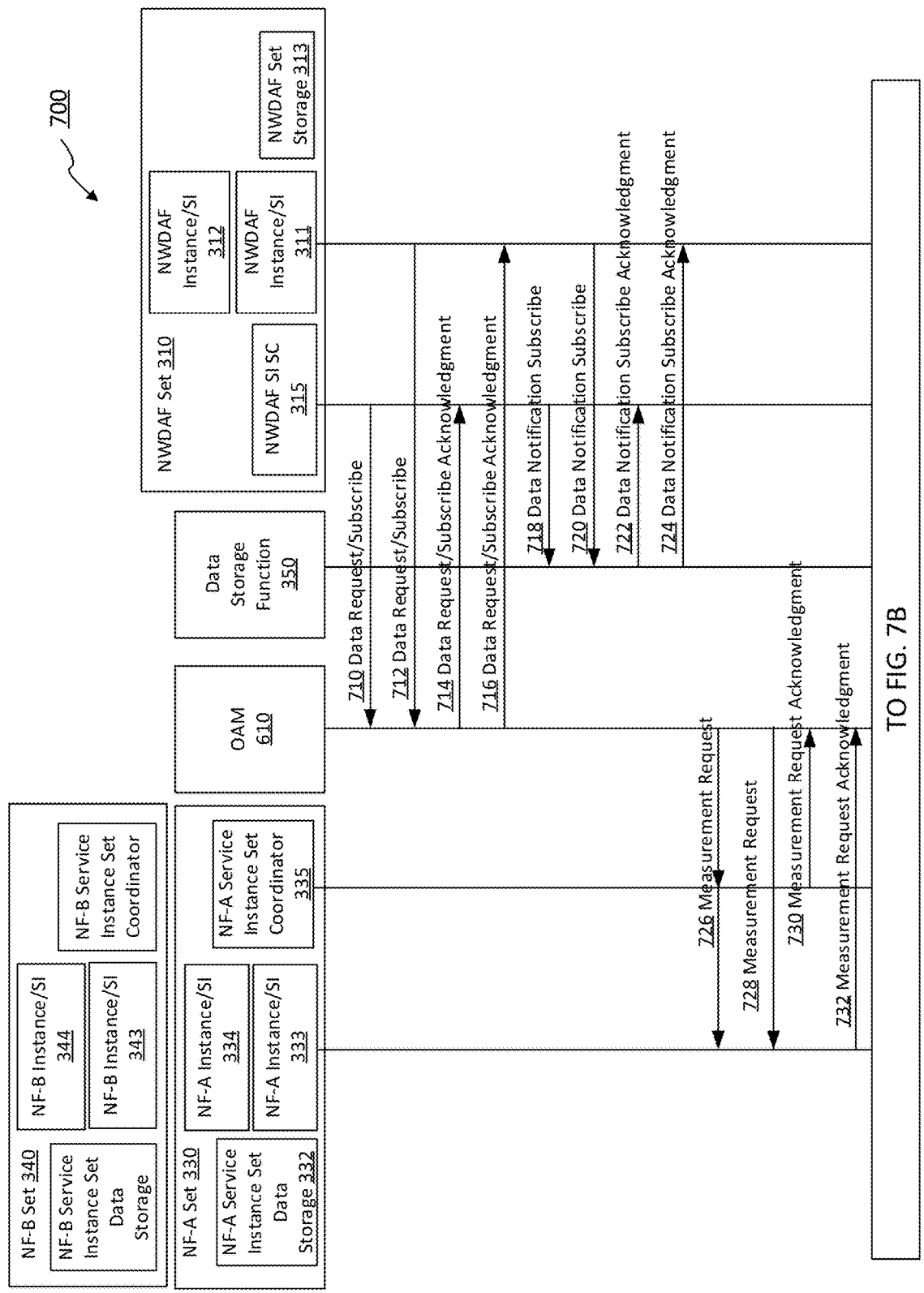
FIGS. 7A and 7B illustrate an embodiment signaling procedure for message exchanges among the NF, OAM, and NWDAF for network data collection.
Figure 7B:
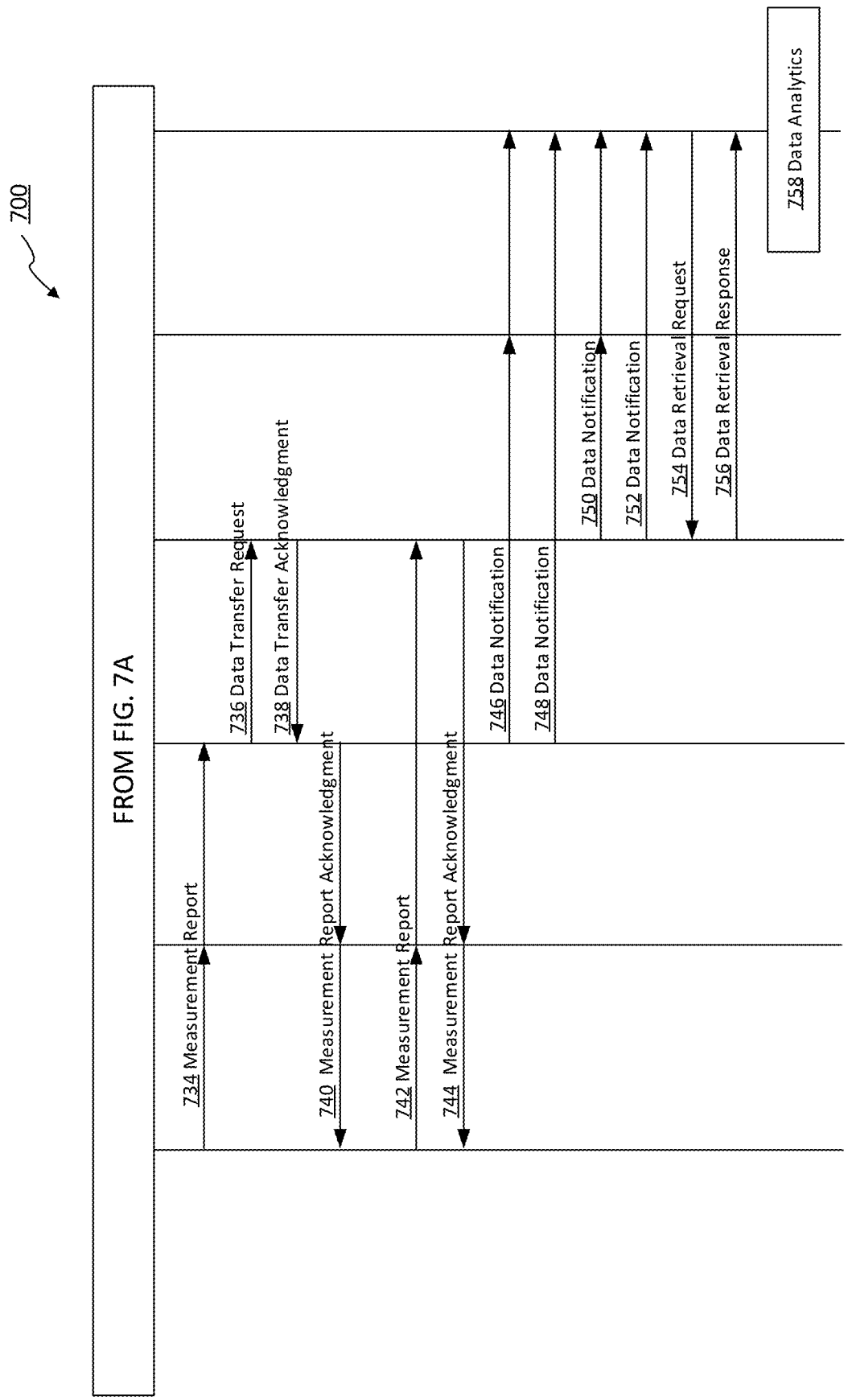

FIGS. 7A and 7B illustrate an embodiment signaling procedure 700 for message exchanges among the NF (e.g. NF-A set 330), OAM (e.g. OAM 610), and NWDAF (e.g. NWDAF SI set 310) for network data collection. Among other advantages, the embodiment of FIGS. 7A and 7B illustrate signaling support for the OAM 610 to indicate which storage function stores network data for data analysis.

When a NWDAF instance/SI (e.g. NWDAF instance/SI 311) or NWDAF SI SC (e.g. NWDAF SI SC 315) of a NWDAF SI set 310 receives a request from a NF instance/SI (e.g. NF-A SI 333) or a NF SI SC of another NF Set, either the NWDAF SI SC 315 or NWDAF instance/SI (e.g. NWDAF instance/SI 311 in this embodiment) may send a request or subscription to the OAM 610 to get the network data for analysis.

At step 710, if the NWDAF SI SC 315 is in charge of data collection from the OAM 610, the NWDAF SI SC 315 may send a Data Request or Data Subscribe message to the OAM 610.

At step 712, if the NWDAF instance/SI 311 (or NWDAF instance/SI 312) is in charge of data collection from the OAM 610, the NWDAF instance/SI 311 may send a Data Request or Data Subscribe message to the OAM 610.

In steps 710 or 712, the Data Request or Data Subscribe message may include the Data Type ID(s) and Data Collection Attributes. For each Data Request, the OAM 610 may send the Data Request Response later to the NF that sends the Data Request when all the required data is available. For example, the NWDFA instance/SI 311 may send Data Request for UPF load information in certain network areas for a certain time period. After receiving all the data from NFs and/or UEs that operate in the required network areas and/or in the required time period and/or match the Data Collection Attributes, the OAM 610 may send a Data Request Response message to the NF that requested the data. More details will be provided in other steps.

In steps 710 or 712, the Data Subscribe message may indicate which Data Type ID(s) the NWDAF SI SC or NWDAF instance(s)/SI(s) want to get immediately when the record(s) of Data Type ID(s) are available, for example when the data record is received by the OAM function 610. For example, the NWDAF instance/SI 311 may want to receive a Data Type that indicate the high load condition in a NF, such as RAN node, UPF, SMF, AMF. The OAM 610 may send a Data Notification message to the NWDAF instance/SI 311 when the OAM 610 receives a high load message.

At step 714, if the OAM 610 received message in step 710 from the NWDAF SI SC 315, the OAM 610 may send a Data Request Acknowledgement or Data Subscribe Acknowledgment to the NWDAF SI SC 315. This message is to acknowledge the reception of message in step 710. If the requested data is available, the message may include an indication that the data is available and the address(es) (e.g. IP address, or FQDN, or ID) of the data storage function(s) (e.g. storage function 350), where the NWDAF SI SC 315 may access to retrieve all or some Data Type(s). If the data is not available and may be collected and provided to the NWDAF SI SC 315 later according to the Data Collection Attributes, the OAM 610 may include address(es) of SF(s) (e.g. storage function 350) that the NWDAF SI SC 315 may retrieve all or some Data Type(s) in the future.

The NWDAF SI SC 315 may forward the SF information received from the OAM 610 to the NWDAF SI 311, which has been selected to provide data analytic service requested by some NF instance(s)/SI(s) (e.g. NF-A instance/SI 333) or some NF SI SC(s) of other NF Sets.

At step 716, if the OAM 610 received message in step 712 from the NWDAF instance/SI 311, the OAM 610 may send a Data Request Acknowledgement or Data Subscribe Acknowledgment to the NWDAF instance/SI 311. This message is to acknowledge the reception of message in step 712. If the requested data is available, the message may include an indication that the Data Type(s) is/are available and the address(es) of the data storage function(s) (e.g. storage function 350), where the NWDAF instance/SI 311 may access to retrieve all or some Data Type(s). If the data is not available and may be collected and provided to the NWDAF instance/SI 311 later according to the Data Collection Attributes, the OAM 610 may include address(es) of SF(s) (e.g. storage function 350) that the NWDAF instance/SI 311 may retrieve the data in the future.

Each SF SI Set, or SF SI Subset, or SF service set, or SF instance, or SF SI may store one or multiple Data Types. Hence the OAM 610 may need to inform the NWDAF SI SC 315 (or NWDAF SI Subset, or NWDAF instance(s), or NWDAF service set, or NWDAF SI(s) 311) which SF SI Set(s) and/or SF instance(s)/SI(s) store which Data Type(s).

If the OAM 610 indicates that the requested data is already available in some SFs, steps 718 to 752 can be skipped. In step 754, the NWDAF instance/SI 311 may retrieve data from SF SI set(s), and/or SF instance(s), SF service set(s), and/or SF SI(s) of SF SI sets to perform data analytics.

At step 718, if the OAM 610 indicates the address(es) of SF SI Set(s), and/or SF SI Subset(s), and/or SF instance ID(s) and/or SF SI ID(s) in step 714, the NWDAF SI SC 315 may send a Data Notification Subscribe or Data Request message to the SF SI Set(s), or SF SI Subset(s), or SF instance, or SF service set, or SF SI. The message may indicate which Data Type ID(s) the NWDAF SI SC 315 may want to receive Notification when the data records are received by the SF 350.

At step 720, if the OAM 610 indicate the address(es) of SF SI Set ID(s), and/or SF SI Subset ID(s), and/or SF instance ID(s), and/or SF service set, and/or SF SI ID(s) in step 716, the NWDAF SI 311 may send a Data Notification Subscribe or Data Request message to the SF SI Set(s), or SF SI Subset(s), or SF SI(s). The message may indicate which Data Type ID(s) the NWDAF SI 311 may want to receive Notification when the data records are received by the SF 350.

At step 722, the SF 350, for example SF instance(s)/SI(s) of some SF SI set(s) or SF SI SC, may send a Data Notification Subscribe Acknowledgment to the NWDAF SI SC 315 to confirm the reception of the message in step 718. Alternatively, the SF 350, for example SF instance(s)/SI(s) of some SF SI set(s) or SF SI SC, may send a Data Response to the NWDAF SI SC 315 to transfer the data requested in step 718 if the data becomes available.

At step 724, the SF 350 may send a Data Notification Subscribe Acknowledgment to the NWDAF SI 311 to confirm the reception of the message in step 720. Alternatively, the SF 350, for example SF SIs of some SF SI set(s) or SF SI SC, may send a Data Response to the NWDAF instance/SI 311 to transfer the data requested in step 720 if the data becomes available.

If the requested data is to be collected from the NFs (e.g. NF-A set 330), the OAM 610 may send a Measurement Request or data collection request to the NF Set(s). This message is to request data collection for Data Type ID(s) and Data Collection Attributes that requested by the NWDAF (e.g. NWDAF set 310).

At step 726, if the NF-A SI SC 335 receive the request for data collection from the OAM function 610, the NF-A SI SC 335 may forward the request of the OAM 610 to the NF-A instance(s)/SI(s) (e.g. NF-A instance/SI 333, NF-A instance/SI 334) that can provide the requested data.

At step 728, if the OAM function 610 sends the Measurement Request to NF-A SIs, such as NF-A SI 333, the NF-A SI 333 may receive this message.

In step 726 or 728, the OAM 610 may include the address(es) (e.g. IP address, SF ID, SF FQDN) of SF SI Set(s), and/or SF SI Subset(s), and/or SF instance(s), and/or SF service set, and/or SF SI(s) and Data Type ID(s) that can be stored in each SF, such as SF SI Set, or SF SI Subset, or SF instance, or SF SI. Each SF instance/SI or SF SI set may be used to store one or more Data Type ID(s).

At step 730, the NF-A SI SC 335 may send a Measurement Request Acknowledgment to the OAM 610 to acknowledge the reception of the message in step 726.

At step 732, the NF-A instance/SI 333 may send a Measurement Request Acknowledgment to the OAM 610 to acknowledge the reception of the message in step 728.

Referring to FIG. 7B, at step 734, the NF-A instance/SI 333 may perform necessary measurements, or collecting event(s) as required in Data Type ID(s) and Data Collection Attributes. The NF-A instance/SI 333 may send the Measurement Report the NF-A SI SC 335 if the NF-A SI SC 335 sent the Measurement Request to the NF-A instance/SI 333 in step 726. Alternatively, the NF-A instance/SI 333 received the request from OAM 610 in step 728, the NF-A SI 333 may send the Measurement Report or event notifications to the OAM 610.

At step 736, the OAM 610 may send Data Transfer Request, which may carry the received record(s) of Data Type(s) to one or more SF 350, such as SF SI Set(s), SF SI Subset(s), SF instance(s), SF SI(s).

At step 738, the SF 350, such as SF SI Set(s), SF SI Subset(s), SF instance(s), SF SI(s), may send Data Transfer Acknowledgment to the OAM function 610 to acknowledge that the data records have been received and stored in the SF 350.

At step 740, the OAM 610 may send Measurement Report Acknowledgment to the NF-A Set 330, which is received by NF-A SI SC 335 or NF-A instance(s)/SI(s) (such as NF-A SI 333).

In case the OAM 610 in step 726 and/or 728 provides the address(es) of SF(s) 350, steps 730 to 738 may be skipped.

At step 742, the NF-A instance/SI 333 may send a Measurement Report to the NF-A SI SC 335 and the NF-A SI SC 335 may send the Measurement Report to the SF 350, such as SF Set(s), SF Subset(s), SF instance(s)/SI(s). Alternatively, the NF-A instance/SI 333 may send the Measurement Report to the SF 350 directly.

At step 744, the SF 350 may send Measurement Report Acknowledgement to the NF-A Set 330, such as to NF-A SI SC 335 if the NF-A SI SC 335 sent the data record(s) to the SF 350. The SF 350 may send Measurement Report Acknowledgement to the NF-A instance/SI 333 if the NF-A instance/SI 333 sent the data record(s) to the SF 350.

At steps 746 and 748, if the OAM 610 received the Measurement Report(s) in step 734, the OAM 610 may send a Data Notification to the NWDAF SI Set(s) 310, NWDAF SI Subset(s), and/or NWDAF instance(s)/SI(s) 311/312. The Data Notification message may include one or more of following information: SF SI Set ID or address, SF SI Subset ID or address, SF SI ID or address, Data Type ID(s), one or more attributes of Data Collection Attributes of each Data Type ID.

The NWDAF SI SC 315 or NWDAF instance/SI 311 may receive the Data Notification message.

For example, in step 746, if the NWDAF SI SC 315 sent the Data Request or Data Subscribe message in step 710, the NWDAF SI SC 315 may receive the Data Notification from the OAM function 610. The NWDAF SI SC 315 may send the Data Notification to the NWDAF instance/SI 311, which is the function that will perform data analysis.

At step 748, if the NWDAF instance/SI 311 sent the Data Request or Data Subscribe message in step 710, the NWDAF instance/SI 311 may receive the Data Notification from the OAM function 610.

At step 750, the SF 350 may send Data Notification message to the NWDAF SI SC 315 if the NWDAF SI SC 315 subscribed for data notification service of the SF 350, for example in step 718. The NWDAF SI SC 315 may send the Data Notification message to the NWDAF instance/SI 311, which is the NWDAF instance/SI 311 selected to provide data analysis service.

At step 752, the SF 350 may send Data Notification message to the NWDAF SI 311 if the NWDAF SI 311 subscribed for data notification service of the SF 350, for example in step 718.

At step 754, the NWDAF instance/SI 311 may send Data Retrieval Request to the SF 350 to retrieve the data. The message may include one or more of following information: SF SI Set ID (or FQDN, or IP address), SF SI Subset ID (or SQDN, IP address), SF Instance ID (or FQDN, or IP address), SF SI ID (or FQDN, or IP address), Data Type ID(s), one or more attributes of Data Collection Attributes of each Data Type ID.

At step 756, the SF 350 may send the data records of Data Type(s) with requested attributes provided in step 754.

At step 758, the NWDAF instance/SI 311 may store the received data records in NWDAF SI Set Data Storage function 313. The NWDAF instance/SI 311 may perform data analysis and provides the analytics results to the requesting NF. The analytics results may be statistics and/or prediction, and/or recommendation of network operation parameters, such as some UE parameters (such as mobility pattern parameters, communication pattern parameters), NF load statistics at certain time periods of the day, days of the week, or expected QoS parameters at certain time periods of the day, days of the week, at certain network location (such as RAN cell ID(s)).

In the methods described in FIGS. 4AA to 4AC, 4BA to 4BC, 4CA and 4CB, 5A to 5C, 7A and 7B, the Data Collection Request or Data Collection Subscribe may be implemented by using event exposure or NF status services of network functions, such as AMF, SMF, PCF, and NRF. For example, the NWDAF may subscribe to the event exposure Namf_EventExposure_Subscribe services of AMF as described in 3GPP TS 23.502, clause 5.2.2.3, the UE location Namf_Location service of the AMF as described in 3GPP TS 23.502, clause 5.2.2.5, the event exposures Nudm_EventExposure services of UDM function as described in 3GPP TS 23.502, clause 5.2.3.5, the user subscript update Nudm_SDM_Subscribe service of UDM as described in 3GPP TS 23.502, clause 5.2.3.3.4, the event exposure Npcf_EventExposure services of PCF as described in 3GPP TS 23.502, clause 5.2.5.7, the event exposure Nsmf_EventExposure services of SMF. By using the event exposure services of NFs, the Data Type ID can be represented by Event ID, the Data Collection Attribute of Data Type ID could be represented by Event Filter of corresponding Event ID.

One of the type of events that the SMF can provide is called "PDU Session Events". The PDU Session Events may include the events: when a PDU Session is established or released, when a UP of PDU Session is activated or deactivated, when a UE enters CM-IDLE state and RRC Idle state, or when a UE enters CM CONNECTED state and RRC-Connected state, or CM-CONNECTED and RRC Inactive state. When one of this event happens, the SMF may send to the NFs that subscribe to PDU Session Events, one or more of PDU Session Context such as UE ID, UE location, e.g. RAN ID or Cell ID, DNN, S-NSSAI, traffic volume, UPF load, measured QoS parameters of QoS flows of the PDU session in the uplink and downlink, such as MFBR, MFBR, measured UE-AMBR, average bit rate of QoS flows, measured average UE bit rate, the duration a QoS flow having downlink and/or uplink data activity, average packet delay or packet error rate in one or multiple periods before the PDU Session Events happen.

Figure 8A:
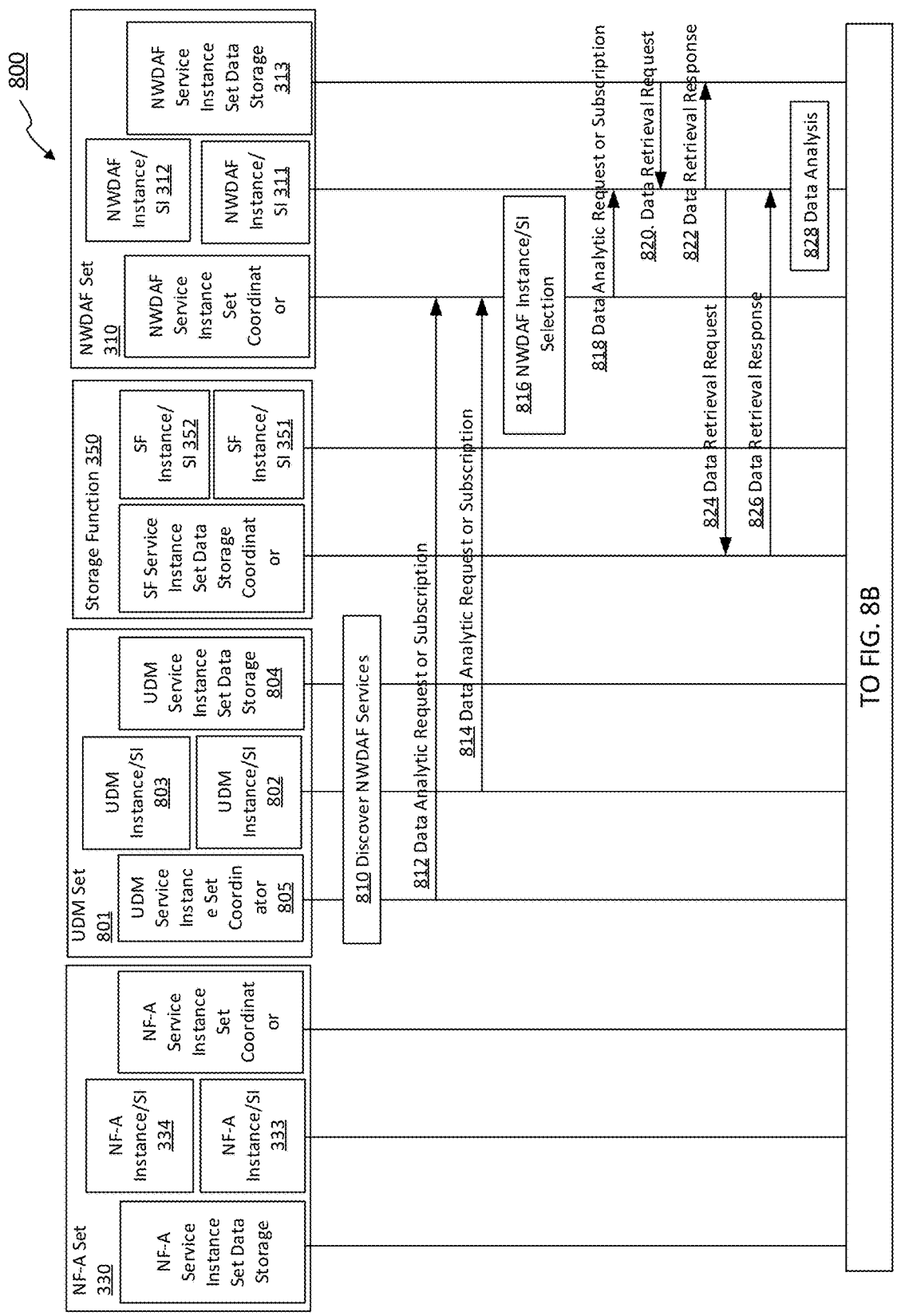

FIGS. 8A and 8B illustrate an example signaling procedure 800 of storing and sharing analytical data produced by the NWDAF (e.g. NWDAF set 310) including a solution that allows multiple NFs to use the same output analytical data of the NWDAF. Among other advantages, the embodiment of FIG. 8 provides and uses a common storage function to store data analytic results produced by the NWDAF. This is to avoid multiple NFs to request the same analytical data and to avoid processing overload in the NWDAF and to reduce the processing delay.

The UE mobility pattern describes the location(s) of the UE in a certain time period. For example, one the UE mobility pattern may consist of a list of cell ID(s) or a list of (R)AN node ID(s) from 9:00:00 AM to 12:00:00 PM where the UE may be served. The AMF and/or SMF, and/or PCF may use the UE mobility pattern to determine a number of parameters. For example, the AMF and PCF may use UE Mobility pattern to optimize Registration Area, Tracking Area for this UE. The SMF may use UE Mobility pattern to select a UPF during PDU Session Establishment procedure, Handover procedure, Service Request procedure and other procedures that require selection or reselection of UPF for routing traffic of UE in the uplink and downlink.

There are other parameters, for example UE Communication Pattern, which may describe, for example, how often the UE enters connected state and access a specific data network. The AMF may use UE Communication Pattern to optimize DRX (Discontinuous Reception) cycle. The SMF may use UE Communication Pattern to determine when to release a user plane connection of a PDU session if no UL nor DL data is detected.

The NWDAF may collect data from UE, network functions, OAM, and AF to analyze UE behavior and derive network operational parameters such as UE Mobility Pattern and UE Communication Pattern. If multiple NFs request the same parameter from the NWDAF, the NWDAF may have to analyze the large amount of collected data many times. These repeated requests may cause processing overload in the NWDAF and may lead to long delay in signaling procedures that require analytical results from the NWDAF. For example, during PDU Session establishment, the SMF may request UE Mobility Pattern. If the response from the NWDAF is too long, the SMF may consider that the NWDAF fails to send the UE Mobility Pattern. The SMF may select a UPF without input from the NWDAF. The selected UPF may be not optimal and the UE has to wait longer for PDU session establishment.

In this embodiment, a solution is introduced to address the above problems. The UDM function may request or subscribe NWDAF for analytical results, including but not limited to, such as UE related parameters such as UE Mobility Patterns, UE Communication Patterns, QoS parameters such as UE aggregate bit rate, total traffic volume of some services such as background data transfer, and/or application related parameters, or any relevant analytical results that may be used by other NFs and/or AF, and/or OAM, and/or UEs. The NWDAF sends the analytical results, such as statistics, and/or prediction, and/or recommendation of the requested parameters to the UDM. The UDM stores the analytical results sent from the NWDAF, and/or may further derive the parameters based on the analytical results. Whenever a network entity, such as AMF, PCF and SMF, OAM, UEs, requests UE-related parameters or any other parameters, the UDM may send the analytic results, or the derived parameters to the network entity. In this way, the NFs, or other network entities, may not need to request the NWDAF for analytic data to avoid long delay and overload in the NWDAF.

Similar concepts as described for the UDM function can be applied for PCF. The PCF may request or subscribe NWDAF for QoS related statistics, routing statistics. The PCF may provide derived parameters and provide to other NFs subsequently.

At step 810, a UDM instance/SI (e.g. UDM instance/SI 802 or 803) or a UDM SI SC (e.g. UDM SI SC 805) of a UDM SI Set (e.g. UDM SI Set 801), or UDM SI Subset may be configured by the OAM to handle communications with NWDAF 310 in order to obtain data analytics related to network operation parameters, such as UE Mobility Patterns, UE Communication Patterns, UE Aggregated Maximum Bit Rate, application related parameters. The UDM instance/SI 802 or UDM SI SC 805 may discover NWDAF SI Set(s) 310, and/or NWDAF instance(s)/SI(s) 311, that can provide the required analytic services, for example by OAM configuration stored inside the UDM SI SC 805, or inside the UDM instance/SI 802, or in a UDM SI Set Data Storage function 804, or any logical or physical entities of UDM set 801. Alternatively, the UDM SI SC 805 or UDM instance/SI 802 may discover NWDAF SI Set(s) 310 and/or NWDAF instance(s)/SI(s) 311 by requesting or subscribing to NRF services. The NRF may provide NF profile(s) of the NWDAF Set(s) 310, or NWDAF SI Subset(s), or NWDA instance(s), or NWDAF service set(s), or NWDAF SI(s) 311 to the UDM SI SC 805 or UDM instance/SI 802. The NRF may also provide the profile(s) of NWDAF instance(s)/SI(s) 311, or NWDAF SI Subset(s), or NWDAF SI Set(s) 310, where the service(s) of NWDAF is/are indicated such the UE-related analytic services, NF-related analytic services, traffic routing assistance analytic services. The UDM SI SC 805 or UDM instance/SI 802 selects a NWDAF SI Set (e.g. NWDAF SI Set 310), or NWDAF SI Subset, or NWDAF instance/SI (e.g. NWDAF instance/SI 311) for providing analytical data.

At step 812, if the UDM SI SC 805 is configured to communicate with NWDAF to obtain the analytic data, the UDM SI SC 805 may select one NWDAF SI set 310 or NWDAF subset, or one of NWDAF SI 311 from NWDAF information the NRF provided. The UDM SI SC 805 may send a Data Analytic Request or Data Analytic Subscription message to the address of selected NWDAF instance/SI 311, or to the address of selected NWDAF SI Set 310, or to the address of the selected NWDAF SI Subset, which may be received by a NWDAF SI SC 315 of this NWDA SI Set 310 or NWDAF SI Subset.

At step 814, if the UDM instance/SI 802 is configured or selected by the UDM SI SC 805 to communicate with the NWDAF to obtain the analytic results, the UDM instance/SI 802 may select one NWDAF SI set (e.g. NWDAF SI set 310) from one of the NWDAF sets or one of NWDAF instance/SI (e.g. NWDAF instance/SI 311) from NWDAF information the NRF provided. The UDM instance/SI 802 may send a Data Analytic Request or Data Analytic Subscription message or the address of selected NWDAF instance/SI 311, or NWDAF SI Set 310, or NWDAF SI Subset, or NWDAF service set. In case the message is sent to NWDAF SI Set 310 or NWDAF SI Subset, the NWDAF SI SC 315 of the NWDAF SI Set 310 or NWDAF SI Subset, or NWDAF service set may receive the message.

If the UDM SI SC 805 or UDM instance/SI 802 discovered or selected an NWDAF instance/SI 311, step 816 below may be skipped.

At step 816, if the NWDAF SI SC 315 receives the message from UDM SI SC 805 or UDM instance/SI 802, the NWDAF SI SC 805 may select one of NWDAF SIs (e.g. NWDAF SI 311) to process the request from UDM SI SC 805 or UDM instance/SI 802.

At step 818, if the message in step 812 or 814 has been sent to the NWDAF SI SC 315, the NWDAF SI SC 315 forwards the request received in step 812 or step 814 to the selected NWDAF instance/SI 311. If the message in step 812 or 814 has been sent to a NWDAF instance/SI 311, step 818 is skipped.

At steps 820 and 822, the NWDAF instance/SI 311 may retrieve collected data from NWDAF Set storage function 313. The steps to collect data have been described in earlier embodiments. The NWDAF SI Set Data Storage 313 could be an internal storage function of the NWDAF SI Set 310, or could be a UDSF instance/SI, or could be a UDSF SI set, or any storage function.

At steps 824 and 826, alternatively, the NWDAF instance/SI 311 may retrieve collected data from another storage function outside NWDAF Set (e.g. Storage Function 350). The steps to collect data have been described in earlier embodiments. The outside storage function could be a UDR storage function or could be a UDSF storage function.

At step 828, after having data, the NWDAF instance/SI 311 performs data analytic to produce analytical data, such as statistics, or predictions, or recommendations of parameters requested in step 812 or step 814.

At step 830, if the UDM SI SC 805 requested analytical data in step 812, the NWDAF instance/SI 311 may send the analytical data to the UDM SI SC 805.

At step 832, if the UDM instance/SI 802 requested analytical data in step 814, the NWDAF instance/SI 311 may send the analytical data to the UDM instance/SI 802 by using Data Analytic Response or Data Analytic Notification messages.

At step 834, the UDM SI SC 805 may store the received analytical data to a storage function of the UDM SI Set 801 (e.g. UDM SI set storage function 804).

At step 836, the UDM SI 802 may store the received analytical data to a storage function of the UDM SI Set 801 (e.g. UDM SI set storage function 804)

At step 838, the UDM SI SC 805 may store the received analytical data to a storage function outside of the UDM Set 801 (e.g. Storage Function 350).

At step 840, the UDM instance/SI 802 may store the received analytical data to a storage function outside of the UDM SI Set 801 (e.g. Storage Function 350).

At step 838 or step 840, the storage function (e.g. Storage Function 350) outside of the UDM set 801 could be a UDR function, such as a UDR SI set, or a UDR SI Subset, or a UDR instance, or a UDR SI.

At step 842, a NF-A instance/SI 333 may send a request or subscribe message to the UDM 801 to request for one or more network operation parameters. The UDM SI SC function 805 may receive this request from NF-A 330. The UDM SI SC 805 may select a UDM instance/SI 802 and send the request received from the NF-A instance/SI 333 to the selected UDM instance/SI 802.

At step 844, as an alternative to step 842, a NF-A instance/SI 333 may send a request or subscribe message to the UDM instance/SI 802 to request for one or more network operation parameters.

At step 846, the network operation parameters may include analytical results obtained from the NWDAF 310. The UDM instance/SI 802 may retrieve the analytical results from a storage function 804 in step 834, or 836, or 838, or 840. The UDM instance/SI 802 may send the network operation parameters, including analytic data received from the NWDAF 310, or parameters derived by UDM 801 based on the analytic data received from the NWDAF 310 and data receive from other network entities, such as AFs, UEs, OAM, to the NF-A instance/SI 333 by using Data Response service or Data Notification service of the NWDAF 310.

For example, the AMF during UE registration procedure may request UDM 801 to provide Access and Mobility Subscription data. The UDM 801 may send to the one or more types of analytical data obtained from the NWDAF 310, including but not limited to UE behavioural information, and/or Mobility pattern, and/or Communication patterns to the AMF. The AMF may use analytical data to optimize mobility management parameters for the UE, such as Registration Area, Tracking Area. The AMF may transfer the analytical data received from the UDM 801, such as UE behavioural information, and/or Mobility pattern, and/or Communication patterns to the PCF during UE Registration procedure and SMF during PDU Session Establishment procedure. The AMF may implicitly or explicitly subscribe the UDM 801 to receive updates of analytical information so that whenever the NWDAF 310 sends updates of analytical information, the UDM 801 will send the updates of analytic information to the AMF; the AMF may send the updates of analytical data to the PCF and SMF.

In another example, during PDU Session Establishment procedure, the SMF may request UDM 801 to provide Session Management Subscription data. The UDM 801 may send Session Management Subscription data, and analytical data related to the UE such as UE behavioural information, and/or Mobility pattern, and/or Communication patterns to the SMF. The SMF may use this analytical data to make UPF selection, Inactive Timer to deactivate user plane for the UPF to monitor UL and DL data activity. During the PDU Session Establishment procedure, the SMF may transfer the analytical data received from the UDM 801, such as UE behavioural information, and/or Mobility pattern, and/or Communication patterns to the PCF. The SMF may implicitly or explicitly subscribe the UDM 801 to receive updates of analytical information so that whenever the NWDAF 310 sends updates of analytical information, the UDM 801 will send the updates of analytic information to the SMF; the AMF may then send the updates of analytical data to the PCF and SMF.

In another example, during PDU Session Establishment procedure, the AMF may forward one or more of analytical data received from the UDM 801, for example UE behavioural information, and/or Mobility pattern, and/or Communication patterns to the SMF. The SMF may use this analytical data to make UPF selection, Inactive Timer setting to deactivate user plane for the UPF to monitor UL and DL data activity.

At step 850, the NF-A instance/SI 333 may store network operation parameters, including analytical data, or data derived from analytical data, received from the UDM instance/SI 802 in a storage function 335 of the NF-A instance/SI 333, or NF-A SI Set Data Storage function 332.

Figure 9:
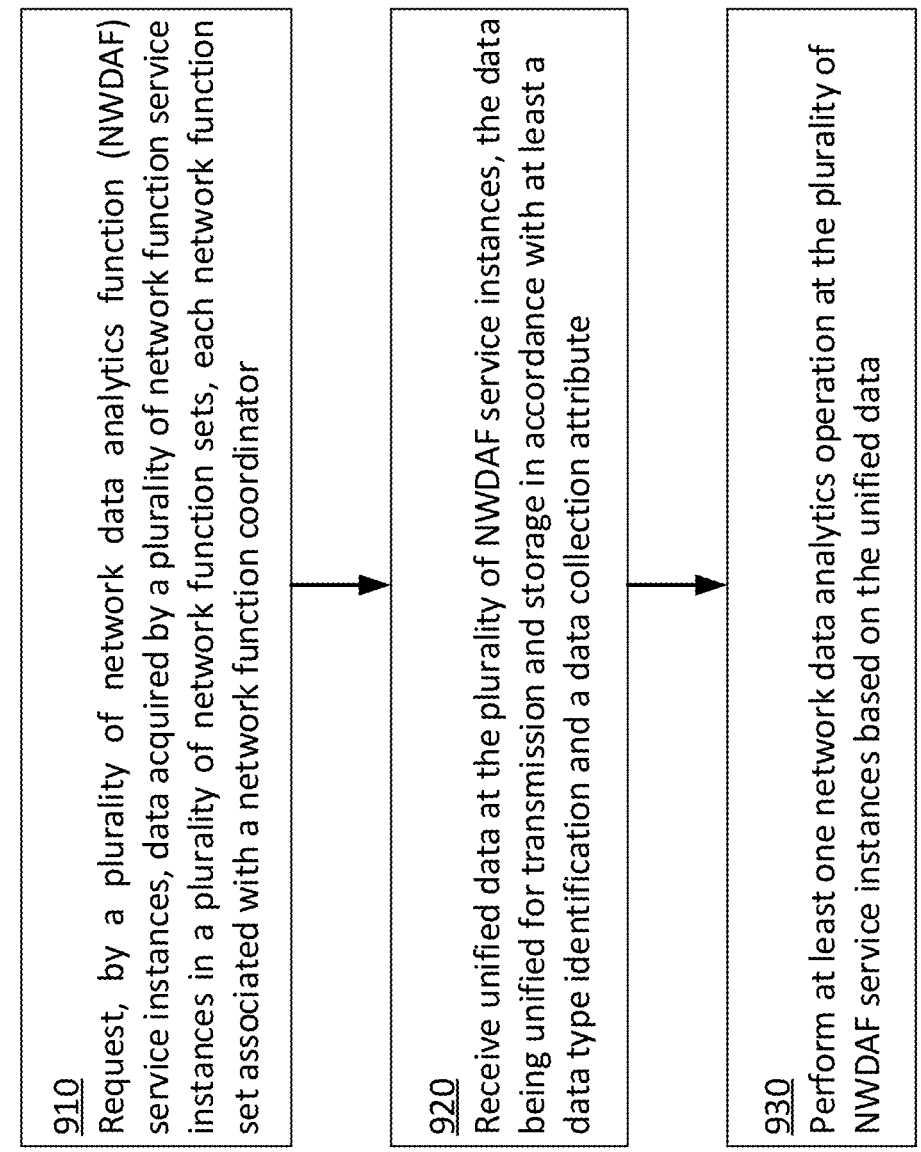
FIG. 9 illustrates an example method of unifying data transmission and storage in a communication network.

FIG. 9 illustrates an example method 900 of unifying data transmission and storage in a communication network.

The method includes, at operation 910, requesting, by a plurality of network data analytics function (NWDAF) instances/SIs, data acquired by a plurality of network function SIs in a plurality of network function SI sets, each network function SI set associated with a network function SI SC.

The method also includes, at operation 920, receiving unified data at the plurality of NWDAF SIs, the data being unified for transmission and storage in accordance with at least a data type identification and a data collection attribute.

The method further includes, at operation 930, performing at least one network data analytics operation at the plurality of NWDAF SIs based on the unified data.

The system and methods introduced above can be used to optimize the data collection and storage in the mobile network so that multiple NWDAF SIs and/or multiple NWDAF SI sets can analyze the network operation data and produce analytical data.

In the following the methods to transfer analytical data produced by the NWDAF to other network functions are presented.

Figure 11:
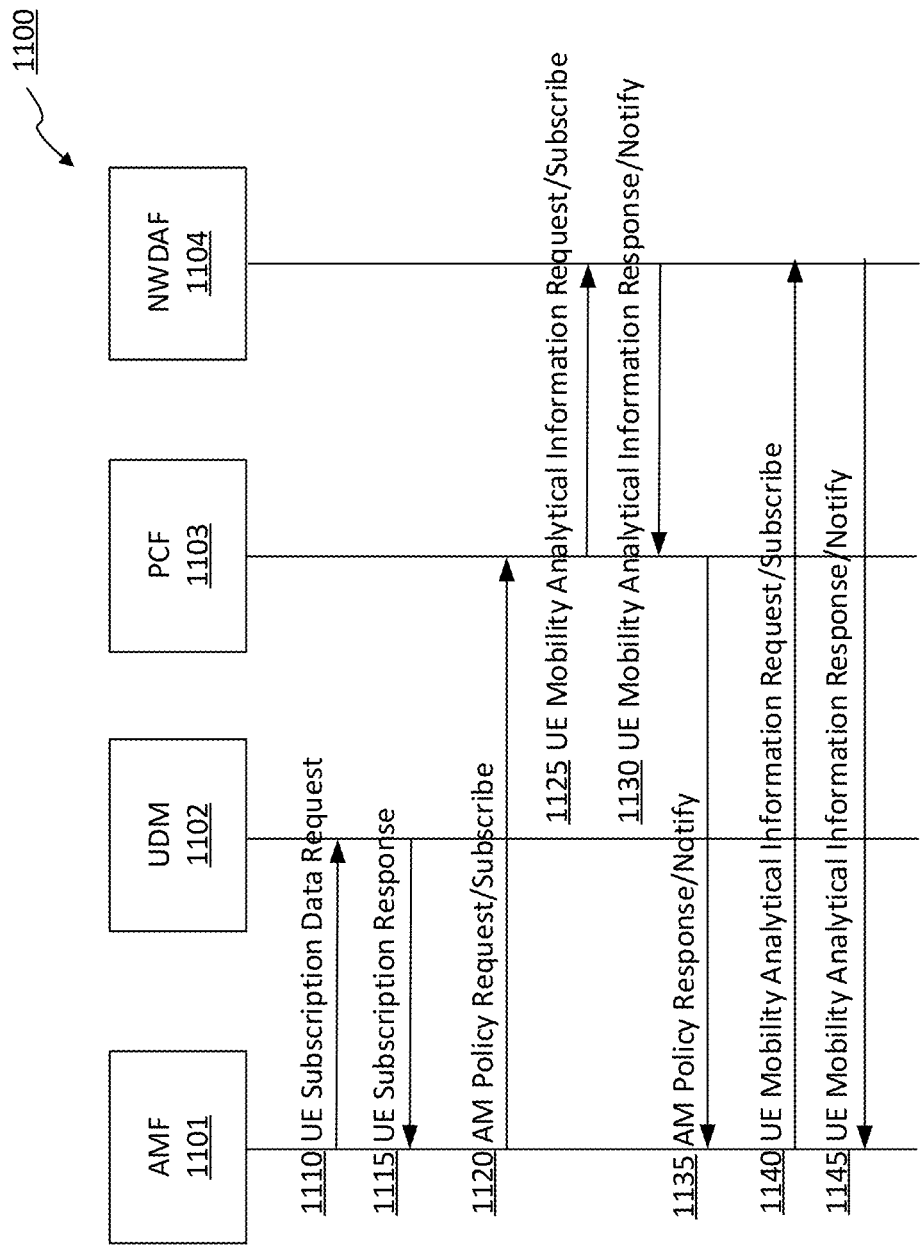
FIG. 11 illustrates an embodiment of some signaling messages as part of a UE registration procedure in order to access and use the resources of the mobile network.

FIG. 11 illustrates an example flow 1100 of some signaling messages as part of UE registration procedure. The UE needs to perform registration procedure with the mobile network in order to access and use the resources of the mobile network. One possible signaling flow to support UE registration is described in clause 4.2.2.2.2 of 3GPP TS 23.502. To simplify the discussion, only the NF names, such as AMF, SMF, PCF, UDM, NWDAF are used in FIG. 11, and also in other FIGS. 12, 13, 14. However, this NF name can be replaced by NF instance/SI, or NF SI SC, or any entities of NF set that are designed to provide the services. For example, the NF AMF can be replaced by AMF instance/SI, or AMF SI SC. Accordingly, in the implementations, a service instance (or an instance for short) of the network function AMF set or the SI Set Coordinator of the network function AMF set can perform the signaling as described in FIGS. 11, 12, 13, 14.

In FIG. 11, during UE Registration procedure, the AMF 1101 may obtain the UE subscription data in step 1110. The message in step 1110 can be implemented by using UDM services, such as Nudm_UECM_Registration, Nudm_SDM_Get, Nudm_SDM_Subscribe as described in one or more of steps 14a, 14b, 14c of clause 4.2.2.2.2 of 3GPP TS 23.502. In this step, the AMF 1101 retrieves the Access and Mobility Subscription data, SMF Selection Subscription data and UE context in SMF data using Nudm_SDM_Get. This requires that UDM 1102 may retrieve this information from UDR by Nudr_DM_Query. After a successful response is received, the AMF 1101 subscribes to be notified using Nudm_SDM_Subscribe when the data requested is modified, the UDM may subscribe to UDR by Nudr_DM_Subscribe. The GPSI is provided to the AMF 1101 in the Access and Mobility Subscription data from the UDM 1102 if the GPSI is available in the UE subscription data. The UDM 1102 may provide indication that the subscription data for network slicing is updated for the UE. Note that the UDR is not plotted in FIG. 11.

At step 1115, the UDM 1102 sends the data required for UE registration to the AMF 1101.

At step 1120, the AMF 1101 may request the PCF 1103 to provide network policies, such as access and mobility (AM) policy, to support UE communication. This step 1120 may be similar to step 16 of clause 4.2.2.2.2, 3GPP TS 23.502, where the message in step 1120 of FIG. 11 may be implemented by some signaling messages of AM Policy Association Establishment during Registration. Further details are described in clause 4.16.1 of 3GPP TS 23.502, where the AMF 1101 may use Npcf_AMPolicyControl_Create request to get the Access and Mobility policy for the UE. Note that this Npcf_AMPolicyControl_Create response message in 3GPP TS 23.502 version 15.4.0, published in December 2018 does not provide the any analytical data produced by the NWDAF 1104.

At step 1125, the PCF 1103 may interact request or subscribe the NWDAF 1104 to obtain UE Mobility Analytical Information.

At step 1130, the NWDAF 1104 may provide UE Mobility Analytical Information to the PCF 1103. Using the UE Mobility Analytical Information, the PCF 1103 may derive some policy parameters for the UE, such as Service Area Restrictions for the UE.

At step 1135, the PCF 1103 may provide AM policy to the AMF 1101.

At step 1140, the AMF 1101 may request or subscribe NWDAF 1104 to get the UE mobility analytical information.

At step 1145, the NWDAF 1104 may provide UE mobility analytical information to the AMF 1101.

The above steps of FIG. 11 could be part of a UE registration procedure. The issue with this procedure is that the PCF 1103 and AMF 1101 need to get the UE mobility analytical information from the NWDAF 1104 in steps 1125 and 1130, and steps 1140 and 1145, respectively. These messages lead to additional delay of UE registration procedure since the NWDAF 1104 needs to handle many requests from the AMF 1101 and PCF 1103. This issue can be avoided by using the present solution illustrated in FIG. 12.

Figure 12:
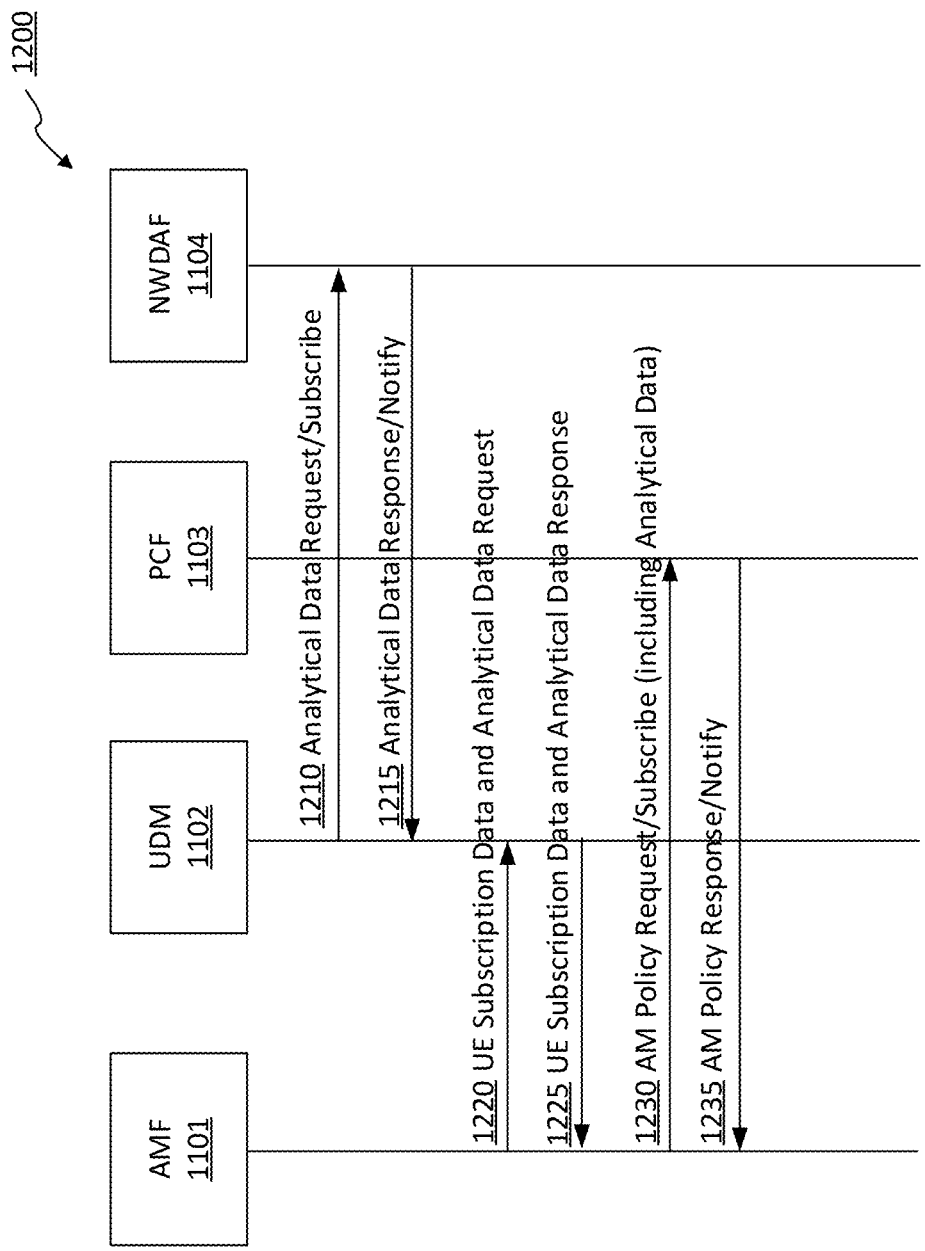
FIG. 12 illustrates an embodiment of some additional signaling messages that may be performed during a UE registration procedure.

FIG. 12 illustrates an example flow 1200 of some signaling messages that could be performed during UE registration procedure, as described in clause 4.2.2.2.2 of 3GPP TS 23.502. At step 1210, the UDM 1102 may request or subscribe NWDAF 1104 to get the some types of analytical data, such as UE-related analytical data, application-related analytical data, QoS-related analytical data.

At step 1215, the NWDAF 1104 sends to the UDM 1102 the requested analytical data.

The UDM 1102 may store the analytical data in the UDR. This signaling message is not plotted in FIG. 12.

Note that steps 1210 and 1215 can be performed any time, before the UE requests UE registration procedure. Therefore, the implementation of step 1210 and 1215 may not incur any delay to the UE registration procedure.

At step 1220, the AMF 1101 may request UDM 1102 to provide UE subscription data and/or analytical data. The AMF 1101 may also implicitly or explicitly subscribe UDM 1102 to provide notification to receive updates of the UE subscription data and analytical data.

At step 1225, the UDM 1102 may provide the AMF 1101 with UE subscription data and/or relevant analytical data that can be used to support access and mobility management for the UE.

At step 1230, the AMF 1101 may request and/or subscribe AM policy from the PCF 1103. In this message, the AMF 1101 may provide PCF 1103 with some part or all of UE subscription data, some AM connection parameters, and some part or all of analytical data received from the UDM in step 1225.

At step 1235, the PCF 1103 provide AM policy in the response or notify message to the AMF 1101. The AM policy parameters may take into account the analytical data received from the AMF 1101.

In FIG. 12, there is no communication between the AMF 1101 and NWDAF 1104, and no communication between the PCF 1103 and NWDAF 1104. Therefore, there is no additional delay to the UE registration procedure, while the AMF 1101 and PCF 1103 still can receive the analytical data produced by the NWDAF 1104.

Figure 13:
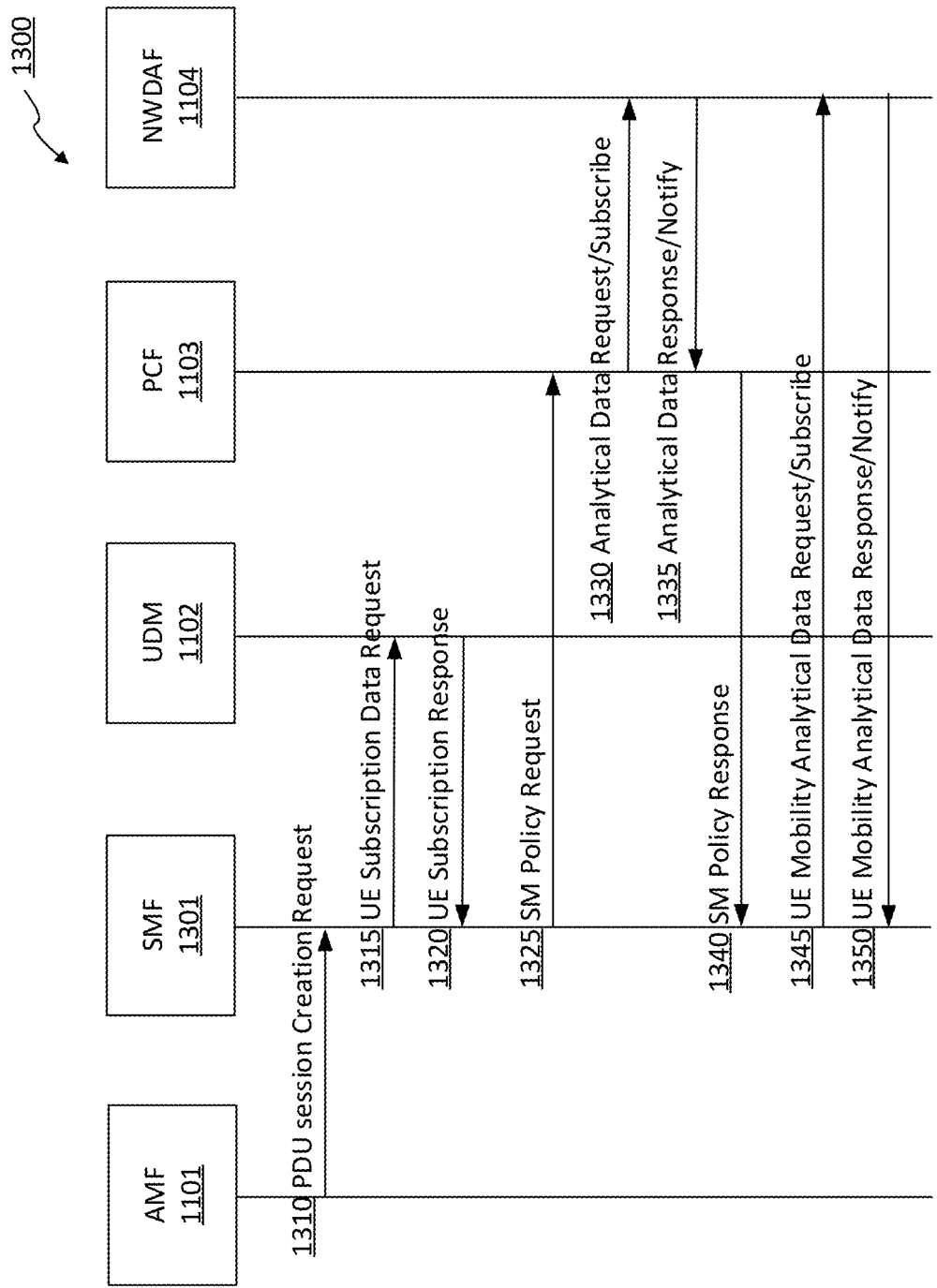
FIG. 13 illustrates an embodiment of signaling messages that may be part of a PDU Session establishment procedure to establish a new PDU session for the UE.

FIG. 13 illustrates an example flow 1300 of some signaling messages that may be part of PDU Session establishment procedure to establish a new PDU session for the UE. The PDU session establishment can be implemented as described, for example, in clause 4.3.2.2.1 of 3GPP TS 23.502, version 15.4.0, published in December 2018.

At step 1310, the AMF 1101 may send PDU Session Creation request the SMF 1301. This step may be similar to step 3 of clause 4.3.2.2.1 of 3GPP TS 23.502.

At step 1315, the SMF 1301 may send UE Subscription Data request the UDM 1102.

At step 1320, the UDM 1102 may provide the UE Subscription Data to the SMF 1301. The UDM 1102 may obtain UE subscription data stored in the UDR. The signaling between UDM 1102 and UDR is not shown in FIG. 13.

Steps 1315 and 1320 may be similar to step 4 of clause 4.3.2.2.1 of 3GPP TS.23.502. Note that step 4 of 4.3.2.2.1 of 3GPP TS.23.502, version 15.4.0 published in December 2018, does not provide the SMF with analytical data.

At step 1325, the SMF 1301 may request the PCF 1103 to provide session management (SM) policy.

At step 1330, the PCF 1103 may request or subscribe a service of NWDAF 1104 to provide analytical data relevant to the UE and application to optimize SM policy.

At step 1335, the NWDAF 1104 provides analytical data to the PCF 1103. The PCF 1103 may use the analytical data and other information to create SM policy for the UE.

At step 1340, the PCF 1103 may provide SM policy to the SMF 1301.

Steps 1325 and 1340 may be implemented by using SM Policy Association Establishment or SMF 1301 initiated SM Policy Association Modification as described in step 7b of clause 4.3.2.2.1 of 3GPP TS 23.502. Note that the procedure in step 7b of clause 4.3.2.2.1 of 3GPP TS 23.502, version 15.4.0, published in December 2018, does not include steps 1330 and 1335 of FIG. 13, which mean that the PCF in step 7b of clause 4.3.2.2.1 of 3GPP TS 23.502 does not use analytical data provided by the NWDAF (e.g. NWDAF 1104) to create SM policy.

At step 1345, the SMF 1301 may request or subscribe NWDAF 1104 to get UE mobility analytical data. The UE mobility analytical data may be used to select UPF.

At step 1350, the NWDAF 1104 may provide the SMF 1301 with UE mobility analytical data.

Figure 14:
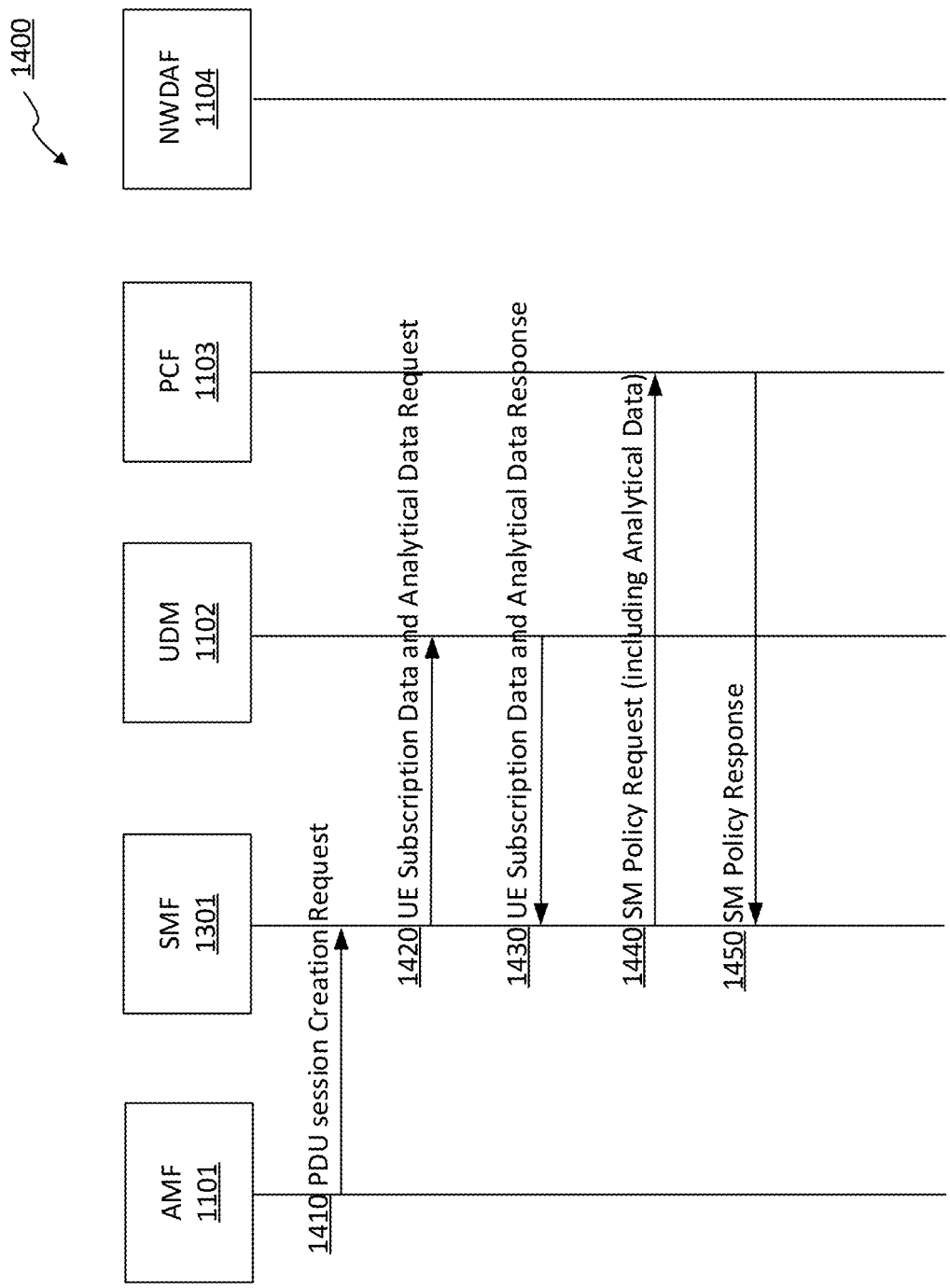
FIG. 14 illustrates an embodiment of an access and mobility function (AMF) initiating a PDU Session Creation request to the SMF, in a variation of the PDU Session establishment procedure.

In FIG. 13, the PCF 1103 and SMF 1301 may get analytical data from the NWDAF 1104 in steps 1330 and 1335 and in steps 1345 and 1350, respectively. These steps lead to additional delay for PDU session establishment procedure. In FIG. 14, an alternative method 1400 is provided to overcome this issue.

In FIG. 14, at step 1410, the AMF 1101 may send a PDU Session Creation request to the SMF. This step is similar to step 1310 of FIG. 13.

At step 1420, the SMF 1301 may request UDM 1102 to provide UDM subscription data and analytical data. It is assumed that the UDM 1102 already has some types of analytical data by using a method described in steps 1210 and 1215 of FIG. 12.

As step 1430, the UDM 1102 may provide the SMF 1301 with UE subscription data and analytical data. The analytical data may include relevant data for the SMF 1301 to optimize traffic routing, system parameters for the PDU session of the UE. The UDM 1102 may obtain UE subscription data and analytical data stored in the UDR. The signaling between UDM 1102 and UDR is not shown in FIG. 14.

At step 1440, the SMF 1301 may request SM policy to the PCF 1103. This message is similar to message in step 1325 of FIG. 13. The difference is that the SMF 1301 may send to the PCF 1103 a part of all of analytical data received from the UDM 1102 in step 1430 so that the PCF 1103 may use relevant analytical data to create SM policy.

At step 1450, the PCF provide SM policy to the SMF 1301.

The method in FIG. 14 avoids signaling messages between the SMF 1301 and NWDAF 1104 and between the PCF 1103 and NWDAF 1104. Therefore, the SMF 1301 and PCF 1103 can obtain the analytical data from the UDM 1102, which has been produced by the NWDAF 1104, but without any additional signaling delay.

More detailed implementation of signaling messages depicted in FIGS. 12 and 14 are described in the following.

In one embodiment, the UDM 1102 may use services of NWDAF 1104 to get analytical data. For example, the UDM 1102 may use Nnwdaf_EventsSubscription_Subscribe/Nnwdaf_EventsSubscription_Unsubscribe to subscribe or unsubscribe one or more notifications for one or more types of analytical data. The UDM 1102 may use Nnwdaf_AnalyticsInfo_Request service of NWDAF 1104 to request for one or more types of analytical data.

The analytical data may be one or more of UE-related analytical data, application-related analytical data, QoS-related analytical data, policy-related analytical data, NF analytical data, network slice analytical data, security analytical data, or any analytical data, or any combinations.

The UE related analytical data may include analytics information of UE behaviour parameters. The analytical information or analytical data of a parameter may be statistics, or predictions, or recommendations for this parameter. The UE behaviour parameters may include, but not limited to, parameters described in 3GPP TS 23.501 and TS 23.502, such as "Expected UE activity behavior", i.e. the expected pattern of the UE's changes between CM-CONNECTED and CM-IDLE states; the "Expected HO behavior", i.e. the expected interval between inter-RAN handovers; the "Expected UE mobility", i.e. whether the UE is expected to be stationary or mobile; the "Expected UE moving trajectory" which may indicate the locations of UE in an ordered list, for example geographical locations, or (R)AN node IDs, or cell ID(s).

Some other UE behaviour parameters may be described in 3GPP TS 23.682. For example, "Stationary Indication" identifies whether the UE is stationary or mobile; "Periodic Time" is the interval time of periodic communication, for example: every hour; "Scheduled Communication Time" is the time and day of the week when the UE is available for communication; "Battery Indication" identifies power consumption criticality for the UE: if the UE is battery powered with not rechargeable/not replaceable battery, battery powered with rechargeable/replaceable battery, or not battery powered; "Traffic Profile" identifies the type of data transmission: single packet transmission (uplink and/or downlink), dual packet transmission (uplink with subsequent downlink or downlink with subsequent uplink), multiple packets transmission; "Scheduled Communication Type" indicates that the Scheduled Communication Type is downlink only or uplink only or bi-directional. For example, the analytical information of "Periodic Time" could be statistics of "Periodic Time", in which the UE may have data transmission in the uplink from 3:00-3:10 pm, every day with confidence level of 95%. The analytical information of "Expected UE moving trajectory" may be a list of cell IDs, with or without order: Cell 100, Cell 103, Cell 105.

The application-related analytical data may contain analytical results related to specific applications. For example, video clips of a social networking website may have video length of 3 minutes with average bit rate of 2 Mbit/s. Another example is the average data volume of background data transfer service of some vehicle service (V2X) is 100 Mbytes in the uplink, and 90% of UEs may send 90 to 110 Mbytes of background data to the V2X application servers. Another example is one IoT service, in which the IoT UEs may send in the uplink to the application server, 10 messages in average every month, each message may have averaged length of 100 bytes. Another example is maximum data burst volume parameter (MDBV) of QoS flows of some applications that may require low packet delay during transmission from the traffic source to the UE. This type of QoS flow may be delay-critical GBR QoS flow. The MDBV may denote the largest amount of data that a network, such as RAN of fourth generation (4G) or 5G mobile systems, is required to serve within a period of 5G-AN packet delay budget (PDB) (i.e. 5G-AN part of the PDB). The NWDAF 1104 may collect the data volume of QoS flow in different sizes of time window to analyse what is typical MDBV of traffic of applications required to be delivered in different time windows.

The NWDAF 1104 may collect information related to QoS parameters during the network operation. The QoS parameters are described in clause 5.7 QoS Model, 3GPP TS 23.502. The QoS parameters in either uplink or downlink, or both, may include the Flow Bit Rate, such as Guaranteed Flow Bit Rate (GFBR), Maximum Flow Bit Rate (MFBR); aggregate bit rates, such as per Session Aggregate Maximum Bit Rate (Session-AMBR), per UE Aggregate Maximum Bit Rate (UE-AMBR); Maximum Packet Loss Rate; Resource Type (GBR, Delay critical GBR or Non-GBR), Priority Level; Packet Delay Budget; Packet Error Rate; Averaging window (for GBR and Delay-critical GBR resource type only); Maximum Data Burst Volume (for Delay-critical GBR resource type only). The QoS-related analytical data may contain analytical QoS parameters related to the individual UEs, or group of UEs, or applications. For example, for a specific UE 20, the data volume consumption may be less than 1 Giga byte every week. In another example, the data consumption of UEs of a UE group may be between 3 to 4 Gigabyte every month with confidence level of 95%. The average UE aggregate maximum bit rate (UE-AMBR), the guaranteed flow bit rate (GFBR) for some video application is 4 Mbit/s to 5 Mbit/s to achieve quality of experience (QoE) level 4 in the scale of 1 to 5. In another example, for a group of V2X UEs with different levels of driving automation such as remote driving, or platooning, a GFBR of 15-20 Mbit/s meets the requirements of driving automation level 1, a GFBR of 10-15 Mbit/s meets the requirements of driving automation level 2. The QoS related analytical data for an application may be the maximum data burst volume (MDBV) parameter, which can be 200 bytes per packets in average, 50 bytes minimum and 300 bytes maximum.

When the NWDAF 1104 sends the analytical results related to the UE and application, or other analytical results to the UDM, the NWDAF 1104 also sends associated information such as time information and location information, and confidence level, and network parameters, such as DNN, S-NSSAI, Application ID, DNAI, AF-Service ID, Internal Group ID. The time information may be described by a start time and end time. The location information may be described by, for example, one or more geographical locations (such as two-dimensional or three-dimensional locations), one or more geographical zones, one or more (R)AN nodes or cell IDs, one or more registration areas, one or more tracking areas, one or more service areas of a network function such as AMF 1101, or SMF 1301, or UPF. For example, the UE behaviour parameters may be associated with one or multiple time periods and/or one or multiple locations. For example, from 9:00 AM to 11:59 AM, Monday to Friday, at a (R)AN node (or cell ID) numbered 100, the "expected UE activity behavior" is that the UE is more likely in CM-CONNECTED state, the "Expected HO behavior" is "0" which means highly probability of stationary (or no handover). In another time period, from 12:00-5:00 PM, the "Expected UE moving trajectory" is that the UE may move within a coverage area of three cells, from a cell numbered 100 to another cell numbered 120, to another cell numbered 130.

After receiving analytical data, the UDM 1102 may store the analytical data in the UDR by using services of UDR. For example, the UDM 1102 may insert a new analytical data record in the UDR by using Nudr_DM_Create service. The UDM 1102 may provide in the Nudr_DM_Create request message one or more of parameters Data Set Identifier, Data Key(s), Data Subset Identifier(s), Data Sub Key(s), as described in clause 5.2.12.2 of 3GPP Technical Specification (TS) 23.502. The Data Set Identifier may be 'Analytical Data' for analytical data. The Data Key may be SUPI (Subscription Permanent Identifier) to represent UE identifier, or Internal Group ID to represent a group of UEs, or Application ID to represent applications. The Data Sub Key may be one or more of analytical data types of 'UE analytical data', 'Application Analytical Data', 'Policy Analytical Data', 'QoS Analytical Data', 'Security Analytical Data', or any other types of analytical data.

The analytical data may be organized in the UDR by some alternative ways. For example, in the Data Set Identifier 'Access and Mobility Subscription data' or 'Session Management Subscription data' as described in clause 5.2.3.3 of 3GPP TS 23.502, version 15.4.0, published in December 2018, may include Data Sub Key(s) that indicate analytical data type(s) such as one or more of 'UE analytical data', 'Application Analytical Data', 'Policy Analytical Data', QoS Analytical Data', 'Security Analytical Data', or any other types of analytical data.

When the NWDAF 1104 sends updates of analytical data for some UE, the UDM may use Nudr_DM_Update service of the UDR to update existing data records in UDR that contain analytical data. For example, the UDM 1102 may send Nudr_DM_Update request message to the UDR to update existing analytical data records. The Nudr_DM_Update request message may include one or more of parameters Data Set Identifier, Data Key(s), Data Subset Identifier(s), Data Sub Key(s).

The UDM 1102 may get the analytical data stored in the UDR by using Nudr_DM_Query service of the UDR. The UDM 1102 may need to get the analytical data stored in the UDR when another NF, such as AMF 1101, SMF 1301, or PCF 1103 requests the UDM 1102 for analytical data, or the analytical data is part or subset of other Data Set, such as 'Access and Mobility Subscription data' or 'Session Management Subscription data', or the analytical data may be sent together with other data such as such as 'Access and Mobility Subscription data' or 'Session Management Subscription data'. The UDM 1102 may send Nudr_DM_Query message to the UDR, that may include one or more of parameters Data Set Identifier, Data Key(s), Data Subset Identifier(s), Data Sub Key(s).

The PCF 1103 may get the analytical data stored in the UDR by using Nudr_DM_Query service of the UDR.

The AMF 1101 may get the analytical data from the UDM 1102 by using Nudm_SDM_Subscribe service of the UDM 1102. The AMF 1101 or SMF 1301, or PCF 1103 or any other network function consumer, may subscribe for updates to UE's Subscriber Data indicated by the 'subscription data type' input. The UDM 1102 shall check the requested consumer is authorized to subscribe to requested updates. The AMF 1101 or SMF 1301, or PCF 1103 or any other network function consumer, may subscribe for updates to analytical data indicated by 'analytical data type' input. One or more types of analytical data may be part of subscription data type.

The input parameters of the Nudm_SDM_Subscribe message may include one or more of following parameters: Subscription data type(s), Key for each Subscription data type(s), Data Sub Key(s). The UDM 1102 will send the requested information to the consumer function, such as AMF 1101, SMF 1301, and PCF 1103.

For analytical data, the Subscription data type may be named as 'Analytical Data', the Key for each Subscription data type may be SUPI (Subscription Permanent Identifier), the Data Sub Key may be one or more of 'UE analytical data', 'Application Analytical Data', 'Policy Analytical Data', 'QoS Analytical Data', 'Security Analytical Data', or any other types of analytical data. The Data Sub Key may be organized in some alternative ways. For example, the existing 'Access and Mobility Subscription data' or 'Session Management Subscription data' as described in clause 5.2.3.3 of 3GPP Technical Specification (TS) numbered 23.502, version 15.4.0, published in December 2018, may include Data Sub Key that may indicate 'UE analytical data', 'Application Analytical Data', 'Policy Analytical Data', 'QoS Analytical Data', or any other types of analytical data.

The AMF 1101 may use the Nudm_SDM_Subscribe to get the analytical data from the UDM as shown in step 1220 of FIG. 12. For example, in clause 4.2.2.2.2 of 3GPP TS 23.502, version 15.4.0, at step 14c, the AMF may use Nudm_SDM_Subscribe to get the analytical data from the UDM. The AMF may use analytical data, such as UE mobility analytical data, to optimize some operational parameters for the UE, such as Registration Area, Tracking Area.

The AMF 1101, or any NF like SMF 1301, PCF 1103, may get the analytical data from the UDM 1102 by using another service of the UDM 1102 defined to handle analytical data. Such a service could be called Nudm_AnalyticalData_Request and Nudm_AnalyticalData_Response to request and receive analytical data, or Nudm_AnalyticalData_Subscribe, Nudm_AnalyticalData_Unsubscribe, and Nudm_AnalyticalData_Notify to subscribe, unsubscribe, to be notified of analytical data.

The AMF 1101 may send one or more of analytical data, such as UE mobility analytical data, received for example from the UDM 1101 or NWDAF 1104, or AF, to the PCF as described in step 1230 of FIG. 12. For example, the message in step 1230 of FIG. 12 may use similar message described at step 16, clause 4.2.2.2.2 of 3GPP TS 23.502, where the AMF may perform AM Policy Association Establishment during Registration procedure. In this procedure, the AMF 1101 may use Npcf_AMPolicyControl_Create service of PCF 1103 to associate with a PCF 1103 service instance. When sending the Npcf_AMPolicyControl_Create request to the PCF 1103, the AMF 1101 may provide one or more of analytical data to the PCF 1103. For example, the AMF 1101 may provide UE mobility information analytical data to the PCF 1103 so that the PCF 1103 may optimize the Service Area Restrictions for the UE. The Service Area Restrictions may include Allowed Area and Non-Allowed Area as described in clause 5.3.4.1 of 3GPP TS 23.501, Version 15.4.0, published in December 2018.

The AMF 1101 may send one or more of analytical data, received for example from the UDM 1102 or NWDAF 1104, or AF, to the SMF 1301. For example, at step 3 of clause 4.3.2.2.1, 3GPP TS 23.502, the AMF may send Nsmf_PDUSession_CreateSMContext Request message to the SMF. This message may include one or more types of analytical data to the SMF, for example analytical data of UE mobility information, UE communication patterns.

The AMF 1101 may use the analytical data, such as UE mobility analytical data, to select an SMF 1301. For example, during PDU Session Establishment procedure, at step 2 of clause 4.3.2.2.1, TS 23.502, the AMF may have information, such as NF Profile of one or more SMF SI Sets, SMF SI Subsets, SMF SIs, the AMF may select an SMF SI Set, or SMF SI Subset, or an SMF SI that may serve the UE based on the fact that the UE may move within certain locations provided in UE mobility analytical information, and/or based on the fact that the UE that may have communication within a certain period of time according to the UE Communication pattern analytical information.

The SMF 1301 may get the analytical data from the UDM 1102 as described in steps 1420 and 1430 of FIG. 14. For example, during PDU Session Establishment procedure, at step 4 of clause 4.3.2.2.1, TS 23.502, the SMF performs Registration/Subscription Retrieval/Subscription for updates with the UDM by using Nudm_SDM_Subscribe service of the UDM. The SMF 1301 may request 'Session Management Subscription data', which may include 'Analytical Data' as part of 'Session Management Subscription data. Alternatively, the SMF 1301 may request one or more types of 'Analytical Data' if the analytical data is a separate data type.

The AMF 1101, SMF 1301, or PCF 1103 may request the NWDAF 1104 to get the analytical data by using similar methods described earlier for the UDM 1102. However, if the AMF 1101, or SMF 1301, or PCF 1103 communicates with the NWDAF 1104 to get analytical data, this signaling may lead to additional delay in connection establishment for the UE, such as in UE Registration procedure, PDU Session Establishment procedure, Service Request procedure, and Handover procedure described in 3GPP TS 23.502, version 15.4.0, published in December 2018.

In the present methods, a common storage function, such as UDR is used to keep the analytical data produced by the NWDAF 1104. Other network functions, such as AMF 1101, SMF 1301, and PCF 1103, may obtain some relevant analytical data from the UDM 1102 or UDR, in combination with other data stored in the UDR 1102. This is a unified approach to avoid additional delay in signaling procedures in communication systems.

Figure 10:
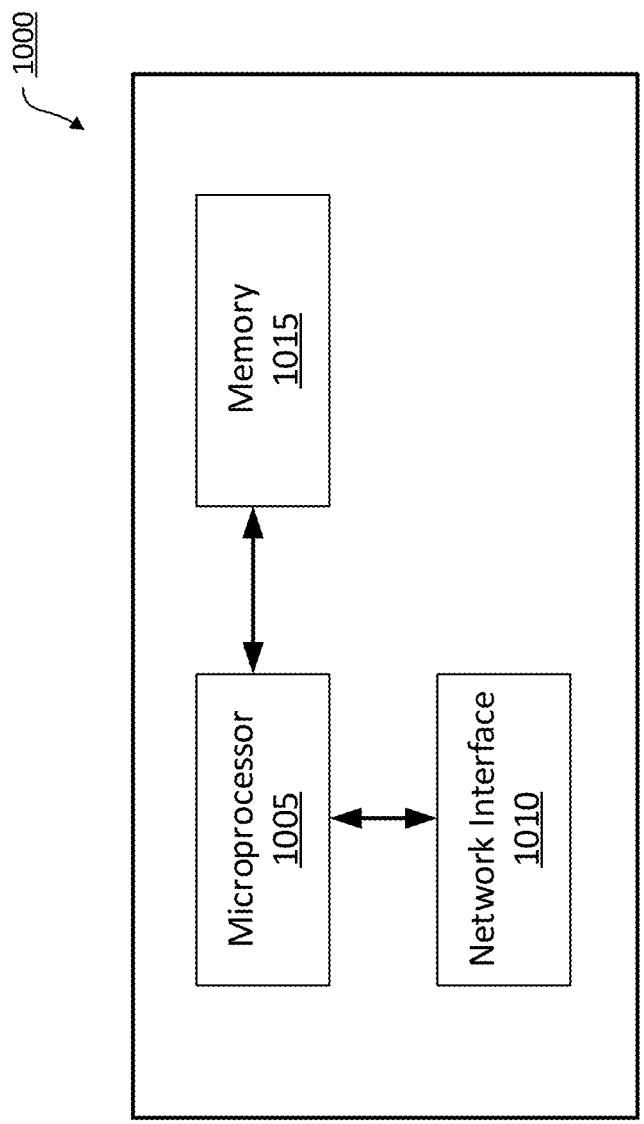
FIG. 10 illustrates, in an example embodiment, an architecture of a computing system that may be used for implementing the devices and methods disclosed herein.

FIG. 10 illustrates, in an example embodiment, an architecture 1000 of a computing system that may be used for implementing the devices and methods disclosed herein. The operations described in regard to FIG. 9 may be performed by one or more functional modules of a computing device, which may be one or more server computing devices, which include at least a microprocessor 1005, network communication interface 1010 and memory 1015, operating in concert to perform any of the above-described operations. Memory 1015 may include instructions executable in processor 1005 for performing operations as described above.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for data collection, the method comprising:
receiving, by a function from a network data analytics function (NWDAF), a subscription to a data item via a first interface between the function and the NWDAF, wherein the subscription includes information identifying the data item to be collected;

subscribing, by the function from a network function set, to the data item according to the received subscription via a second interface between the function and the network function set;

receiving, by the function from the network function set, the data item via the second interface; and sending, by the function to the NWDAF, the data item in response to the NWDAF's subscription via the first interface.

2. The method of claim 1, wherein the information identifying the data item to be collected includes at least one of:
   a type of data to be collected, and
   one or more attributes of data to be collected.

3. The method of claim 1, wherein the subscription further includes information indicating where data may be provided.

4. The method of claim 3, wherein the information indicating where data may be provided includes at least one of:
   one or more network function set identifiers,
   one or more network function service set IDs,
   one or more network function SI IDs, and
   one or more network function addresses thereof, that may provide data to be collected.

5. The method of claim 1, wherein
   if the information identifying the data item to be collected is associated with a previous subscription to the network function set, the subscribing, by the function, from a network function set, to the data item comprises:
   sending, by the function, a subscription message to the network function set, wherein the subscription message is modified from the previous subscription based on the received subscription from the NWDAF.

6. The method of claim 5, further comprising:
   determining, by the function, whether the data item to be collected is associated with at least one of data type or attribute of data to be collected according to the previous subscription;
   if yes, modifying, by the function the previous subscription to form the subscription message to be sent to the network function set.

7. An apparatus comprising one or more processors coupled with a memory storing machine readable instructions which when executed by the one or more processors configure the one or more processors to perform a method comprising:
   receiving, from a network data analytics function (NWDAF), a subscription to a data item via a first interface between the apparatus and the NWDAF, wherein the subscription includes information identifying the data item to be collected;
   subscribing, from a network function set, to the data item according to the received subscription via a second interface between the apparatus and the network function set;
   receiving, from the network function set, the data item via the second interface; and sending, to the NWDAF, the data item in response to the NWDAF's subscription via the first interface.

8. The apparatus of claim 7, wherein the information identifying the data item to be collected includes at least one of:
   a type of data to be collected, and
   one or more attributes of data to be collected.

9. The apparatus of claim 7, wherein the subscription further includes information indicating where data may be provided.

10. The apparatus of claim 9, wherein the information indicating where data may be provided includes at least one of:
    one or more network function set identifiers,
    one or more network function service set IDs,
    one or more network function SI IDs, and
    one or more network function addresses thereof, that may provide data to be collected.

11. The apparatus of claim 7, wherein
    if the information identifying the data item to be collected is associated with a previous subscription to the network function set, the subscribing from a network function set, to the data item comprises:
    sending a subscription message to the network function set, wherein the subscription message is modified from the previous subscription based on the received subscription from the NWDAF.

12. The apparatus of claim 11, the method further comprising:
    determining whether the data item to be collected is associated with at least one of data type or attribute of data to be collected according to the previous subscription;
    if yes, modifying the previous subscription to form the subscription message to be sent to the network function set.

13. A communication system comprising a function and a network function set, wherein the function is configured to perform steps of:
    receiving, from a network data analytics function (NWDAF), a subscription to a data item via a first interface between the apparatus and the NWDAF, wherein the subscription includes information identifying the data item to be collected;
    subscribing, from the network function set, to the data item according to the received subscription via a second interface between the apparatus and the network function set;
    receiving, from the network function set, the data item via the second interface; and
    sending, to the NWDAF, the data item in response to the NWDAF's subscription; and
    the function is configured to perform steps of:
    collecting the data item; and
    sending, to the function, the data item in response to a subscription from the function.

14. The communication system according to claim 13, further comprising a NWDAF configured to perform steps of:
    sending, to the function, the subscription to the data item; and receiving, from the function, the data item.

* * * * *